United States Patent
Blank et al.

(10) Patent No.: US 10,782,672 B2
(45) Date of Patent: Sep. 22, 2020

(54) MACHINE CONTROL SYSTEM USING PERFORMANCE SCORE BASED SETTING ADJUSTMENT

(71) Applicant: Deere & Company, Moline, IL (US)

(72) Inventors: Sebastian Blank, Moline, IL (US); Dohn W. Pfeiffer, Bettendorf, IA (US); Colin D Engel, Bettendorf, IA (US)

(73) Assignee: Deere & Company, Moline, IL (US)

( * ) Notice: Subject to any disclaimer, the term of this patent is extended or adjusted under 35 U.S.C. 154(b) by 16 days.

(21) Appl. No.: 15/980,234

(22) Filed: May 15, 2018

(65) Prior Publication Data
US 2019/0354081 A1 Nov. 21, 2019

(51) Int. Cl.
*G05B 19/408* (2006.01)
*G06N 5/02* (2006.01)

(52) U.S. Cl.
CPC ......... *G05B 19/4083* (2013.01); *G06N 5/025* (2013.01); *G05B 2219/32324* (2013.01)

(58) Field of Classification Search
CPC ...... G05B 19/4083; G05B 2219/32324; G06Q 50/02; G06Q 10/06398; G06Q 10/0639; G06Q 10/06393; G06Q 10/06395; G06Q 99/00
See application file for complete search history.

(56) References Cited

U.S. PATENT DOCUMENTS

| | | | |
|---|---|---|---|
| 4,951,031 A | 8/1990 | Strubbe | |
| 5,585,757 A | 12/1996 | Frey | |
| 5,679,094 A | 10/1997 | Nakamura et al. | |

(Continued)

FOREIGN PATENT DOCUMENTS

| CN | 101622928 A | 1/2010 |
|---|---|---|
| DE | 10 2006 007 753 A1 | 10/2006 |

(Continued)

OTHER PUBLICATIONS

U.S. Appl. No. 15/626,934 Final Office Acton dated Jul. 11, 2019, 34 pages.

(Continued)

*Primary Examiner* — Chun Cao
(74) *Attorney, Agent, or Firm* — Christopher J. Volkmann; Kelly, Holt & Christenson, PLLC

(57) ABSTRACT

A method performed by a control system for a work machine includes receiving machine data indicative of operating parameters on the work machine, receiving a set of performance scores indicative of relative machine performance in a set of different performance categories, each performance score being generated by a different performance score generator based on sensor data associated with the work machine, accessing a set of rules that each map one or more triggering conditions to a corresponding adjustment action on the work machine, identifying a set of potential adjustment actions by evaluating fulfillment of the set of rules based on the operating parameters and performance scores, and correlating each potential adjustment action to one or more of the performance categories, selecting a particular adjustment action, from the set of potential adjustment actions, based on an indication of a selected target performance category, and outputting a control instruction based on the particular adjustment action.

20 Claims, 31 Drawing Sheets

(56) References Cited

U.S. PATENT DOCUMENTS

| | | |
|---|---|---|
| 5,734,849 A | 3/1998 | Butcher |
| 5,751,199 A | 5/1998 | Shiau et al. |
| 5,755,281 A | 5/1998 | Kang et al. |
| 6,449,932 B1 | 9/2002 | Cooper et al. |
| 6,553,300 B2 | 4/2003 | Ma et al. |
| 6,726,559 B2 | 4/2004 | Bischoff |
| 6,990,459 B2 | 1/2006 | Schneider |
| 6,999,877 B1 | 2/2006 | Dyer et al. |
| 7,047,135 B2 | 5/2006 | Dyer et al. |
| 7,164,992 B1 | 1/2007 | Mulligan et al. |
| 7,184,892 B1 | 2/2007 | Dyer et al. |
| 7,333,922 B2 | 2/2008 | Cannon |
| 7,364,003 B2 | 4/2008 | Holt et al. |
| 7,397,392 B2 | 7/2008 | Mahoney et al. |
| 8,280,595 B2 | 10/2012 | Foster et al. |
| 8,469,784 B1 | 6/2013 | Hoskinson et al. |
| 9,330,062 B2 | 5/2016 | Thurow et al. |
| 9,809,956 B1 | 11/2017 | Sherlock |
| 9,892,376 B2* | 2/2018 | Pfeiffer .................. G06Q 50/02 |
| 10,310,455 B2 | 6/2019 | Blank |
| 10,310,456 B2 | 6/2019 | Caldwell et al. |
| 10,311,527 B2 | 6/2019 | Pfeiffer |
| 2002/0040300 A1 | 4/2002 | Ell |
| 2002/0103688 A1 | 8/2002 | Schneider |
| 2003/0014171 A1 | 1/2003 | Ma et al. |
| 2003/0161906 A1 | 8/2003 | Braunhardt et al. |
| 2004/0024510 A1 | 2/2004 | Finley |
| 2005/0150202 A1 | 7/2005 | Quick |
| 2005/0171660 A1 | 8/2005 | Woodford et al. |
| 2005/0171835 A1 | 8/2005 | Mook et al. |
| 2005/0258259 A1 | 11/2005 | Stanimirovic |
| 2006/0187048 A1 | 8/2006 | Curkendall et al. |
| 2006/0191692 A1 | 8/2006 | Holt et al. |
| 2006/0241838 A1 | 10/2006 | Mongiardo et al. |
| 2006/0287792 A1 | 12/2006 | Jarrett |
| 2006/0293913 A1 | 12/2006 | Iwig et al. |
| 2007/0156318 A1 | 7/2007 | Anderson et al. |
| 2007/0192173 A1 | 8/2007 | Moughler et al. |
| 2008/0319927 A1 | 12/2008 | Dellmier et al. |
| 2009/0036184 A1 | 2/2009 | Craessaerts et al. |
| 2009/0259483 A1 | 10/2009 | Hendrickson et al. |
| 2009/0312919 A1 | 12/2009 | Foster |
| 2010/0036696 A1* | 2/2010 | Lang .................. A01B 79/005 705/7.39 |
| 2010/0071329 A1 | 3/2010 | Hindryckx |
| 2010/0153409 A1 | 6/2010 | Joshi et al. |
| 2010/0199257 A1 | 8/2010 | Biggerstaff |
| 2010/0217481 A1 | 8/2010 | Baumgarten et al. |
| 2010/0217631 A1 | 8/2010 | Boss et al. |
| 2011/0251752 A1 | 10/2011 | DeLarocheliere et al. |
| 2011/0270495 A1 | 11/2011 | Knapp |
| 2012/0038544 A1 | 2/2012 | Chen |
| 2012/0151055 A1 | 6/2012 | Kansal |
| 2012/0215395 A1 | 8/2012 | Aznavorian et al. |
| 2012/0253709 A1 | 10/2012 | Schmidt et al. |
| 2012/0253744 A1* | 10/2012 | Schmidt .................. G07C 5/008 702/182 |
| 2012/0260366 A1 | 10/2012 | Heuvelmans |
| 2012/0323453 A1 | 12/2012 | Havimaki et al. |
| 2012/0323496 A1 | 12/2012 | Burroughs et al. |
| 2013/0289832 A1 | 10/2013 | Pirotais |
| 2013/0317872 A1 | 11/2013 | Nakamichi |
| 2014/0019018 A1* | 1/2014 | Baumgarten ........ G05B 13/021 701/50 |
| 2014/0025440 A1 | 1/2014 | Nagda et al. |
| 2014/0069035 A1 | 3/2014 | Collins et al. |
| 2014/0089035 A1 | 3/2014 | Jericho |
| 2014/0122147 A1 | 5/2014 | Christie et al. |
| 2014/0129048 A1 | 5/2014 | Baumgarten et al. |
| 2014/0156105 A1 | 6/2014 | Faivre et al. |
| 2014/0188576 A1 | 7/2014 | de Oliveira et al. |
| 2014/0277905 A1 | 8/2014 | Anderson |
| 2014/0172247 A1 | 9/2014 | Thomson |
| 2015/0046043 A1 | 2/2015 | Bollin |
| 2015/0058641 A1 | 2/2015 | Parikh |
| 2015/0064668 A1 | 3/2015 | Manci et al. |
| 2015/0112546 A1 | 4/2015 | Ochsendorf et al. |
| 2015/0178661 A1 | 6/2015 | Keaveny et al. |
| 2015/0199360 A1* | 7/2015 | Pfeiffer ............ G06F 16/24578 707/723 |
| 2015/0199630 A1 | 7/2015 | Pfeiffer |
| 2015/0199637 A1 | 7/2015 | Pfeiffer et al. |
| 2015/0199775 A1 | 7/2015 | Pfeiffer |
| 2015/0366124 A1 | 12/2015 | Kremmer |
| 2016/0059412 A1* | 3/2016 | Oleynik .................. B25J 9/163 700/257 |
| 2016/0078391 A1 | 3/2016 | Blank |
| 2016/0088793 A1 | 3/2016 | Bischoff |
| 2016/0098637 A1 | 4/2016 | Hodel et al. |
| 2016/0202227 A1 | 7/2016 | Mathur et al. |
| 2016/0212969 A1 | 7/2016 | Ouchida et al. |
| 2017/0090741 A1 | 3/2017 | Tentinger |
| 2017/0168501 A1 | 6/2017 | Ogura |
| 2017/0261978 A1 | 9/2017 | Gresch |
| 2017/0322550 A1 | 11/2017 | Yokoyama |
| 2018/0196438 A1 | 7/2018 | Newlin |
| 2018/0359917 A1 | 12/2018 | Blank |
| 2018/0359918 A1 | 12/2018 | Blank et al. |
| 2018/0359919 A1 | 12/2018 | Blank |
| 2018/0364652 A1 | 12/2018 | Blank |
| 2018/0364698 A1 | 12/2018 | Blank |
| 2019/0146426 A1 | 5/2019 | Blank |

FOREIGN PATENT DOCUMENTS

| | | |
|---|---|---|
| EP | 1111550 A1 | 6/2001 |
| EP | 1277388 A1 | 1/2003 |
| EP | 1714822 A2 | 10/2006 |
| EP | 1371278 B1 | 11/2008 |
| EP | 3093397 A1 | 11/2016 |
| EP | 3346347 A1 | 7/2018 |
| WO | 2013096716 A1 | 6/2013 |
| WO | 2013096721 A2 | 6/2013 |
| WO | 2015153809 A1 | 10/2015 |
| WO | 2016115496 A1 | 7/2016 |
| WO | 2016115499 A1 | 7/2016 |
| WO | 2016116499 A1 | 7/2016 |
| WO | 2016200699 A1 | 12/2016 |

OTHER PUBLICATIONS

U.S. Appl. No. 114/271,077, filed May 6, 2014 Prosecution History as of Feb. 12, 2019, 195 pages.

U.S. Appl. No. 14/445,699, filed Jul. 20, 2014 Prosecution History as of Feb. 12, 2019, 290 pages.

U.S. Appl. No. 14/546,725, filed Nov. 18, 2014 Prosecution History as of Feb. 12, 2019, 313 pages.

U.S. Appl. No. 14/925,237, filed Oct. 28, 2015 Prosecution History as of Feb. 12, 2019, 232 pages.

U.S. Appl. No. 15/626,934, filed Jan. 18, 2017 Prosecution History as of Feb. 12, 2019, 151 pages.

U.S. Appl. No. 15/626,967, filed Jun. 19, 2017 Prosecution History as of Feb. 12, 2019, 162 pages.

U.S. Appl. No. 15/629,260, filed Jun. 21, 2017 Prosecution History as of Feb. 12, 2019, 162 pages.

U.S. Appl. No. 15/983,456, filed May 18, 2018 Prosecution History as of Feb. 12, 2019, 198 pages.

U.S. Appl. No. 16/246,818, filed Jan. 14, 2019 Prosecution History as of Feb. 12, 2019, 62 pages.

Combine Harvester Instrumentation System for Use in Precision Agriculture. Yap Kin 2011.

U.S. Appl. No. 14/925,237 Final Office Acton dated Nov. 5, 2018, 30 pages.

European Patent Application No. 18176691.6-1217 Extended European Search Report dated Oct. 25, 2018, 8 pages.

U.S. Appl. No. 14/445,699 Final Office Action dated Mar. 6, 2019, 66 pages.

U.S. Appl. No. 15/626,967 Notice of Allowance dated Jan. 3, 2019, 6 pages.

(56) References Cited

OTHER PUBLICATIONS

Extended European European Search Report Application No. 18176687.4 dated Nov. 6, 2018, 6 pages.
U.S. Appl. No. 14/445,699 Office Action dated Mar. 30, 2018, 61 pages.
Electronic Fleet Management for Work Truck Fleets, Jun. 20, 2013 2 pages. www.zonarsystems.com.
2013 Buyer's Guide: Fleet Automation Software, http://www.teletrac.com/assets/TT_BuyersGuide_2013.pdf, 10 pages.
Fleet Management: How it works. 2014 Verizon, 3 pages.
U.S. Appl. No. 14/546,725 Final Office Action dated Nov. 16, 2017, 23 pages.
Office Action for U.S. Appl. No. 14/445,699, dated Jun. 20, 2017, 40 pages.
U.S. Appl. No. 14/546,725 Office Action dated May 26, 2017, 14 pages.
European Search Report Application No. 14879223.7 dated May 22, 2017, 7 pages.
U.S. Appl. No. 14/155,023, Final Office Action, dated Mar. 7, 2017. 40 pages.
U.S. Appl. No. 14/546,725 Restriction Requirement dated Jan. 9, 2017. 8 pages.
U.S. Appl. No. 14/155,023 Office Action dated Jul. 20, 2016. 18 Pages.
International Search Report and Written Opinion for International Application No. PCT/US2014/069541, dated Apr. 15, 2015, date of filing: Dec. 10, 2014, 17 pages.
Prosecution History for U.S. Appl. No. 14/271,077 including: Final Office Action dated Jan. 25, 2018, Amendment dated Oct. 10, 2017, and Non-Final Office Action dated Jul. 14, 2017, 76 pages.
Non-Final Office Action for U.S. Appl. No. 14/546,725 dated May 11, 2018, 19 pages.
U.S. Appl. No. 14/271,077 Notice of Allowance dated Jun. 19, 2019, 7 pages.
U.S. Appl. No. 14/271,077 Office Action dated Oct. 2, 2018, 10 pages.
U.S. Appl. No. 14/546,725 Office Action dated Oct. 11, 2018, 11 pages.
U.S. Appl. No. 15/626,972 Office Action dated Apr. 19, 2019, 14 pages.
U.S. Appl. No. 15/626,967 Notice of Allowance dated Jun. 5, 2019, 14 pages.
U.S. Appl. No. 15/626,972 Final Office Action dated Oct. 31, 2019, 9 pages.
EP Application No. 14879223.7 Communication pursuant to Article 94(3) dated May 22, 2019, 6 pages.
U.S. Appl. No. 15/983,456 Office Action dated Nov. 13, 2019, 16 pages.
U.S. Appl. No. 15/626,972 Notice of Allowance dated Feb. 26, 2020, 9 pages.
European Search Report issued in counterpart European Patent Application No. 19173588.5 dated Oct. 7, 2019 (5 pages).
Application and Drawings for U.S. Appl. No. 15/626,972, filed Jun. 19, 2017, 65 pages.
Non-Final Office Action for U.S. Appl. No. 15/983,456 dated Nov. 13, 2019, 17 pages.
Non-Final Office Action for U.S. Appl. No. 14/445,699 dated Jul. 20, 2018, 71 pages.
Restriction Requirement for U.S. Appl. No. 14/155,023 dated Mar. 30, 2016, 7 pages.
Notice of Allowance for U.S. Appl. No. 14/271,077 dated Jun. 19, 2019, 8 pages.
Prosecution History for U.S. Appl. No. 14/546,725 including: Notice of Allowance dated Apr. 2, 2019 and Advisory Action dated Jan. 22, 2019, 11 pages.
Prosecution History for U.S. Appl. No. 14/925,237 including: Corrected Notice of Allowance dated Sep. 17, 2019, Corrected Notice of Allowance dated Sep. 6, 2019, and Notice of Allowance dated Jul. 30, 2019, 18 pages.
Final Office Action for U.S. Appl. No. 15/626,934 dated Jul. 11, 2016, 22 pages.
Notice of Allowance for U.S. Appl. No. 15/626,967 dated Jul. 17, 2019, 7 pages.
Notice of Allowance for U.S. Appl. No. 15/629,260 dated Apr. 9, 2019, 10 pages.
First Office Action for Chinese Patent Application No. 201480068108.2 dated Oct. 8, 2018, 12 pages.
Search Report for German Patent Application No. 102018209843.3 dated Apr. 9, 2020, 12 pages.
Final Office Action for U.S. Appl. No. 15/983,456 dated May 29, 2020, 21 pages.
Non-Final Office Action for U.S. Appl. No. 15/626,934 dated Jun. 12, 2020, 25 pages.

* cited by examiner

MACHINE CONTROL SYSTEM USING PERFORMANCE SCORE BASED SETTING ADJUSTMENT

FIELD OF THE DISCLOSURE

The present disclosure generally relates to mobile or other work machines. More specifically, but not by limitation, the present disclosure relates to a control system for a mobile or other work machine that utilizes machine setting adjustments based on performance scores.

BACKGROUND

There is a wide variety of different types of work machines that are operated by an operator. This can include, for instance, agricultural equipment, construction equipment, turf and forestry equipment, among others. Many of these pieces of mobile equipment have mechanisms that are controlled by the operator in performing operations.

For instance, an agricultural combine or harvester can have multiple different mechanical, electrical, hydraulic, pneumatic and electro-mechanical subsystems, all of which need to be operated by the operator. The systems may require the operator to set a wide variety of different settings and provide various control inputs in order to control the combine. Some inputs not only include controlling the combine direction and speed, but also concave spacing, sieve settings, rotor speed settings, and a wide variety of other settings and control inputs. Because of the complex nature of the combine operation, it can be very difficult to know how a particular operator or machine is performing in a given harvesting operation. While some systems are currently available that sense some operational and other characteristics, and make them available to reviewing personnel, those current systems are normally informational in nature.

The discussion above is merely provided for general background information and is not intended to be used as an aid in determining the scope of the claimed subject matter.

SUMMARY

A method performed by a control system for a work machine includes receiving machine data indicative of operating parameters on the work machine, receiving a set of performance scores indicative of relative machine performance in a set of different performance categories, each performance score being generated by a different performance score generator based on sensor data associated with the work machine, accessing a set of rules that each map one or more triggering conditions to a corresponding adjustment action on the work machine, identifying a set of potential adjustment actions by evaluating fulfillment of the set of rules based on the operating parameters and performance scores, and correlating each potential adjustment action to one or more of the performance categories, selecting a particular adjustment action, from the set of potential adjustment actions, based on an indication of a selected target performance category, and outputting a control instruction based on the particular adjustment action.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Work machines often have a wide variety of sensors that sense a variety of different variables, such as operating parameters. Examples of work machines include, but are not limited to, agricultural equipment, construction equipment, turf and forestry equipment, among others. Many of these work machines have mechanisms that are controlled by the operator in performing operations.

It is noted that while examples are described herein in the context of an agricultural combine or harvesting machine, the example systems and related components and methods can be utilized in other types of agricultural machines (e.g., seeder, sprayer, tractor, etc.), as well as in other types of applications, such as, but not limited to, turf management, forestry, construction, to name a few.

For sake of discussion, but not by limitation, an agricultural combine harvester often has a wide variety of sensors that sense a variety of different variables, such as operating parameters, along with crop characteristics, environmental parameters, etc. The sensors can communicate this information over a controller area network (CAN) bus (or another network, such as an Ethernet network, etc.) to various systems that can process the sensor signals and generate output signals (such as control signals) based on the sensed variables. Given the complex nature of the control operations needed to operate a combine harvester, and given the wide variety of different types of settings and adjustments that an operator can make, and further given the widely varying different types of crops, terrain, crop characteristics, etc. that can be encountered by a combine harvester, it can be very difficult to determine how a particular machine, or operator, is performing.

Likewise, due to this complexity, it can be difficult to determine what settings and adjustments can be made to optimize or otherwise improve the machine operation. This problem is exacerbated when a user (e.g., operator, remote user, etc.) desires to target a particular operational aspect, such as a performance category (e.g., fuel consumption, productivity, power utilization, material loss, material quality, etc.), for improvement.

The present disclosure generally relates to a control system for a mobile or other work machine that utilizes machine setting adjustments based on performance scores. In some examples, machine setting adjustments are prioritized and/or preferentially selected based on pillars (or performance categories) of the machine. Before describing in detail example systems and methods for machine setting selection and adjustment, examples of performance metric (score) generation will be discussed.

Figure 1:
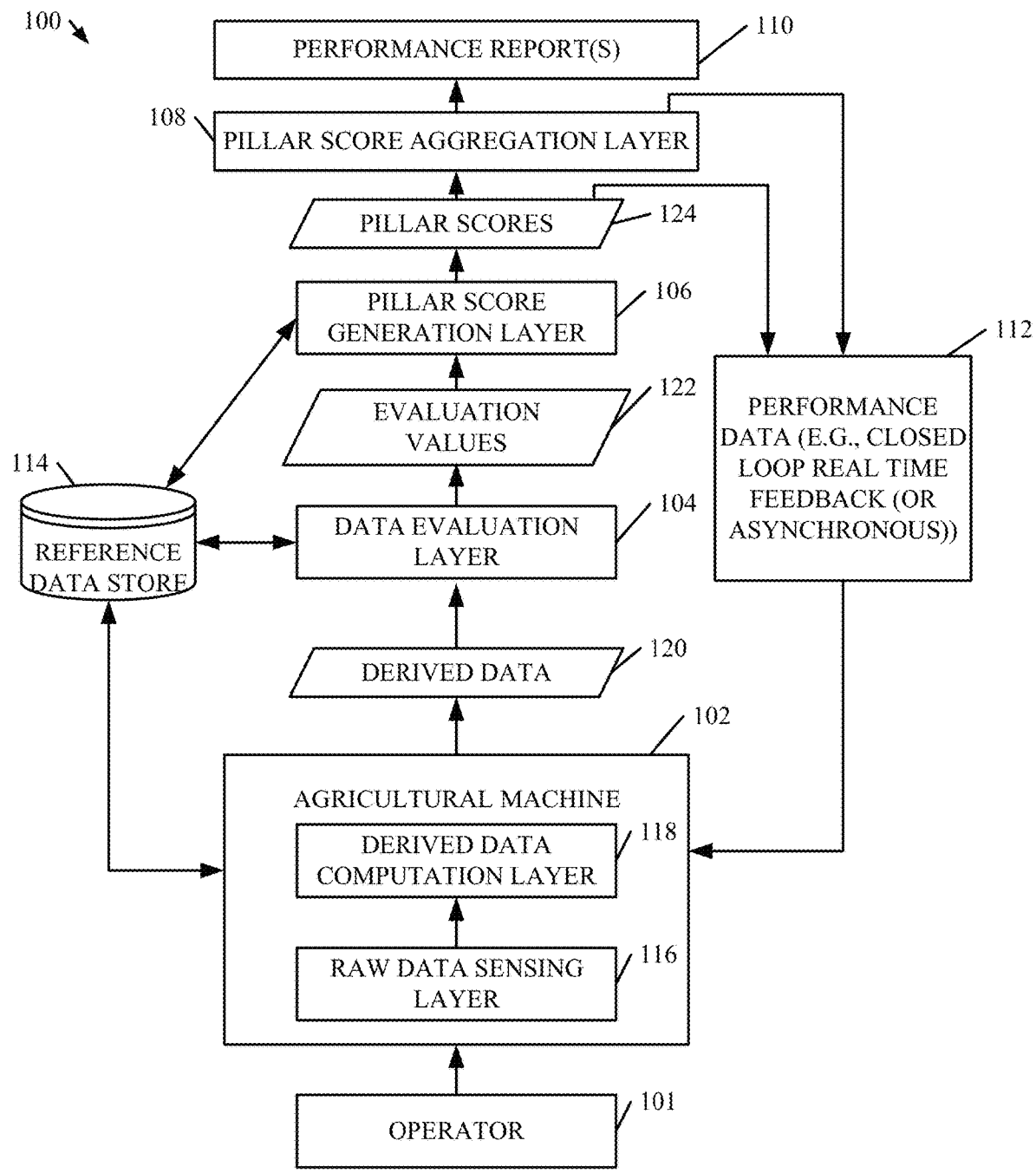
FIG. 1 is a block diagram of one example performance computation architecture.

FIG. 1 is a block diagram of one embodiment of a performance score generation architecture 100. Architecture 100 illustratively includes a work machine (i.e., agricultural machine) 102, a data evaluation layer 104, a pillar score generation layer 106, and a pillar score aggregation layer 108. Layer 108 generates performance reports 110, and can also generate performance data 112, such as closed loop, real time (or asynchronous) control data, which can be provided back to agricultural machine 102. Architecture 100 is also shown having access to a reference data store 114.

In the embodiment shown in FIG. 1, machine 102 is described as being an agricultural machine (and specifically a combine), but this is exemplary only. It could be another type of agricultural machine as well, such as a tractor, a seeder, a cotton harvester, a sugarcane harvester, or others. Also, it could be a work machine used in the turf and forestry industries, the construction industry or others. Machine 102 illustratively includes raw data sensing layer 116 and derived data computation layer 118. It will be noted that layer 118 can be provided on machine 102, or elsewhere in architecture 100. It is shown on machine 102 for the sake of example only.

Raw data sensing layer 116 illustratively includes a plurality of different sensors (some of which are described in greater detail below) that sense machine operating parameters as well as environmental data, such as product quality and the type and quality of material being expelled from the agricultural machine 102. The raw data sensor signals are provided from raw data sensing layer 116 to derived data computation layer 118 where some computation is performed on those sensor signals, in order to obtain derived data 120. In one embodiment, derived data computation layer 118 performs computations that do not require a great deal of computational overhead or storage requirements.

Derived data 120 is provided to data evaluation layer 104. In one embodiment, data evaluation layer 104 compares the derived data 120 against reference data stored in reference data store 114. The reference data can be historical data from operator 101, or from a variety of other sources, such as data collected for operators in the fleet for a single farm that employs operator 101, or from relevant data obtained from other operators as well. Data evaluation layer 104 generates evaluation values 122 based upon an evaluation of how the derived data 120 compares to the reference data in data store 114.

Evaluation values 122 are provided to pillar score generation layer 106. Layer 106 illustratively includes a set of score calculators that calculate a performance score 124 for each of a plurality of different performance pillars (or performance categories) that can be used to characterize the operation of the agricultural machine, such as the performance of operator 101 in operating agricultural machine 102. The particular performance pillars, and associated scores 124, are described in greater detail below.

In one example, each of the pillar scores 124 are used to generate, or otherwise obtain, performance data 112. Alternatively, or in addition, pillar scores 124 can be provided to pillar score aggregation layer 108. Layer 108 illustratively generates a composite score and performance reports 110, based upon the various pillar scores 124 that are received. The performance reports can take a wide variety of different forms, and can include a wide variety of different information, some of which is described below in greater detail with respect to FIG. 6. In one embodiment, reports 110 illustratively include the composite score (e.g., an overall score for operator 101) indicative of the performance of operator 101, and is based upon the individual pillar scores 124 for the individual performance pillars (or performance categories). It can also illustratively include recommendations which are actionable items that can be performed by operator 101, in order to improve operation of agricultural machine 102 while considering the included contextual information.

In one embodiment, layer 108 can also generate performance data 112 which can be fed back to agricultural machine 102, as mentioned above. Where the data is fed back in real time, it can be used to adjust the operation, settings, or other control parameters for machine 102, on-the-fly, in order to improve the overall performance. It can also be used to display information to operator 101, indicating the performance scores, along with recommendations of how operator 101 should change the settings, control parameters, or other operator inputs, in order to improve the performance. The data can also illustratively be provided asynchronously, in which case it can be downloaded to the agricultural machine 102 intermittently, or at preset times, in order to modify the operation of machine 102.

Figure 2A:
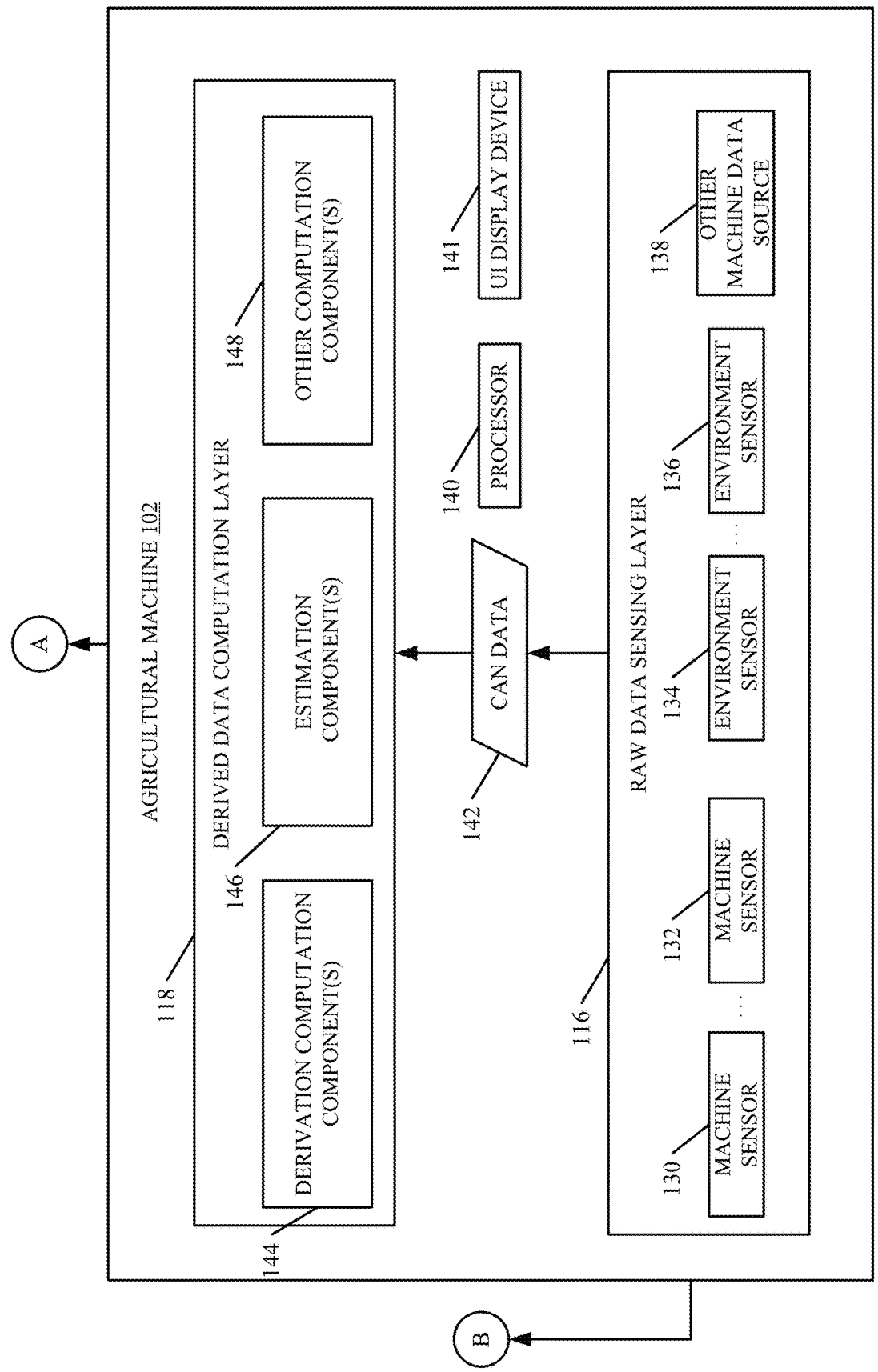
FIGS. 2A and 2B (collectively FIG. 2) is a more detailed block diagram of the architecture shown in FIG. 1.
Figure 2B:
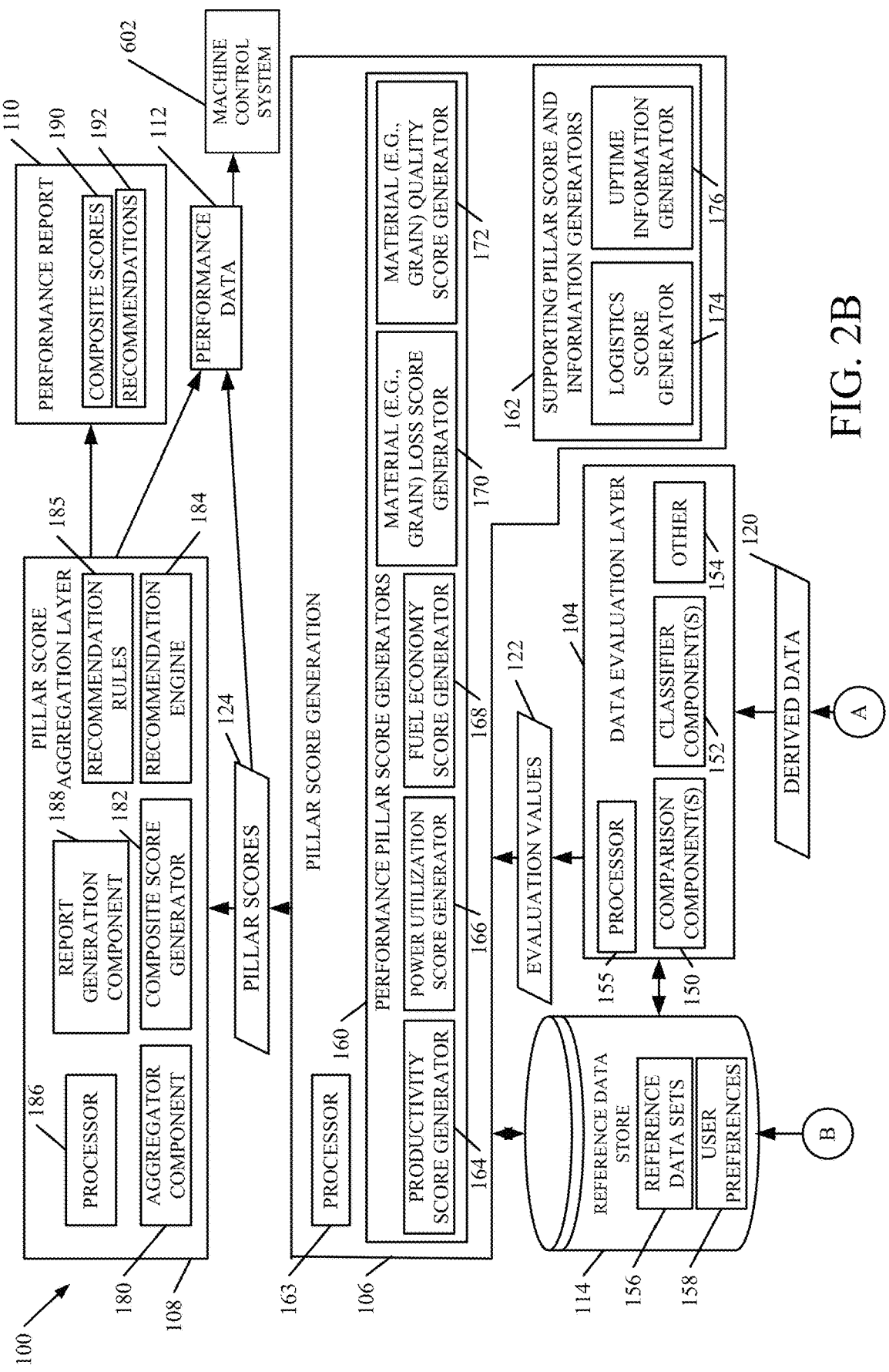

Alternatively, or in addition, performance data 112 can be provided to a machine control system. Examples of the machine control system are discussed in further detail below. Briefly, however, the machine control system is configured to utilize performance scores, as individual pillar scores and/or overall composite score, as a feedback mechanism to increase performance of the machine through machine setting adjustments. Before describing the overall operation of architecture 100, a more detailed block diagram of one embodiment of the architecture will be described. FIGS. 2A and 2B are collectively referred to as FIG. 2. FIG. 2 shows one embodiment of a more detailed block diagram of architecture 100. Some of the items shown in FIG. 2 are similar to those shown in FIG. 1, and are similarly numbered.

Before describing FIG. 2, it is noted that while some components or features are illustrated as separate from machine 102, one or more of them can be provided on-board machine 102.

FIG. 2 specifically shows that raw data sensing layer 116 in machine 102 illustratively includes a plurality of machine sensors 130-132, along with a plurality of environment sensors 134-136. Raw data sensing layer 116 can also obtain raw data from other machine data sources 138. By way of example, machine sensors 130-132 can include a wide variety of different sensors that sense operating parameters and machine conditions on machine 102. For instance, they can include speed sensors, mass flow sensors that measure the mass flow of product through the machine, various pressure sensors, pump displacement sensors, engine sensors that sense various engine parameters, fuel consumption sensors, among a wide variety of other sensors, some of which are described in greater detail below.

Environment sensors 134-136 can also include a wide variety of different sensors that sense different things regarding the environment of machine 102. For instance, when machine 102 is a type of harvesting machine (such as a combine), sensors 134-136 can include crop loss sensors that sense an amount of crop that is being lost, as opposed to harvested. In addition, they can include crop quality sensors that sense the quality of the harvested crop. They can also include, for instance, various characteristics of the material that is discarded from machine 102, such as the length and volume of straw discarded from a combine. They can include sensors from mobile devices in the operator's compartment, irrigation sensors or sensor networks, sensors on unmanned aerial vehicles or other sensors. Environment sensors 134-136 can sense a wide variety of other environmental parameters as well, such as terrain (e.g., pitch and roll sensors), weather conditions (such as temperature, humidity, etc.), among others.

Other machine data sources 138 can include a wide variety of other sources. For instance, they can include systems that provide and record alerts or warning messages regarding machine 102. They can include the count and category for each warning, diagnostic code or alert message, and they can include a wide variety of other information as well.

Machine 102 also illustratively includes processor 140 and a user interface display device 141. Display device 141 illustratively generates user interface displays (under control of processor 140 or another component) that allows user 101 to perform certain operations with respect to machine 102. For instance, the user interface displays on the device 141 can include user input mechanisms that allow the user to enter authentication information, start the machine, set certain operating parameters for the machine, or otherwise control machine 102.

In many agricultural machines, data from sensors (such as from raw data sensing layer 116) are illustratively communicated to other computational components within machine 102, such as computer processor 140. Processor 140 is illustratively a computer processor with associated memory and timing circuitry (not separately shown). It is illustratively a functional part of machine 102 and is activated by, and facilitates the functionality of, other layers, sensors or components or other items on machine 102. In one embodiment, the signals and messages from the various sensors in layer 116 are communicated using a controller area network (CAN) bus. Thus, the data from sensing layer 116 is illustratively referred to as CAN data 142.

The CAN data 142 is illustratively provided to derived data computation layer 118 where a number of computations are performed on that data to obtain derived data 120, that is derived from the sensor signals included in CAN data 142. Derived data computation layer 118 illustratively includes derivation computation components 144, estimation components 146 and can include other computation components 148. Derivation computation components 144 illustratively calculate some of the derived data 120 based upon CAN data 142. Derivation computation components 144 can illustratively perform fairly straight forward computations, such as averaging, computing certain values as they occur over time, plotting those values on various plots, calculating percentages, among others.

In addition, derivation computation components 144 illustratively include windowing components that break the incoming data sensor signals into discrete time windows or time frames that are processed both discretely, and relative to data in other or adjacent time windows. Estimation components 146 illustratively include components that estimate derived data. In one embodiment components 146 illustratively perform estimation on plotted points to obtain a function that has a metric of interest. The metric of interest, along with the underlying data, can be provided as derived data 120. This is but one exemplary embodiment of a computation component 144, and a wide variety of others can be used as well. Other computation components 148 can include a wide variety of components to perform other operations. For instance, in one embodiment, components 148 include filtering and other signal conditioning components that filter and otherwise condition the sensor signals received from raw data sensing layer 116. Components 148 can of course include other components as well.

Regardless of the type of components 144, 146 and 148 in layer 118, it will be appreciated that layer 118 illustratively performs computations that require relatively light processing and memory overhead. Thus, in one embodiment, layer 118 is disposed on machine 102 (such as on a device located in the cab or other operator compartment of machine 102) or on a hand held or other mobile device that can be accessed on machine 102 by user 101. In another embodiment, derived data computation layer 118 is located elsewhere, other than on machine 102, and processor 140 communicates CAN data 142 to layer 118 using a communication link (such as a wireless or wired communication link, a near field communication link, or another communication link).

In any case, derived data 120 is obtained from layer 118 and provided to data evaluation layer 104. Again, this can be done by processor 140 (or another processor) using a wireless link (such as a near field communication link, a cellular telephone link, a Wi-Fi link, or another wireless link), or using a variety of hard wired links. Data evaluation layer 104 illustratively includes comparison components 150, one or more classifier components 152, and it can include other components 154 as well. It will be appreciated that, in one embodiment, derived data 120 is illustratively associated with a specific user 101 either by processor 140, or in another way. For instance, when user 101 begins operating machine 102, it may be that processor 140 requests user 101 to enter authentication information (such as a username and password, a personal mobile device serial number, a carried token such as an RFID badge, or other authentication information) when user 101 attempts to start up machine 102. In that way, processor 140 can identify the particular user 101 corresponding to CAN data 142 and derived data 120.

Layer 104 includes comparison components 150, classifier components 152, other components 154 and processor 155. Comparison components 150 illustratively compare the derived data 120 for this operator 101 against reference data stored in reference data store 114. The reference data can include a plurality of different reference data sets 156 and it can also include user preferences 158, which are described in greater detail below. The reference data sets can be used to compare the derived data 120 of user 101 against the user's historical derived data, against data for other operators in the same fleet as user (or operator) 101, or against another set of relevant reference data. In any case, comparison components 150 illustratively perform a comparison of derived data 120 against reference data sets 156. They provide an output indicative of that comparison, and classifier components 152 illustratively classify that output into one of a plurality of different performance ranges (such as good, medium or poor, although these are exemplary and more, fewer, or different ranges can be used). In one embodiment, for instance, comparison component 150 and classifier components 152 comprise fuzzy logic components that employ fuzzy logic to classify the received values into a good category, a medium category or a poor category, based on how they compare to the reference data. In another embodiment, classifier components 152 provide an output value in a continuous rating system. The output value lies on a continuum between good and poor, and indicates operator performance. In the present description, categories are described, but this is for the sake of example only. These categories indicate whether the performance of user 101, characterized by the received derived data values, indicate that the performance of user 101 in operating machine 102 is good, medium or poor, relative to the reference data set to which it was compared.

The classified evaluation values 122 are then provided to pillar score generation layer 106. In the embodiment shown in FIG. 2, pillar score generation layer 106 includes performance pillar score generators 160, supporting pillar score generators 162 and processor 163. Performance pillar score generators 160 illustratively include generators that generate pillar scores corresponding to performance pillars that better characterize the overall performance of machine 102 and/or operator 101 in various performance categories. In one embodiment, the pillar scores are generated for productivity, power utilization, fuel economy, material loss and material quality. Supporting pillar score generators 162 illustratively generate scores for supporting pillars that, to some degree, characterize the performance, but perhaps less so than the pillar scores generated by generators 160. Thus, supporting pillar scores include scores for logistics and uptime.

It can thus be seen that, in the present embodiment, performance pillar score generators 160 include productivity score generator 164, power utilization score generator 166, fuel consumption score generator 168, material (e.g., grain) loss score generator 170, and material (e.g., grain) quality score generator 172. Supporting pillar score generators 162 illustratively include logistics score generator 174 and uptime information generator 176.

As one example, productivity score generator 164 can include logic for generating a score based on an evaluation of a productivity versus yield slope in evaluation values 122.

Power utilization score generator 166 illustratively considers information output by the fuzzy logic classifiers 152 in layer 104 that are indicative of an evaluation of the engine power used by machine 102, under the control of user (or operator) 101. It thus generates a supporting pillar score indicative of that evaluation.

Fuel economy score generator 168 can be a logic component that considers various aspects related to fuel economy, and outputs a score based on those considerations. By way of example, where machine 102 is a combine, fuel economy score generator 168 can consider the separator efficiency, the harvest fuel efficiency, and non-productive fuel efficiency that are output by the fuzzy logic components in data evaluation layer 104. Material loss score generator 170 can include items such as the crop type, the measured loss on machine 102 using various loss sensors, an evaluation of the loss using fuzzy logic components, and an evaluation of the tailings, also using fuzzy logic components 152 in data evaluation layer 104. Based upon these considerations, material loss score generator 170 generates a material loss score indicative of the performance of machine 102 (under the operation of user 101) with respect to material loss.

Material quality score generator 172 illustratively includes evaluation values 122 provided by the fuzzy logic components 152 in layer 104 that are indicative of an evaluation of material other than grain that has been harvested, whether the harvested product (such as the corn or wheat) is broken or cracked, and whether the harvested product includes foreign matter (such as cob or chaff), and it can also include evaluation values 122 that relate to the size and quality of the residue expelled from machine 102.

Logistics score generator 174 can include logic that evaluates the performance of the machine 102 during different operations. For instance, it can evaluate the performance of the machine (under the operation of user 101) during unloading, during harvesting, and during idling. It can also include measures such as the distance that the machine traveled in the field and on the road, an individual percentage breakdown in terms of total time, field setup (passes vs. headlands), and other information. This is but one example.

Uptime information generator 176 illustratively generates uptime information (such as a summary) either based on evaluation values 122 provided by layer 104, or based on derived data 120 that has passed through layer 104 to layer 106. The uptime supporting information can be indicative of the performance of the machine based on how much time it is in each machine state, and it can also illustratively consider whether any alert codes or diagnostic trouble codes were generated, and how often they were generated, during the machine operation. In another embodiment only alerts and diagnostics trouble codes that impact the performance are considered. The uptime information is illustratively provided to (or available to) other items in architecture 100, as context information.

All of the pillar scores and supporting pillar scores (indicated by 124 in FIG. 2) are illustratively provided to pillar score aggregation layer 108. Layer 108 illustratively includes an aggregator component 180, composite score generator 182, recommendation engine 184 (that accesses recommendation rules 185), processor 186 and report generator 188. Aggregator component 180 illustratively aggregates all of the pillar scores and supporting pillar scores 124 using a weighting applied to each score. The weighting can be based on user preferences (such as if the user indicates that fuel economy is more important than productivity), they can be default weights, or they can be a combination of default weights and user preferences or other weights. Similarly, the weighting can vary based upon a wide variety of other factors, such as crop type, crop conditions, geography, machine configuration, or other things.

Once aggregator component 180 aggregates and weights the pillar scores 124, composite score generator 182 illustratively generates a composite, overall score, for operator 101, based upon the most recent data received from the operation of machine 102. Recommendation engine 184 generates actionable recommendations which can be performed in order to improve the performance of operator 101. Engine 184 uses the relevant information, pillar score 124, evaluation scores 124 and other information as well as, for instance, expert system logic, to generate the recommendations. This is described in greater detail below with respect to FIG. 4A. The recommendations can take a wide variety of different forms.

Once the composite score and the recommendations are generated, report generator component 188 illustratively generates a performance report 110 indicative of the performance of machine 102 and/or operator 101. Performance report 110 can be generated periodically, at the request of a manager, at the request of operator 101, or another user, it can be generated daily, weekly, or in other ways. It can also be generated on-demand, while operation is on-going. In one embodiment, performance report 110 illustratively includes a composite score 190 generated by composite score generator 182 and the recommendations 192 generated by recommendation engine 194. Layer 108 can also illustratively generate performance data 112 that is passed back to machine 102 to adjust the control of machine 102 in order to improve the overall performance.

Report 110 can, in one embodiment, be loaded onto a device so it can be viewed in real time by operator 101, in the operating compartment of vehicle 102, or it can be viewed in real time by a farm manger or others, it can be stored for later access and viewing by operator 101 or other persons, or it can be transmitted (such as through electronic mail or other messaging transmission mechanisms) to a main office, to a farm manager, to the user's home computer, or it can be stored in cloud storage. In one embodiment, it can also be transmitted back to a manufacturer or other training center so that the training for operator 101 can be modified based on the performance reports, or it can be used in other ways as well. Further, the report format and content can be tailored to the intended audience and viewing conditions.

Figure 3:
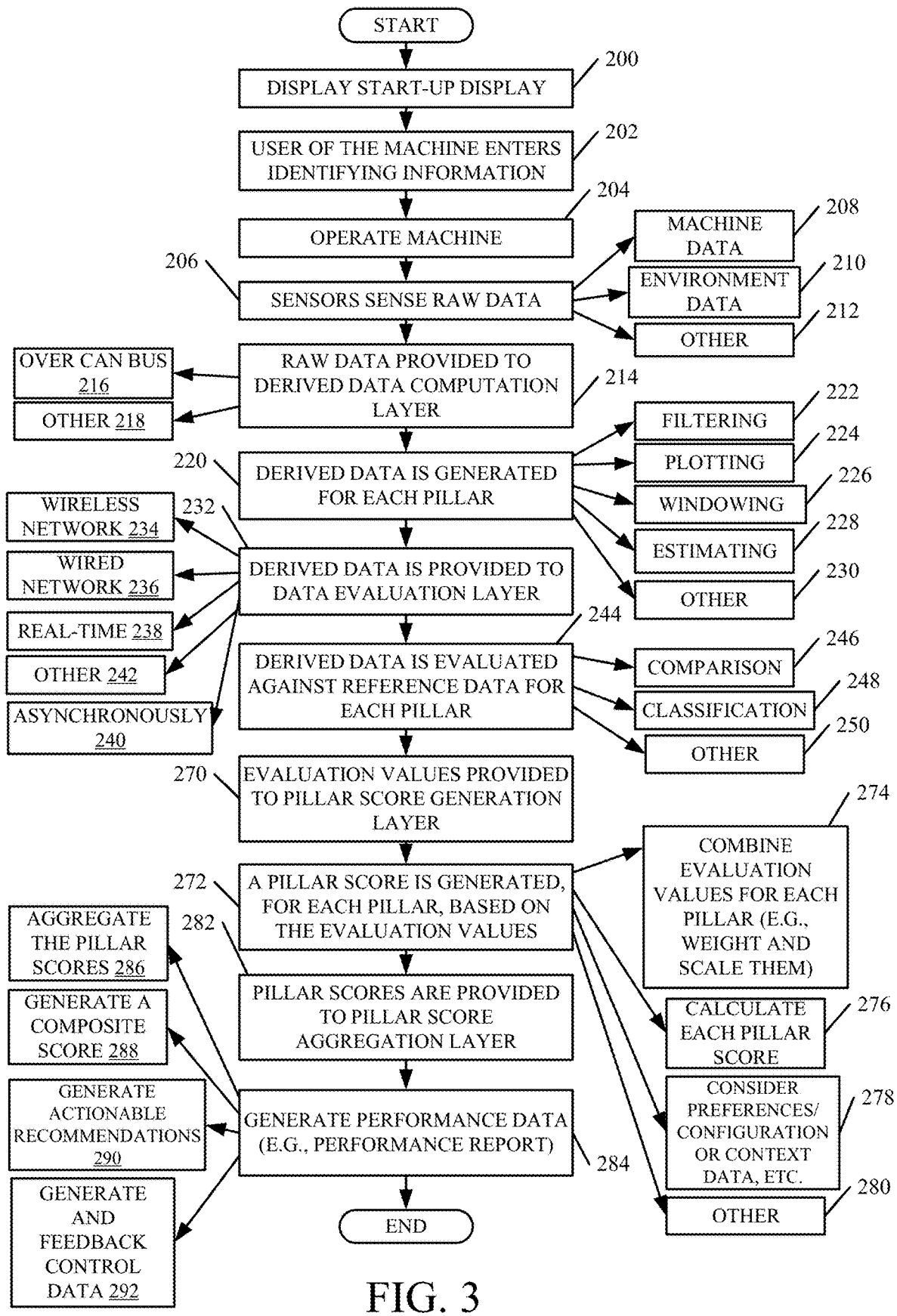
FIG. 3 is a flow diagram illustrating one embodiment of the operation of the architecture shown in FIGS. 1 and 2, in computing performance data indicative of machine performance.

FIG. 3 is a flow diagram illustrating one embodiment of the overall operation of the architecture shown in FIG. 2 in generating a performance report 110. FIG. 3 will now be described in conjunction with FIGS. 2 and 4. Then, FIGS. 5A-5G will be described to show a more detailed embodiment of portions of architecture 100 used to generate performance pillar scores.

In one embodiment, processor 140 first generates a startup display on user interface display device 141 to allow user 101 to start machine 102. Displaying the startup display is indicated by block 200 in FIG. 3. The user 101 then enters identifying information (such as authentication information or other information). This is indicated by block 202. User 101 then begins to operate machine 102. This is indicated by block 204.

As user 101 is operating the machine, the sensors in raw data sensing layer 116 sense the raw data and provide signals indicative of that data to derived data computation layer 118. This is indicated by block 206 in the flow diagram of FIG. 3. As briefly discussed above, the data can include machine data 208 sensed by machine sensors 130-132. It can also include environmental data 210 sensed by environment sensors 134-136, and it can include other data 212 provided by other machine data sources 138. Providing the raw data to derived data computation layer 118 is indicated by block 214 in FIG. 3. As discussed above, this can be over a CAN bus as indicated by block 216, or in other ways as indicated by block 218.

Derived data 120 is then generated by the components 144, 146 and 148 in layer 118. The derived data is illustratively derived so that data evaluation layer 104 can provide evaluation data used in generating the pillar scores. Deriving the data for each pillar is indicated by block 220 in FIG. 3. This can include a wide variety of computations, such as filtering 222, plotting 224, windowing 226, estimating 228 and other computations 230.

The derived data 120 is then provided to data evaluation layer 104 which employs comparison components 150 and the fuzzy logic classifier components 152. Providing the data to layer 104 is indicated by block 232 in FIG. 3. It can be provided using a wireless network 234, a wired network 236, it can be provided in real time as indicated by block 238, it can be saved and provided later (such as asynchronously) 240, or it can be provided in other ways 242 as well.

Data evaluation layer 104 then evaluates the derived data against reference data, to provide information for each pillar. This is indicated by block 244 in FIG. 3. The data can be evaluated using comparison 246, using classification 248, or using other mechanisms 250.

Figure 4:
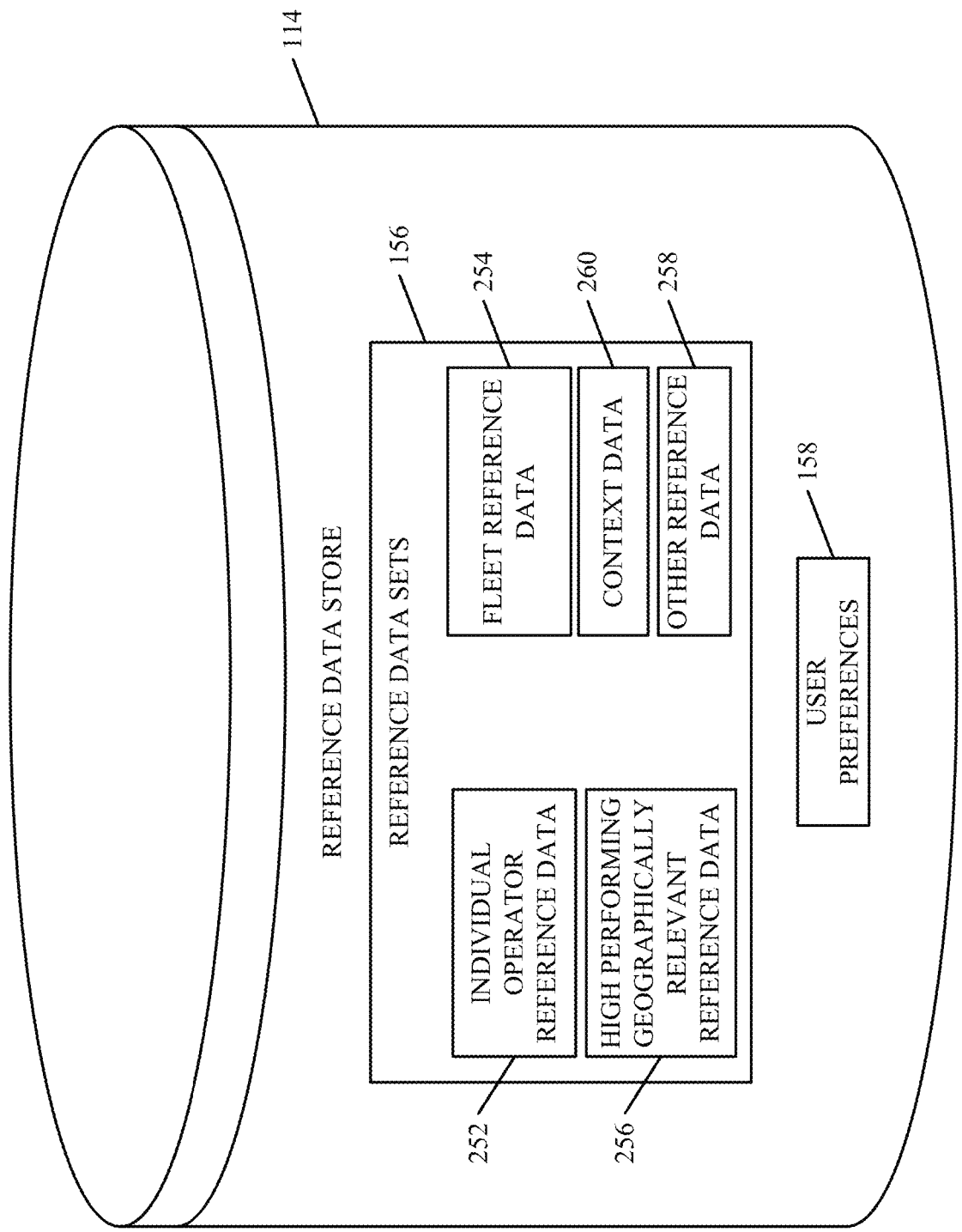
FIG. 4 shows one embodiment of a reference data store in greater detail.

In one embodiment, the comparison components 150 compare the derived data 120 for operator 101 against reference data. FIG. 4 shows a more detailed embodiment of reference data store 114. FIG. 4 shows that, in one embodiment, reference data sets 156 illustratively include individual operator reference data 252. Reference data 252 illustratively includes historical reference data for this specific operator 101. It can also include fleet reference data 254 which comprises reference data corresponding to all of the operators in the fleet to which operator 101 belongs. It can include high performing geographically relevant reference data 256 as well. This illustratively comprises reference data from other operators in a geographically relevant region (such as where the weather, soil type, field sizes, farming practices, etc. are similar to that where operator 101 resides). It can include performance data across various fleets, and the operators that generated the performance data can be identified or anonymous. To generate references for the fuzzy logic components, reference of data for medium and poor performing operations is used. However, comparisons can be made against only high performance data or other subsets of data as well. Also, the data can be for individual operators, or it can be aggregated into a single set of reference data (e.g., for all of the high performing operators in the geographically relevant region, etc.). Of course, it can include other reference data 258 as well.

Also, in the embodiment shown in FIG. 4, the reference data sets 156 illustratively include context data 260. The context data can define the context within which the reference data was gathered, such as the particular machine, the machine configuration, the crop type, the geographic location, the weather, machine states, other information generated by uptime information generator 176, or other information.

It will be noted that the reference data in store 114 can be captured and indexed in a wide variety of different ways. In one embodiment, the raw CAN data 142 can be stored along with the derived data 120, the evaluation values 122, user preferences 158, the pillar scores 124, context data and the recommendations. The data can be indexed by operator, by machine and machine head identifier, by farm, by field, by crop type, by machine state (that is, the state of the machine when the information was gathered, e.g., idle, idle while unloading, waiting to unload, harvesting, harvesting while unloading, field transport, road transport, headland turn, etc.), by settings state (that is, the adjustment settings in the machine including chop setting, drop settings, etc.), and by configuration state (that is, the hardware configuration of the machine). It can be indexed in other ways as well.

Once evaluation layer 104 performs the comparison against the reference data and classifies a measure of that comparison using fuzzy logic heuristics, the evaluation values 122 represent the results of the classification and are provided to pillar score generation layer 106. This is indicated by block 270 in FIG. 3. Pillar score generation layer 106 then generates a pillar score for each performance pillar (and the logistics supporting pillar), based on the plurality of evaluation values 122. This is indicated by block 272 in FIG. 3.

The pillar scores can be generated by combining the evaluation values for each individual pillar, and weighting and scaling them. Other methods like filtering or related data conditioning might be applied as well. This is indicated by block 274. A pillar score generator then calculates a pillar score for each performance pillar (e.g., each performance category) and supporting pillar (e.g., supporting performance category). This is indicated by block 276 in FIG. 3. In doing so, as discussed above, the pillar score generators can illustratively consider user preferences, machine configuration data, context data (e.g., the information generated by logistics information generator 176), or a wide variety of other context data or other data. This is indicated by block 278. The pillar scores can be generated in other ways 280 as well.

Pillar scores 124 are then provided to pillar score aggregation layer 108. This is indicated by block 282 in FIG. 3. Report generator component 188 then generates the performance reports 110 based upon the pillar scores, the composite scores, the underlying data, user preferences, context data and the recommendations. Generating the report 110 and performance data 112 is indicated by block 284. Doing this by aggregating the pillar scores is indicated by block 286, generating the composite score is indicated by block 288, generating actionable recommendations is indicated by block 290, and generating and feeding back the performance data 112 is indicated by block 292.

Figure 4A:
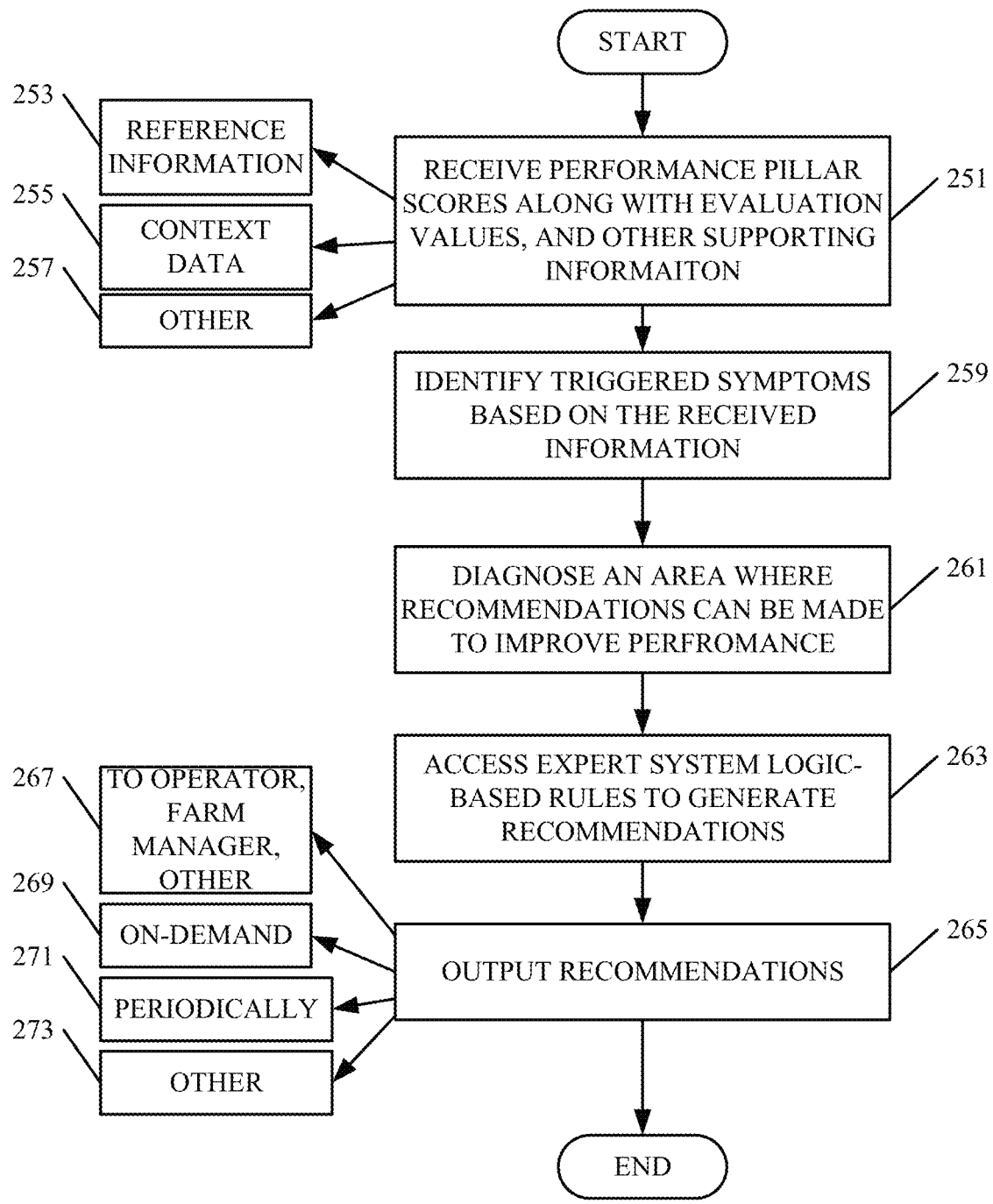
FIG. 4A is a flow diagram illustrating one embodiment of the operation of a recommendation engine.

Before discussing a more detailed implementation, the operation of recommendation engine 184 in generating recommendations will be described. FIG. 4A is a flow diagram showing one embodiment of this.

FIG. 4A shows a flow diagram illustrating one embodiment of the operation of recommendation engine 184 in FIG. 2. Recommendation engine 184 first receives the performance pillar scores 124, along with the evaluation values 122 and any other desired supporting information from the other parts of the system. This is indicated by block 251 in FIG. 4A. The other data can include reference information 253, context data 255, or a wide variety of other information 257.

Engine 184 then identifies symptoms that are triggered in expert system logic, based on all of the received information. This is indicated by block 259 shown in FIG. 4A.

The expert system logic then diagnoses various opportunities to improve performance based on the triggered symptoms. The diagnosis will illustratively identify areas where recommendations might be helpful in improving performance. This is indicated by block 261 in FIG. 4A.

Engine 184 then accesses expert system, logic-based rules 185 to generate recommendations. This is indicated by block 263. The rules 185 illustratively operate to generate the recommendations based on the diagnosis, the context information and any other desired information.

Engine 184 then outputs the recommendations as indicated by block 265. The recommendations can be output to farm managers or other persons, as indicated by block 267. They can be output on-demand, as indicated by block 269. They can be output intermittently or on a periodic basis (e.g., daily, weekly, etc.) as indicated by block 271, or they can be output in other ways as well, as indicated by block 273.

FIGS. 5A-5G show a more detailed implementation of architecture 100, in which machine 102 is a combine. FIGS. 5A-5G each show a processing channel in architecture 100 for generating a pillar score or a supporting pillar score. FIGS. 5A-5G will now be described as but one example of how architecture 100 can be implemented with a specific type of agricultural machine 102.

Figure 5A:
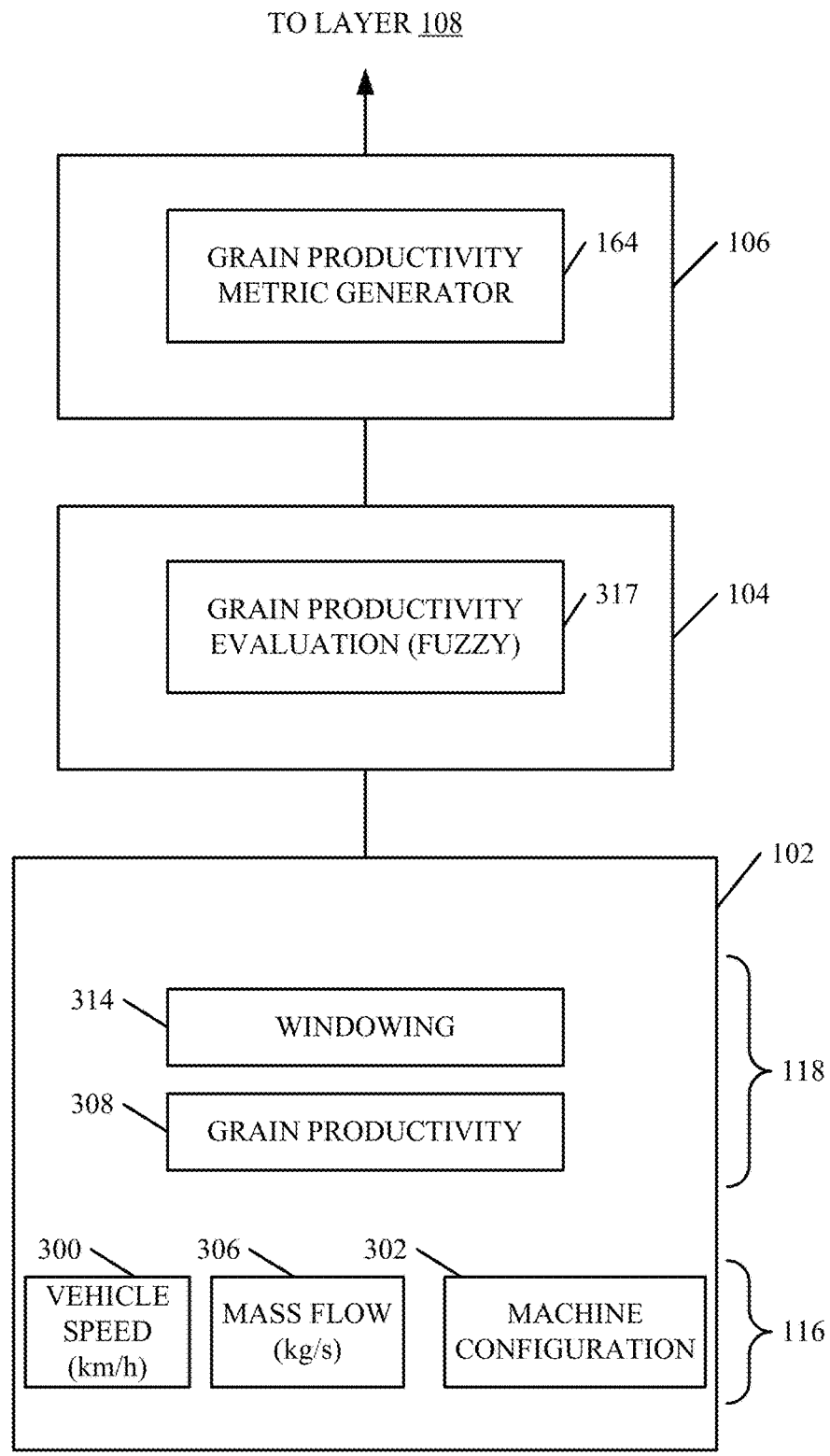
FIGS. 5A-5G are still more detailed block diagrams of example channels for generating different performance pillar scores.

FIG. 5A shows a processing channel in architecture 100 that can be used to generate the productivity pillar score. Some of the items shown in FIG. 5A are similar to those shown in FIG. 2, and they are similarly numbered. In the embodiment shown in FIG. 5A, machine sensors 130-132 in raw data sensing layer 116 illustratively include a vehicle speed sensor 300, a machine configuration identifier 302 and a crop sensor, such as a mass flow sensor 306 that measures mass flow of product through machine 102. The components in derived data computation layer 118 illustratively include components for generating derived data such as a productivity computation component 308 that calculates productivity that indicates the overall grain productivity of machine 102. This can be in tons per hour, tons per hectare or other units or a combination of such metrics. They also include a windowing component 314 that divides the data into temporal windows or time frames and provides it to layer 104.

Evaluation layer 104 illustratively includes a grain productivity fuzzy logic evaluation mechanism 317 that not only compares the output from layer 118 to the various reference data sets 156 in reference data store 114, but also classifies a measure of that comparison. In one embodiment, the output of layer 104 is illustratively a unitless number in a predefined range that indicates whether the operator performed in a good, average or poor range, relative to the reference data to which it was compared. Again, as mentioned above, the good, average or poor categories are exemplary only. Other outputs such as a continuous metric can be used or more, fewer, or different categories could be used as well.

FIG. 5A also shows that pillar score generation layer 106 illustratively includes a grain productivity metric generator that comprises the productivity score generator 164. Generator 164 receives the unitless output of layer 104 and generates a productivity pillar score 124 based on the input. The productivity score is indicative of the productivity performance of operator 101, based upon the current data. This information is provided to layer 108.

Figure 5B:
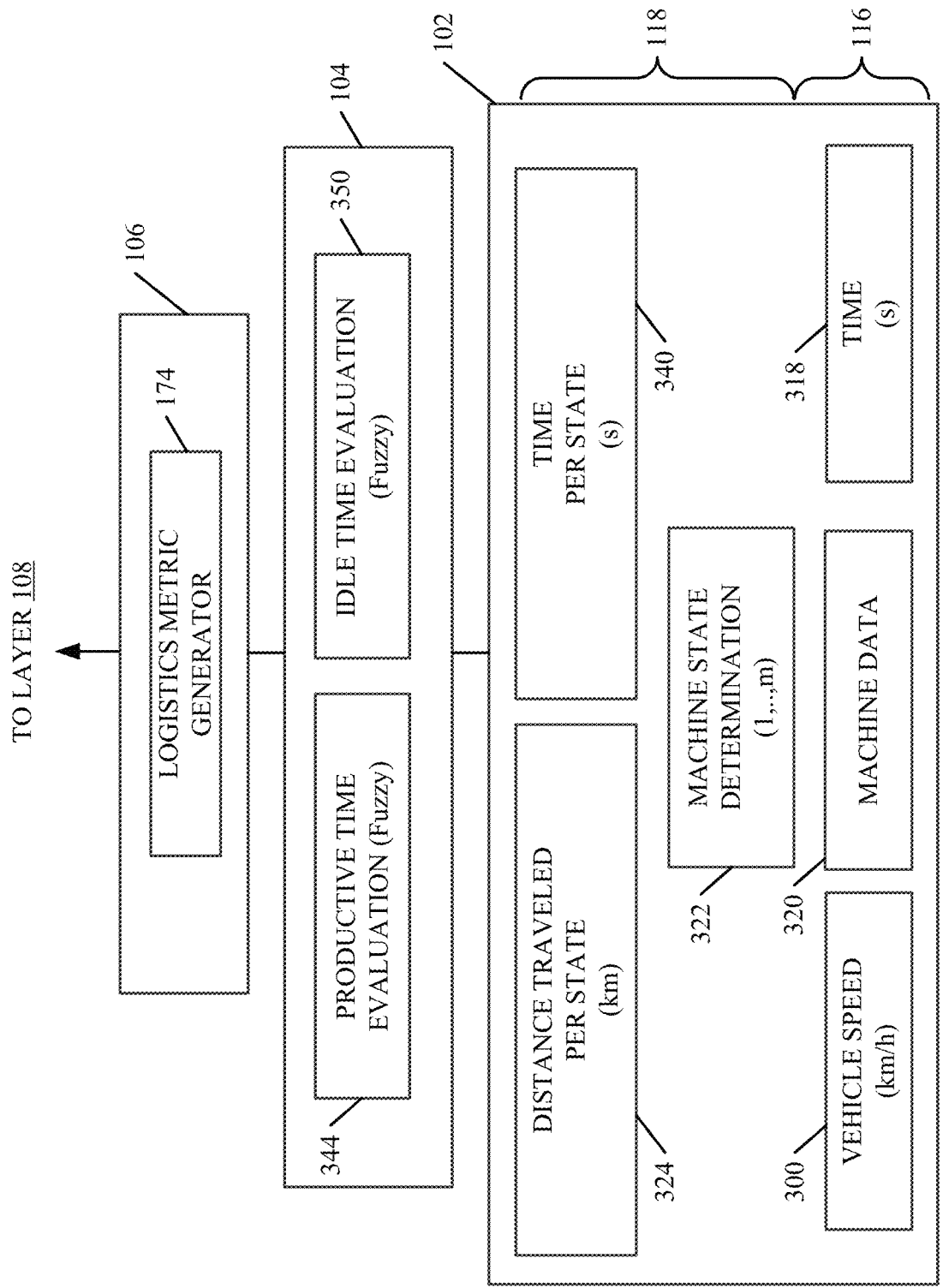

FIG. 5B shows one embodiment of a processing channel in architecture 100 that can be used to generate the logistics supporting pillar score. Some of the items shown in FIG. 5B are similar to those shown in FIG. 2, and they are similarly numbered. FIG. 5B shows that layer 116 includes a time sensor 318 that simply measures the time that machine 102 is running. It also includes a machine state data 320 that identifies when machine 102 is in each of a plurality of different states. A vehicle speed sensor 300 is also shown, although it is already described with respect to FIG. 5A. It can also be a separate vehicle speed sensor as well. Derived data computation layer 118 illustratively includes machine state determination component 322. Based on the machine state data received by sensor 320, component 322 identifies the particular machine state that machine 102 resides in, at any given time. The machine state can include idle, harvesting, harvesting while unloading, among a wide variety of others.

Components in layer 118 also illustratively include a plurality of additional components. Component 324 measures the distance machine 102 travels in each traveling state. Component 340 computes the time machine 102 is in each state. The times can illustratively computed in relative percentages or in units of time.

The output of components 324 and 340, are provided to fuzzy logic components 344 and 350 that compares the data provided by components 324 and 340 against reference data for productive time and idle time and evaluates it against that reference data. Again, in one embodiment, the output of the fuzzy logic components is a unitless value in a predetermined range that indicates whether the performance of operator 101 was good, average or poor relative to the reference data. Layer 104 can include other components for generating other outputs, and it can consider other information from layers 116 and 118 or from other sources.

Logistics metric generator 166 illustratively computes a logistics metric, in the embodiment shown in FIG. 5B, based upon all of the inputs illustrated. The logistics metric is a measure of the operator's logistics performance based on the various comparisons against the reference data sets, and it can be based on other things as well.

Figure 5C:
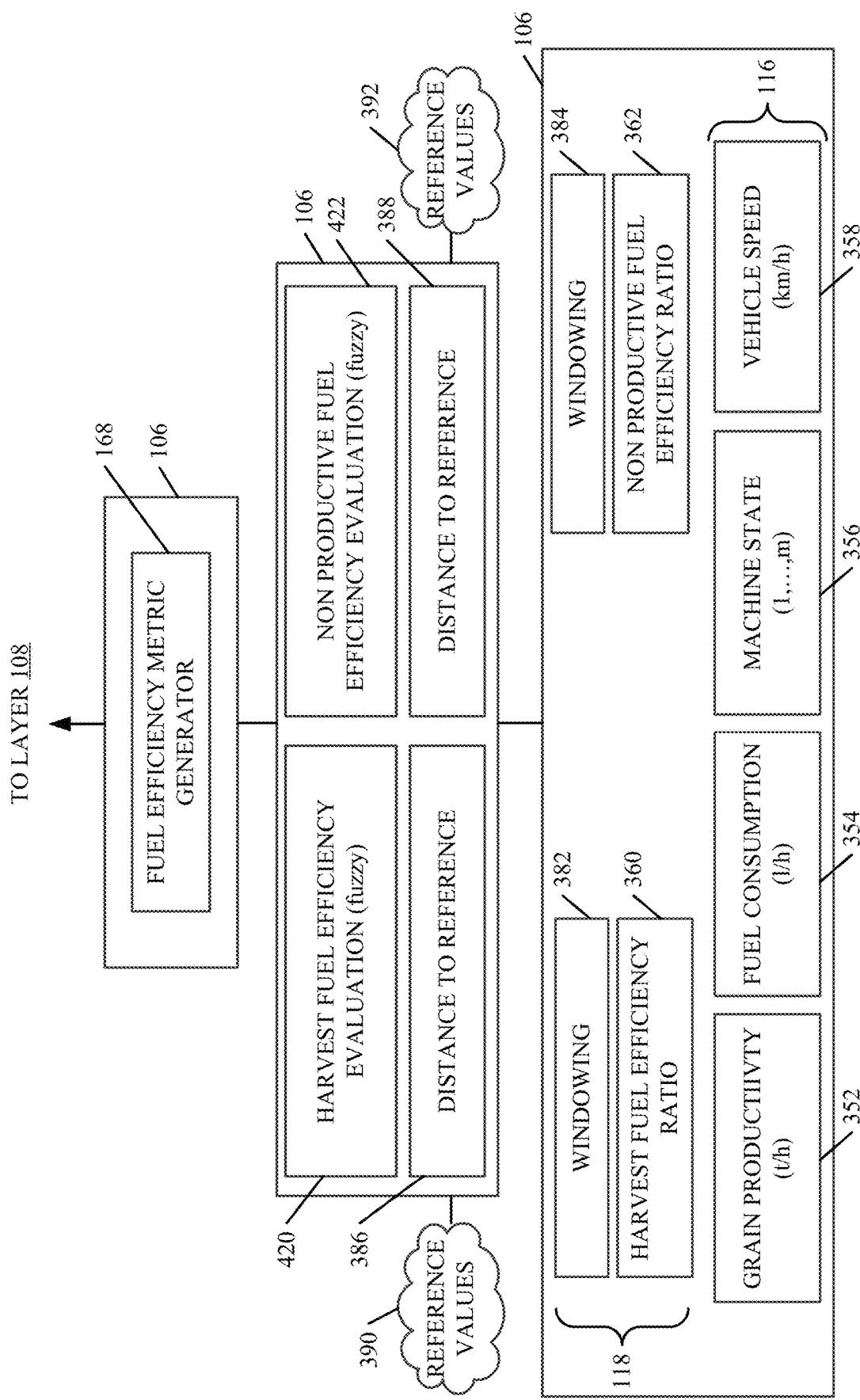

FIG. 5C shows a block diagram of one implementation of a computing channel in architecture 100 for calculating the fuel economy performance pillar score. In the embodiment shown in FIG. 5C, layer 116 illustratively includes a grain productivity sensor (or calculator) 352 that senses (or calculates) grain productivity for the combine (e.g., machine 102). It can be the same as component 308 in FIG. 5A or different. It can provide an output indicative of grain productivity in a variety of different measures or units. It also includes a fuel consumption sensor 354 that measures fuel consumption in units of volume per unit of time. It includes a machine state identifier 356 that identifies machine state (this can be the same as component 322 in FIG. 5B or different), a vehicle speed sensor 358 that measures vehicle speed (which can be the same as sensor 300 in FIG. 5A or different).

Layer 118 includes component 360 that calculates a harvest fuel efficiency ratio for harvesting states and component 362 calculates a non-productive fuel efficiency ratio for non-productive states.

Windowing components 382 and 384 break the data from components 360 and 362 into discrete timeframes. Layer 104 includes average distance components 386 and 388 which receive inputs from reference functions 390 and 392 and output an indication of the distance of the lines fit to the data output by components 382 and 384 from reference functions 390 and 392.

Layer 104 illustratively includes a harvest fuel efficiency evaluator 420, and a non-productive fuel efficiency evaluator 422. Component 420 receives the output from component 386 (and possibly other information) and compares it against reference data, evaluates the measure of that comparison and outputs a value that is indicative of the performance of operator 101 in terms of harvest fuel efficiency. Component 422 does the same thing for non-productive fuel efficiency.

Layer 106 in FIG. 5C illustratively includes a fuel economy metric generator as fuel economy score generator 168 (shown in FIG. 2). It receives the inputs from components 420 and 422 and can also receive other inputs and generates a fuel economy pillar score for operator 101. The fuel economy pillar score is indicative of the fuel economy performance of operator 101, based on the current data collected from machine 102, as evaluated against the reference data.

Figure 5D:
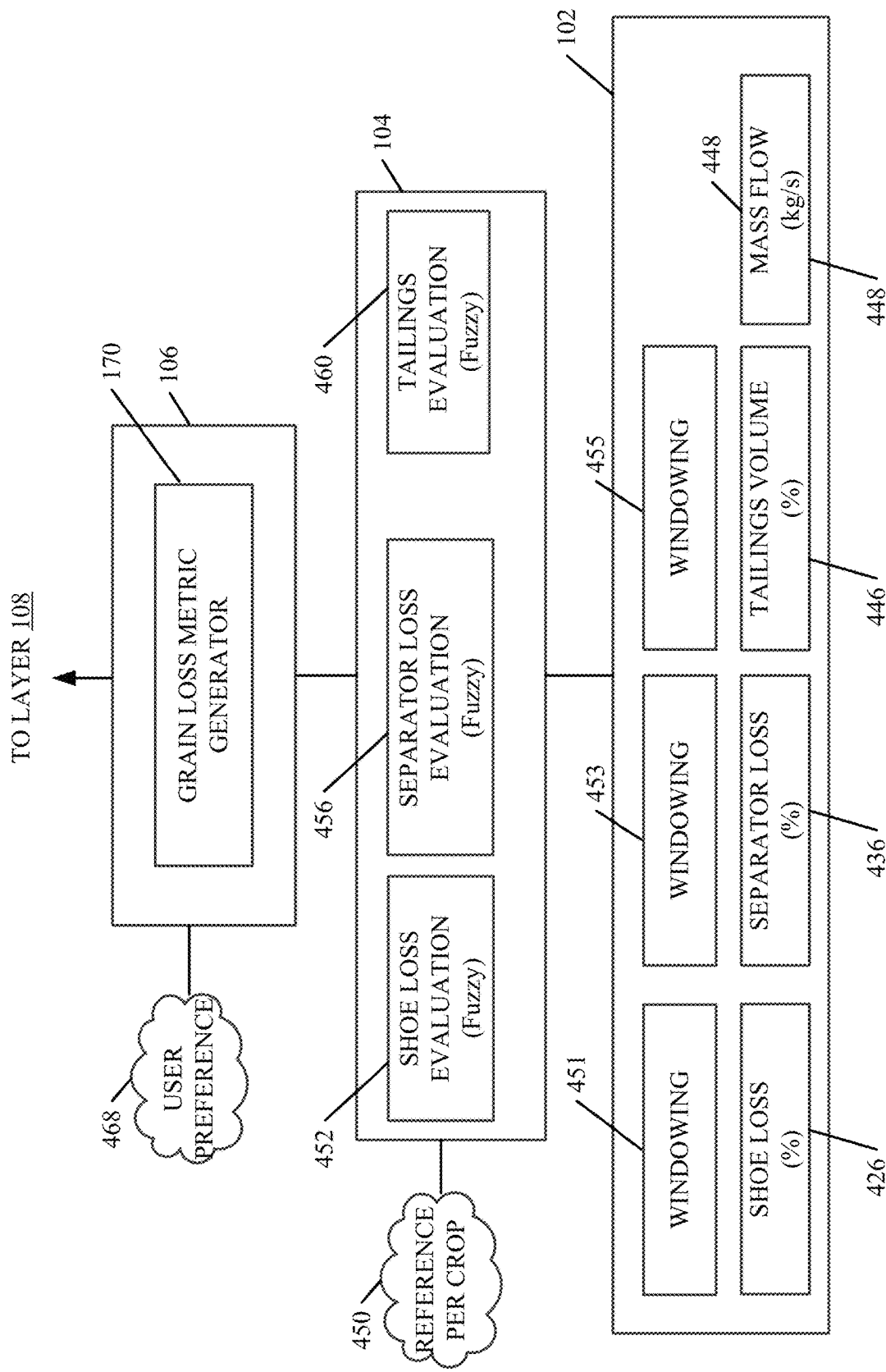

FIG. 5D shows one embodiment of a computing channel in architecture 100 shown in FIG. 2 for calculating the material loss performance pillar score. It can be seen that material loss score generator 170 (from FIG. 2) comprises grain loss metric generator 170 shown in FIG. 5D. In the embodiment shown in FIG. 5D, layer 116 includes a left hand shoe loss sensor component 426 that senses show loss and calculates a total percentage of shoe loss. It also includes separator loss sensor 436 that senses separator loss and computes a total percentage of separator loss, a tailings volume sensor 446 that senses a volume of tailings, and mass flow sensor 448. Sensor 448 can be the same as sensor 306 in FIG. 5A or different.

Windowing components 451, 453 and 455 receive inputs from components 426, 436 and 448 and break them into discrete time windows. These signals can be filtered and are provided to layer 104. Data evaluation layer 104 illustratively includes shoe total loss evaluator 452, separator total loss evaluator 456, and a tailings evaluator 460.

Total shoe loss evaluator 452 illustratively comprises a fuzzy logic component that receives the total shoe loss from component 451 in layer 118 and compares that against total shoe loss reference data from data store 114. It then evaluates the measure of that comparison to provide a unitless value indicative of whether the performance of operator 101, in terms of total shoe loss, is classified as good, average or poor.

Similarly, separator total loss evaluator 456 each comprises a fuzzy logic component that receives the total separator loss from component 453 and compares it against reference data for total separator loss, and then evaluates the measure of that comparison to determine whether the performance of operator 101, in terms of total separator loss, is classified as good, average or poor.

Tailings evaluator 460 is illustratively a fuzzy logic component that receives an input from component 455, that is indicative of tailings volume and perhaps productivity. It then compares those items against tailings reference data in data store 114 and classifies the measure of that comparison into a good, average or poor classification. Thus, component 460 outputs a unitless value indicative of whether the performance of operator 101, in terms of tailings evaluation, is good, average or poor.

It can also be seen in FIG. 5D that, in one embodiment, all of the evaluator components 452, 456 and 460 receive an input from crop type component 450. Component 450 illustratively informs components 452, 456 and 460 of the crop type currently being harvested. Thus, the evaluator components 452, 456 and 460 can consider this in making the comparisons and classifications, relative to reference data.

Grain loss metric generator 170 receives inputs from the various evaluator components in layer 104 and aggregates those values and computes a performance pillar score for material loss. In doing so, generator 170 illustratively considers user preferences 468 that are provided, relative to material loss. These can be provided in terms of a total percentage, or otherwise. They illustratively indicate the importance that the user places on the various aspects of this particular performance pillar. The output of generator 170 is thus an overall material loss performance score that indicates how operator 101 performed in terms of material loss.

Figure 5E:
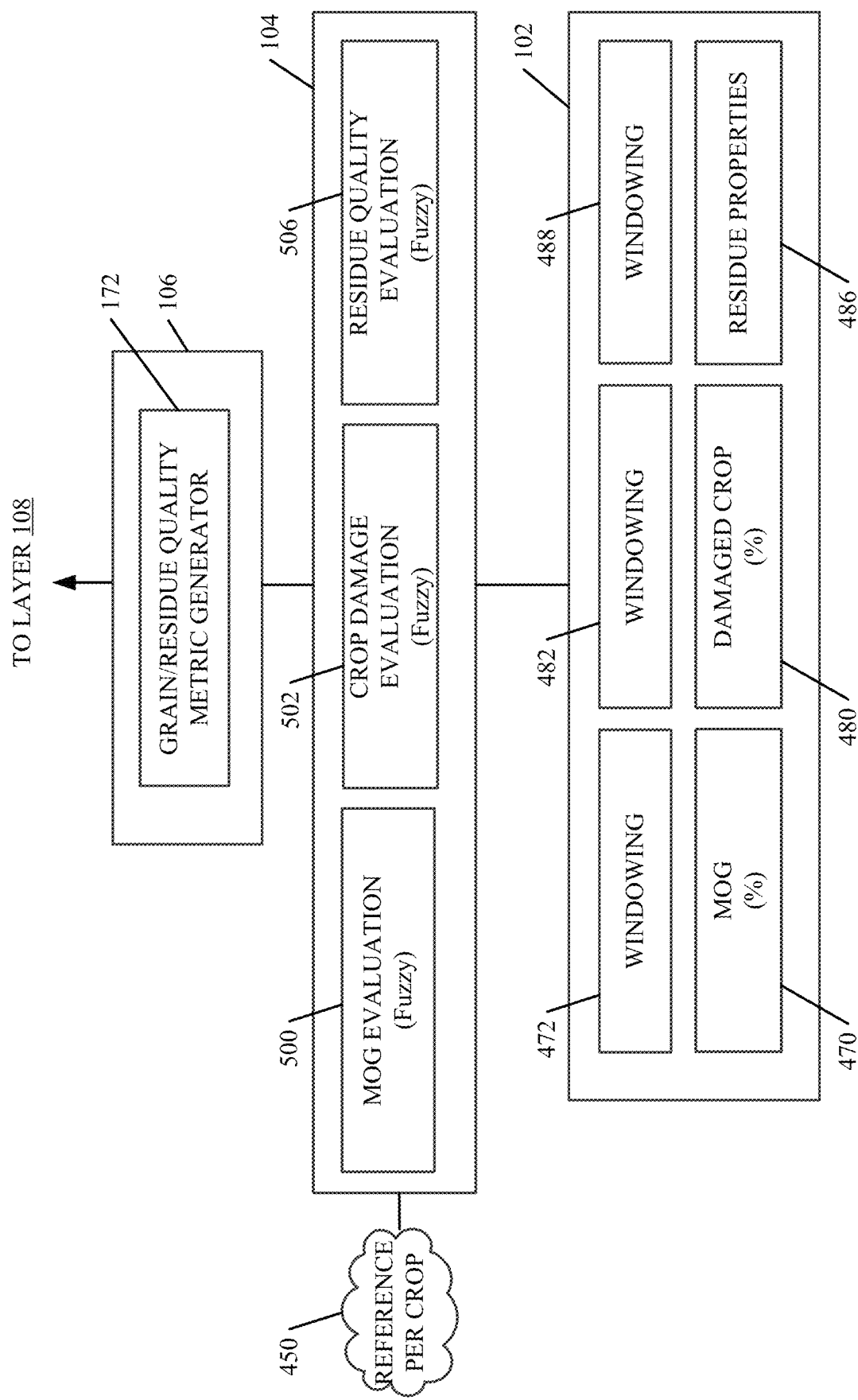

FIG. 5E is a more detailed block diagram showing one embodiment of a computing channel in architecture 100 to obtain a performance pillar score for material quality. Thus, it can be seen that material quality score generator 172 shown in FIG. 2 comprises grain/residue quality metric generator 172 shown in FIG. 5E. FIG. 5E shows that, in one embodiment, raw data sensing layer 116 includes sensor 470 that senses the types of material in the grain elevator. Sensor 470 illustratively senses the volume of material, other than grain, (such as chaff and cobs). Damaged crop sensor 480 illustratively senses the percent of material that is damaged (such as broken, crushed or cracked).

Residue properties sensor 486 can sense various properties of residue. The properties can be the same or different depending on whether the combine is set to chop or windrow.

FIG. 5E shows that derived data computation layer 118 illustratively includes components 472, 482 and 488 that filters the signals from sensors 470, 480 and 486. This can be breaking signals into temporal windows and calculating a representative value for each window or otherwise.

In the embodiment shown in FIG. 5E, data evaluation layer 104 illustratively includes a material other than grain evaluator 500, a crop damage evaluator 502, and a residue quality evaluator 506. It can be seen that components 500, 502 and 508 can all illustratively be informed by user preferences with respect to grain quality thresholds or by reference data 450 for the specific crop type.

In any case, evaluator 500 illustratively receives the input from component 472 in layer 118 and compares the filtered material other than grain value, for light material, against corresponding reference data in data store 114. It then classifies the result of that comparison into a good, average or poor class. The class is thus indicative of whether the performance of operator 101, in terms of material other than grain in the grain elevator, is good, average or poor.

Crop damage evaluator 502 receives the input from component 482 in layer 118 that is indicative of a percent of product in the grain elevator that is damaged. It compares that information against corresponding reference data from reference data store 114 and classifies the result of that comparison into a good, average or poor class. It thus provides a value indicative of whether the performance of operator 101, in terms of the product in the grain elevator being damaged, is good, average or poor.

Residue quality evaluator 506 receives inputs from component 488 in layer 116 and 118 and compares those inputs against corresponding reference data in reference data store 114. It then classifies the result of that comparison into a good, average or poor class. Thus, it provides an output indicative of whether the performance of operator 101, in terms of residue quality, is good, average or poor.

Grain/residue quality metric generator 172 receives inputs from the various components in layer 104 and uses them to calculate a grain/residue quality score for the material quality performance pillar. This score is indicative of the overall performance of operator 101, in operating machine 102, in terms of grain/residue quality. The score is illustratively provided to layer 108.

Figure 5F:
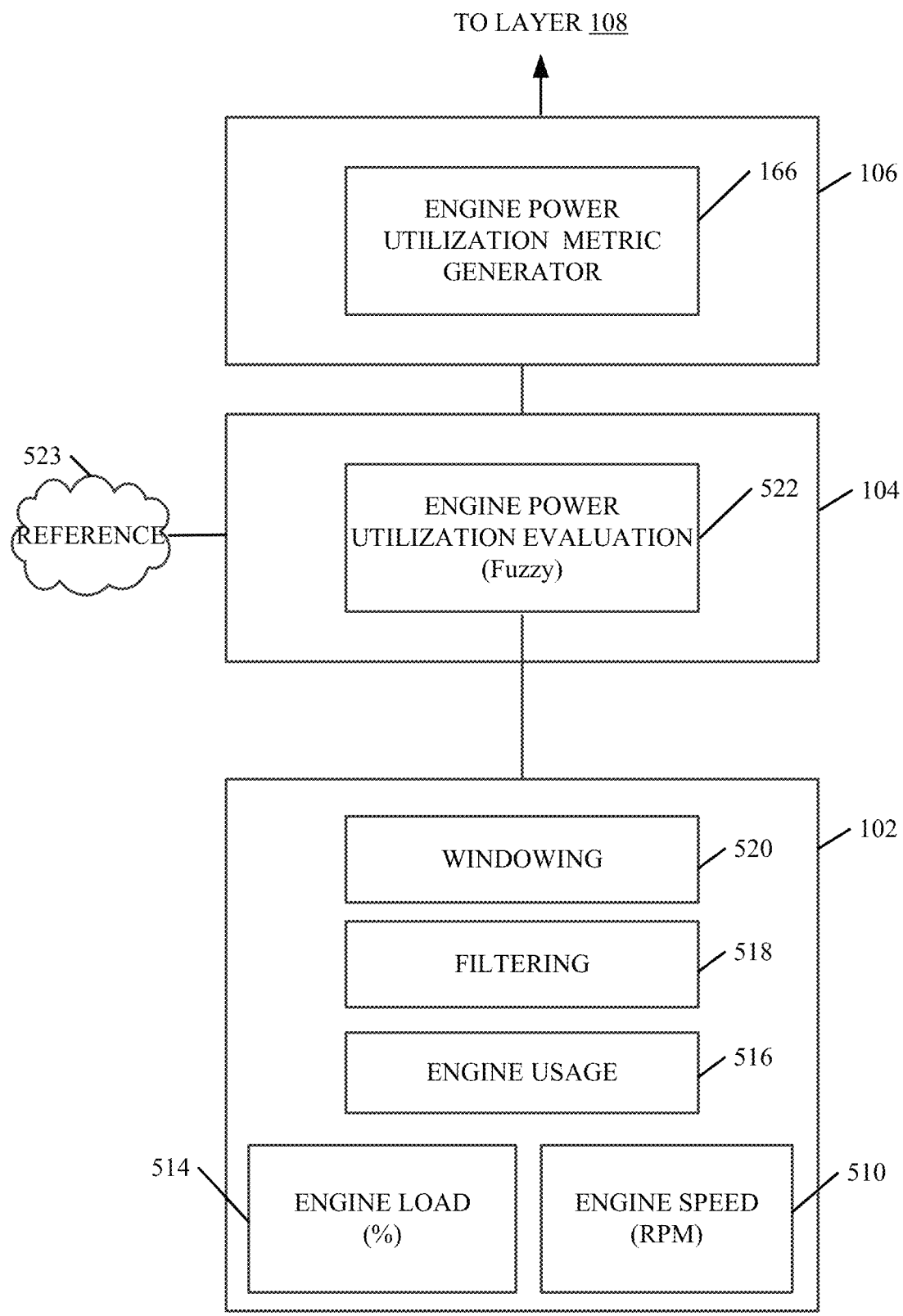

FIG. 5F shows one embodiment of a processing channel in architecture 100 shown in FIG. 2, to calculate the engine power utilization score for the power utilization pillar, on a combine. Thus, power utilization score generator 166 is shown in FIG. 5F. In the embodiment shown in FIG. 5F, raw data sensing layer 116 illustratively includes engine speed sensor 510, and an engine load sensor 514. Layer 118 illustratively includes an engine usage component 516 that receives the inputs from sensors 510 and 514 and calculates engine usage (such as power in kilowatts). Filtering component 518 filters the value from component 518. Windowing component 520 breaks the output from component 518 into discrete temporal windows.

The output from component 520 is provided to layer 104 which includes engine power utilization evaluator 522. Engine power utilization evaluator 522 is illustratively a fuzzy logic component that receives the output from component 520 in layer 118 and compares it against engine power utilization reference data 523 in reference data store 114. It then classifies the result of that comparison into a good, average or poor class. Thus, the output of component 522 is a unitless value that indicates whether the performance of operator 101, in terms of engine power utilization is good, average or poor.

Score generator 174 receives the output from evaluator 522 and calculates a performance pillar score for engine power utilization. The output from component 174 is thus a performance pillar score indicative of whether the overall performance of operator 101, in operating machine 102, is good, average or poor in terms of engine power utilization. The score is illustratively provided to layer 108.

Figure 5G:
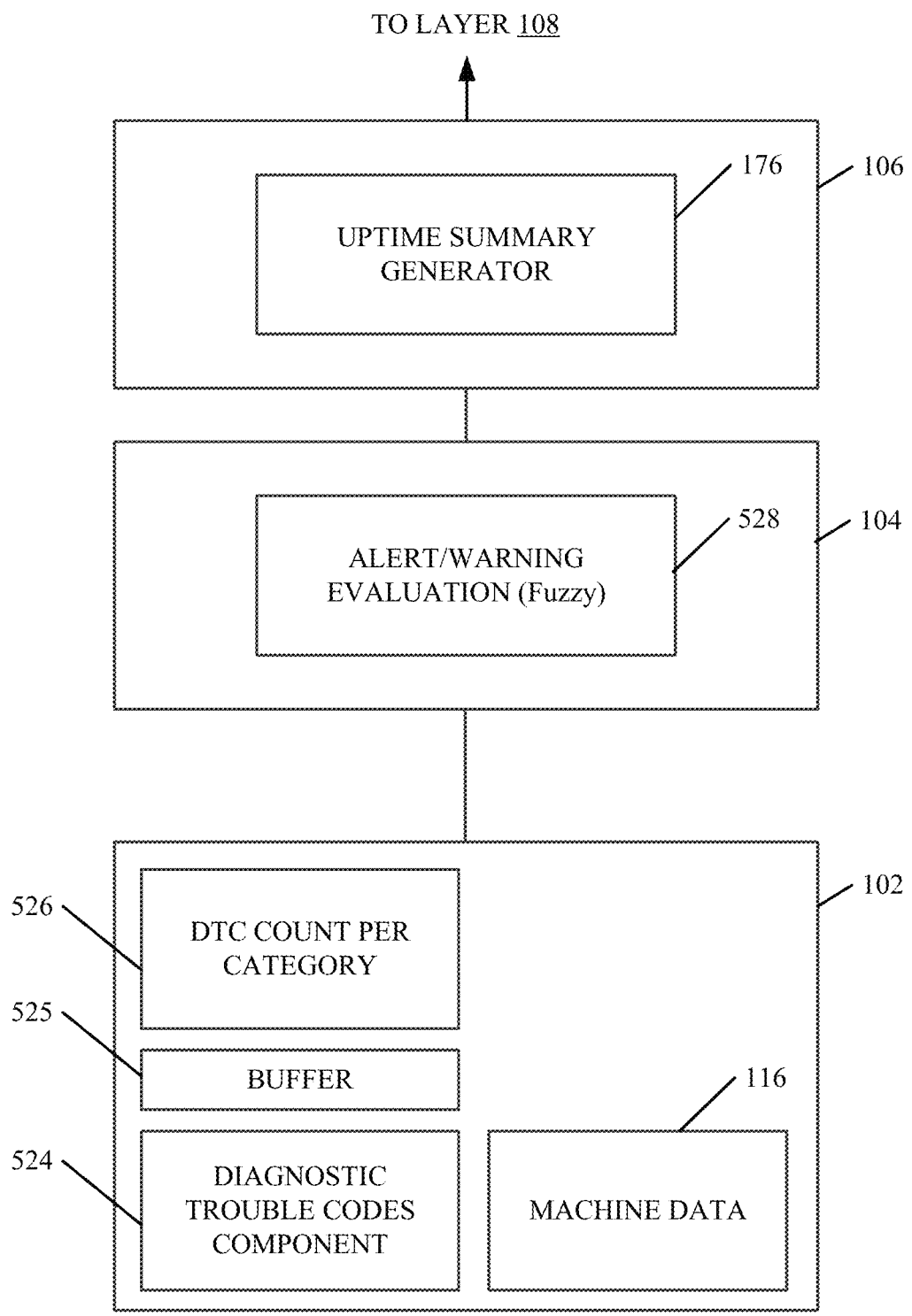

FIG. 5G is a more detailed block diagram showing one embodiment of the architecture 100 shown in FIG. 2 in generating the uptime summary In the embodiment shown in FIG. 5G, layer 116 includes machine data sensor 116. Machine data sensor 116 illustratively senses a particular machine state that machine 102 is in, and the amount of time it is in a given state. It can also sense other things.

Layer 118 illustratively includes a diagnostic trouble code (DTC) component 524 that generates various diagnostic trouble codes, based upon different sensed occurrences in machine 102. They are buffered in buffer 525. DTC count component 526 calculates the number of DTC occurrences per category, and the number and frequency of occurrence of various alarms and warnings indicated by machine data 116. By way of example, component 526 may calculate the number of times the feeder house gets plugged or the number of other alarms or warnings that indicate that machine 102 is undergoing an abnormally high amount of wear. The alarms and warnings can be event based, time based (such as how many separator hours the machine has used), or based on other things.

Layer 104 includes alert/warning evaluator 528 that compares the various information from machine 102 against reference data to generate information indicative of the operator's performance. The information is provided to summary generator 176.

Uptime summary generator 176 in layer 106 receives the outputs from component 528 and uses them to generate uptime summary information indicative of the performance of operator 101, in operating machine 102, in terms of uptime. The uptime summary information can be provided to layer 108, or used by other parts of the system, or both.

As mentioned above, due to the complexity of the work machine, it can be difficult to determine what adjustment actions (e.g., setting changes, configuration changes, etc.) can be made to optimize or otherwise improve the machine operation. This problem is exacerbated when a user (e.g., an operator, remote user, etc.) desires to target a particular operational aspect, such as a particular performance category (e.g., fuel consumption, productivity, power utilization, material loss, material quality, etc.), for improvement.

For sake of illustration, but not by limitation, an operator may desire to target machine control for increased or optimized productivity, so the operator can finish their work in the most time efficient manner. For example, in the case of a combine harvester, suppose that the operator is aware of bad weather approaching (or some other factor that necessitates completing the harvesting operation quickly). In this case, the operator desires to adjust the machine settings (e.g., speed, etc.) and/or configuration to increase productivity. Another example, it may be that time is not a significant issue, but fuel costs are significantly high, so the operator may want to adjust the machine settings to optimize or otherwise increase fuel efficiency/decrease fuel consumption. These, of course, are by way of example only.

Figure 6:
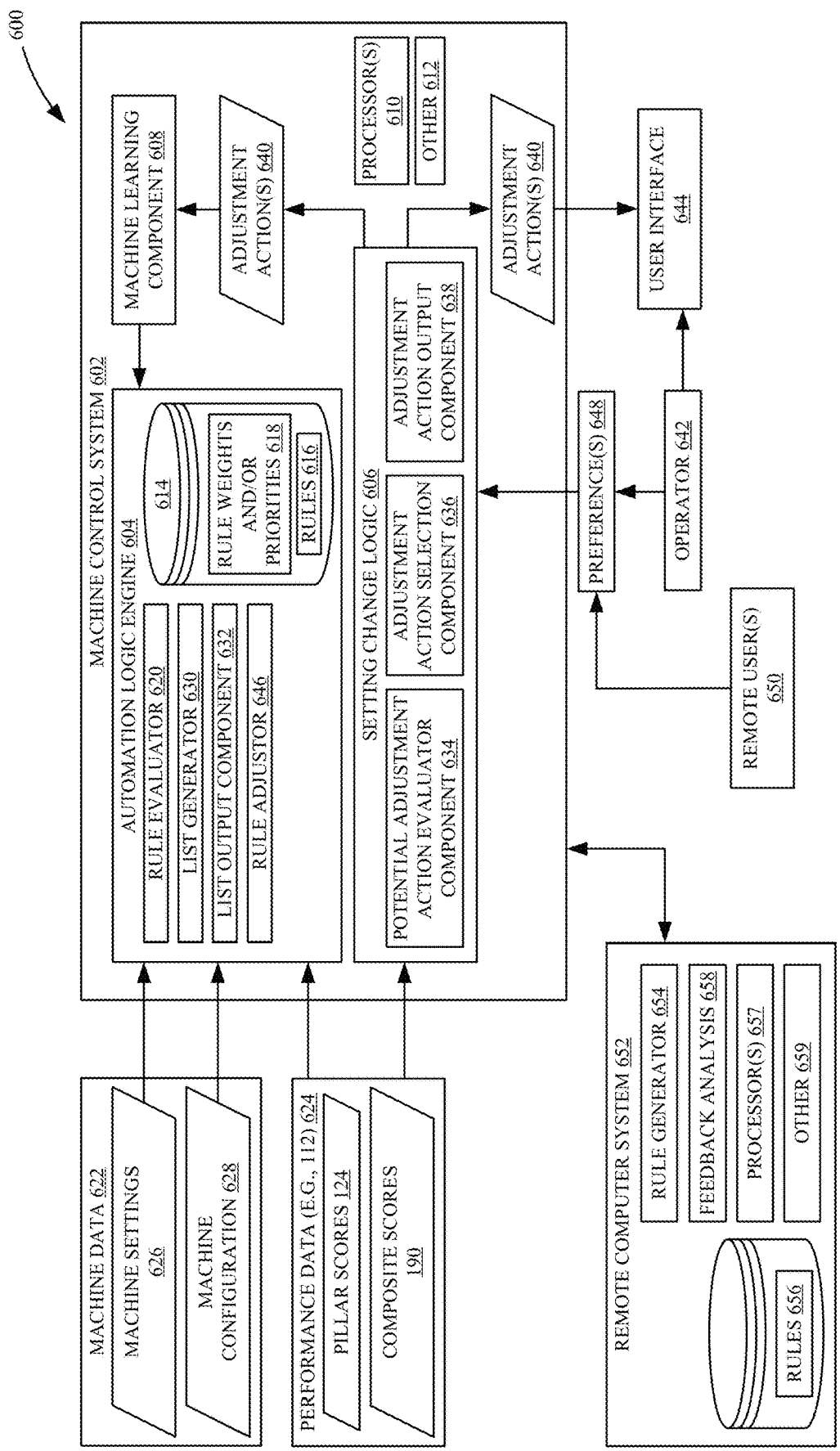
FIG. 6 is a block diagram of one example of an architecture for improving operation of a work machine using machine setting and/or configuration adjustments based on performance scores.

FIG. 6 illustrates one example of an architecture 600 for controlling machine operation (e.g., to increase or optimize machine performance) of a work machine (e.g., machine 102) using machine setting and/or configuration adjustments (i.e., adjustment actions) based on performance scores. In some examples, adjustment actions are prioritized and/or preferentially selected based on pillars (performance categories) of the machine. Some examples of performance scores (metrics) generation is discussed above. These performance scores are utilized by architecture 600 to intelligently select one or more adjustment actions that can be recommended to the operator and/or automatically applied to the machine.

Example methods for machine control using performance scores are described below with respect to FIGS. 7-10. Before discussing these in further detail, an overview of architecture 600 will be discussed.

Architecture 600 includes a machine control system 602 having an automation logic engine 604, setting change logic 606, and a machine learning component 608. System 602 includes one or more processors 610, and can include other items 612 as well. It is noted that some or all components of system 602 are, in one example, onboard work machine 102. In other examples, one or more parts of system 602 may be remotely accessed by work machine 102, such as on a remote computing system.

Automation logic engine 604 stores, or otherwise accesses, a rules store 614 that stores a set of rules 616. Rules store 614 can also store rule weights and/or priorities 618 that correspond to rules 616, and can be store with or separate from rules 616. Further, data store 614 can store associations between the rules 616 and performance categories, as discussed in further detail below.

In one example, rules 616 comprise control rules that represent machine-related knowledge pertaining to adjustment actions to be performed. An example control rule maps current settings, configurations, and/or performance scores to a corresponding set of one or more adjustment actions to be performed on the machine. A rule evaluator 620 is configured to receive and utilize machine data 622 and performance data 624. Machine data 622 is indicative of machine settings 626 and machine configurations 628. Examples are discussed above. Briefly, machine settings can include various operator-adjustable parameters. In the case of a combine harvester, for example, this can include concave clearance, rotor speed, fan speed, chaffer and sieve opening, harvest speed, header height, header settings, shopper knife engagement or speed, as well as others.

Performance data 624 is indicative of current machine performance using the setting 626 and configuration 628. In one example, this includes performance data 112 discussed above with respect to FIGS. 1 and 2. The performance data 624 can thus include pillar scores 124 and/or composite scores 190.

Using data 622 and 624, rule evaluator 620 evaluates rules 616 and, using a list generator 630, generates a list (or other data structure) of potential adjustment actions which can be output by list output component 632 to setting change logic 606. Logic 606 includes a potential adjustment action evaluator component 634 that evaluates the received list, and an adjustment action selection component 636 that selects one or more of the adjustment actions which are output by adjustment action output component 638. Illustratively, these adjustment action(s) 640 can be output to operator 642 through a user interface 644, and can be provided to machine learning components 608 for use in refining rules 616 and/or rule weights/priorities 618 using a rule adjustor 646.

Illustratively, as discussed in further detail below, the adjustment action selection by setting change logic 606 is based on preferences 648 provided by operator 642 or remote user(s) 650. Further, system 602 can communicate with a remote computing system 652 over a network, such as a wide area network. Remote computing system 652 includes a rule generator 654 configured to generate rules 656, that can be transmitted and stored at logic engine 604 as rules 616. System 652 includes a feedback analysis 658 that can receive feedback from system 602 for use in generating new rules and/or refining existing rules 656. Remote computing system 652 can include one or more processors 657 and can include other items 659 as well.

Figure 6A:
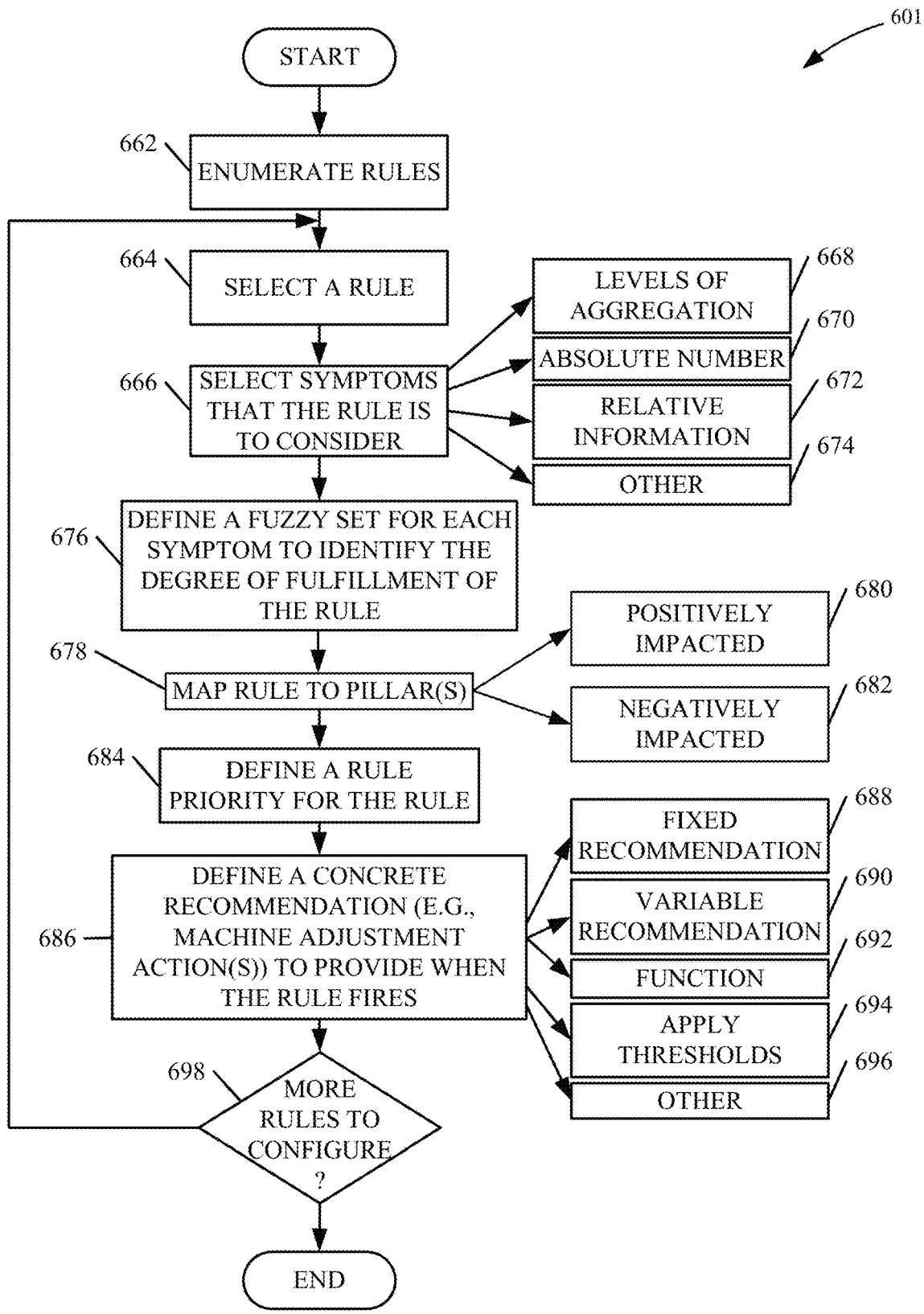
FIG. 6A is a flow diagram of an example method for configuring rules to generate potential adjustment actions.
Figure 7:
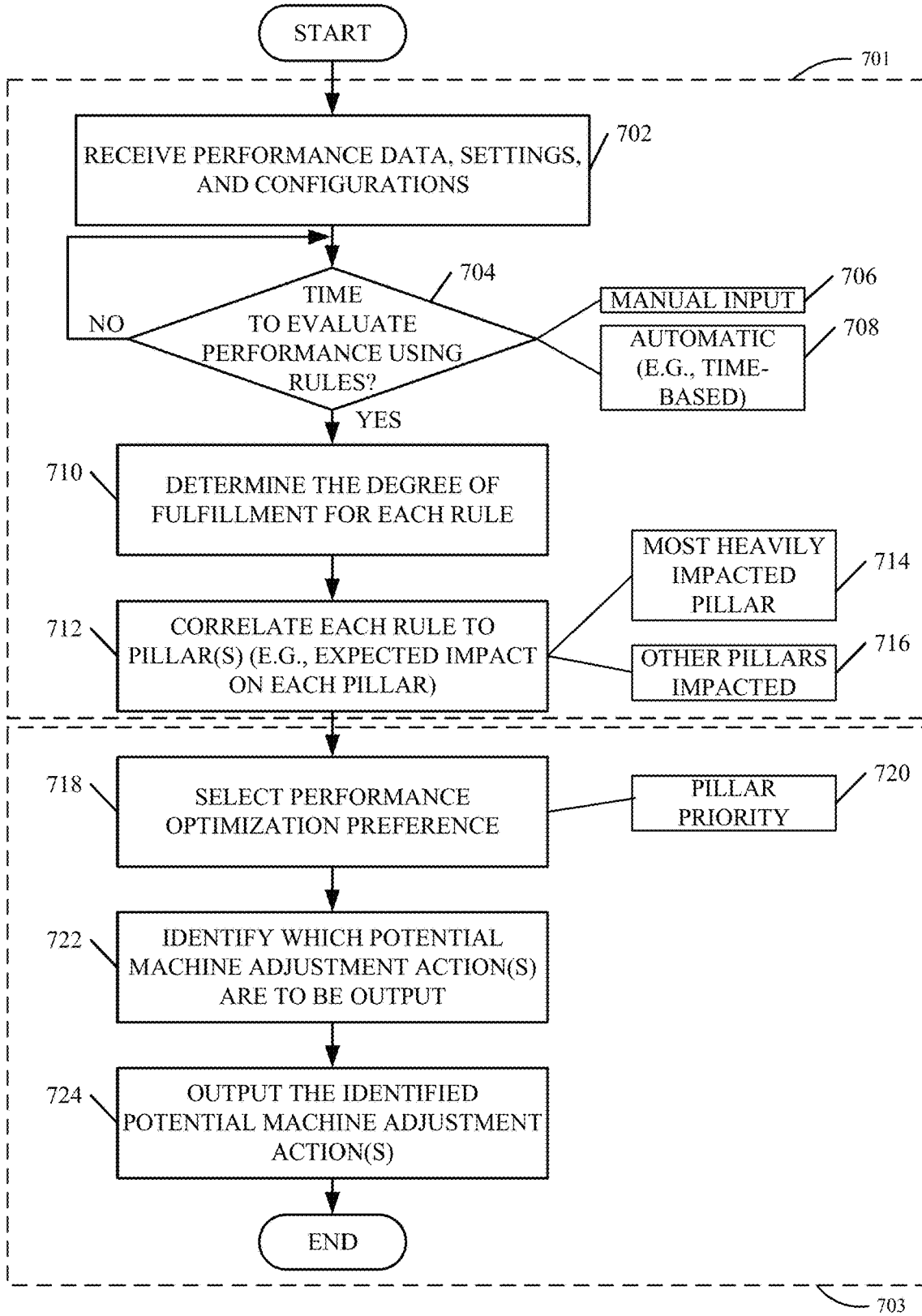
FIG. 7 is a flow diagram illustrating one example of a method of identifying an outputting machine adjustment action using rules.

FIG. 6A is a flow diagram illustrating an example method 601 of rule generation. For sake of illustration, but not by limitation, method 601 will be discussed in the context of rule generator 654 generating rules 656, which can be transmitted to system 602 for storage as rule 616. Further, FIG. 7 is a flow diagram illustrating an example method 700 for using the generated rules to identify and output adjustment action(s) 640.

Before discussing methods 601 and 700 in further detail, it is noted that the present discussion describes evaluating data using fuzzy logic. However, this is exemplary only and a variety of other evaluation mechanisms can be used instead. For instance, the data can be evaluated using clustering and cluster analysis, neural networks, supervised or unsupervised learning techniques, support vector machines, Bayesian methods, decision trees, Hidden Markov models, among others. Further, FIGS. 6A-6E and 7 below describe how to set up and use a fuzzy logic evaluator to generate recommendations. This is but one example of how the collected data can be evaluated to determine whether it fulfills any of a variety of actionable conditions for which a recommendation can be generated. The other evaluation techniques can be used to determine this as well.

The rules represent actionable triggering conditions. The collected and sensed data is evaluated against those triggering conditions to see whether the conditions are fulfilled and, if so, the degree of fulfillment. When any of the triggering conditions are met, corresponding potential adjustment actions can be output, for example as operator recommendations or for automated control of machine 102. An example operation of configuring the rules will first be described with respect to FIG. 6A, and then a number of examples will be provided in order to enhance understanding.

In accordance with one embodiment, the rules that are to be used by automation logic engine 604 are first enumerated. This is indicated by block 662 in FIG. 6A. The rules can be a wide variety of different types of rules, and they can vary in number from a few rules, to tens or hundreds or even thousands of rules. The exact nature of a given rule will vary based upon application, and based upon the work machine for which the rule is generated.

Once the rules are enumerated, one of the rules is selected. This is indicated by block 664. For the selected rule, a number of triggering conditions (also referred to as symptoms) that are to be considered for the rule are selected. The symptoms to be considered can be obtained from substantially any of the levels set out in FIG. 1, and for which examples were provided in FIGS. 5A-5G. Thus, they can include, for instance, CAN data 142, derived data 120, evaluation values 122, pillar scores 124, composite scores 190, or a host of other data. Selecting the symptoms to be considered by the selected rule is indicated by block 666 in FIG. 6A.

In selecting those symptoms, they can be obtained from different levels of aggregation, as indicated by block 668. They can be reflected by an absolute number 670 or by comparison to reference data 156. They can be compared to user preferences 158, or other information. This type of relative information is indicated by block 672 in FIG. 6A. Of course, the symptoms can be other items as well, and this is indicated by block 674.

Next, for each symptom selected for the current rule, a fuzzy set can be defined to identify the degree of fulfillment of the rule, based upon the various parameters. This is indicated by block 676.

At block 678, the rule is mapped to one or more performance categories or pillars. This can be done by manual input (e.g., an administrator that is defining the rule) or automatically by analyzing the rule itself. For instance, block 678 can identify which performance categories are positively impacted by the rule. This is represented by block 680. In one example, block 680 identifies which performance category will be most positively impacted by the particular rule (i.e., the performance category score that is expected to be increased the most in response to execution of the adjustment action(s) defined in the particular rule. In one example, block 678 can also identify performance categories that may be negatively impacted by the rule. This is represented by block 682.

In any case, method 601 correlates each rule to the particular performance categories that it may affect, and to what extent those performance categories may be affected. This association information can be stored in data store 614.

A rule priority is then assigned to the selected rule. In one example, at block 684, a rule priority can be assigned to the selected rule. By way of example, some rules can be more important than others, in different applications. Thus, different rule priorities can be assigned to reflect importance of the rule in the given application. The rule priority can be an absolute number or it can be a category (such as high, medium, low, etc.).

Finally, one or more concrete recommendations are defined for the selected rule. These are the recommendations that will be output when the rule fires. This is indicated by block 686 in FIG. 6A. The adjustment actions can take a wide variety of different forms. For instance, they can be fixed adjustment actions (such as "drive 3 km per hour faster"). This is indicated by block 688. They can be variable adjustment actions, that vary based on a wide variety of different things. They can vary based upon the degree of fulfillment, they can vary based on a combination of items, or they can vary according to a specified function 692. In addition, thresholds can be defined. For example, system 602 can apply the degree of fulfillment of a given rule to a threshold to determine whether the rule is triggered. Applying thresholds is indicated by block 694 in FIG. 6A. The concrete recommendations can be defined in other ways as well, and this is indicated by block 696.

In one exemplary embodiment, the process set out in FIG. 6A is repeated for each enumerated rule. This is indicated by block 698 in FIG. 6A. This completes process 660.

A number of examples will now be provided. The following six rules will be discussed for the sake of example only. It will be noted that a great many additional rules or different rules could be enumerated as well.

Rule 1. Ground speed too slow for yield.
Rule 2. Driving too slow while unloading on the go.
Rule 3. Driving slower due to material handling disturbance and/or threat of plugging.
Rule 4. Down crop and cannot drive faster.
Rule 5. Excessive idle time due to grain logistics.
Rule 6. Frequent plugging of the feeder house.

The symptoms that affect each rule can be selected to focus on various pillars, or on various other sensed or derived inputs. By way of example, rule 1 above focuses on the grain productivity pillar. Rule 2 focuses on both the grain productivity and the logistics pillars. Thus, the focus of a given rule can be a single pillar, combinations of pillars, individual or combinations of sensed or derived parameters, or a wide variety of other things.

Selecting a set of symptoms that is to be considered in determining whether a rule is triggered will now be described for Rule 1. The symptoms can include, for instance, a consideration as to whether the grain productivity, as measured against a reference (such as a productivity reference value for the same crop and under the same conditions) is below a threshold level. It can also consider whether the available machine power is fully utilized, and whether the machine is loss limited (which can be indicated when the loss pillar score is high). The average speed in harvesting can also be considered. For instance, system 602 may consider whether the average speed is below a reasonable upper threshold (such that the machine could actually go faster and still run with reasonable ride comfort, etc.).

Figure 6B:
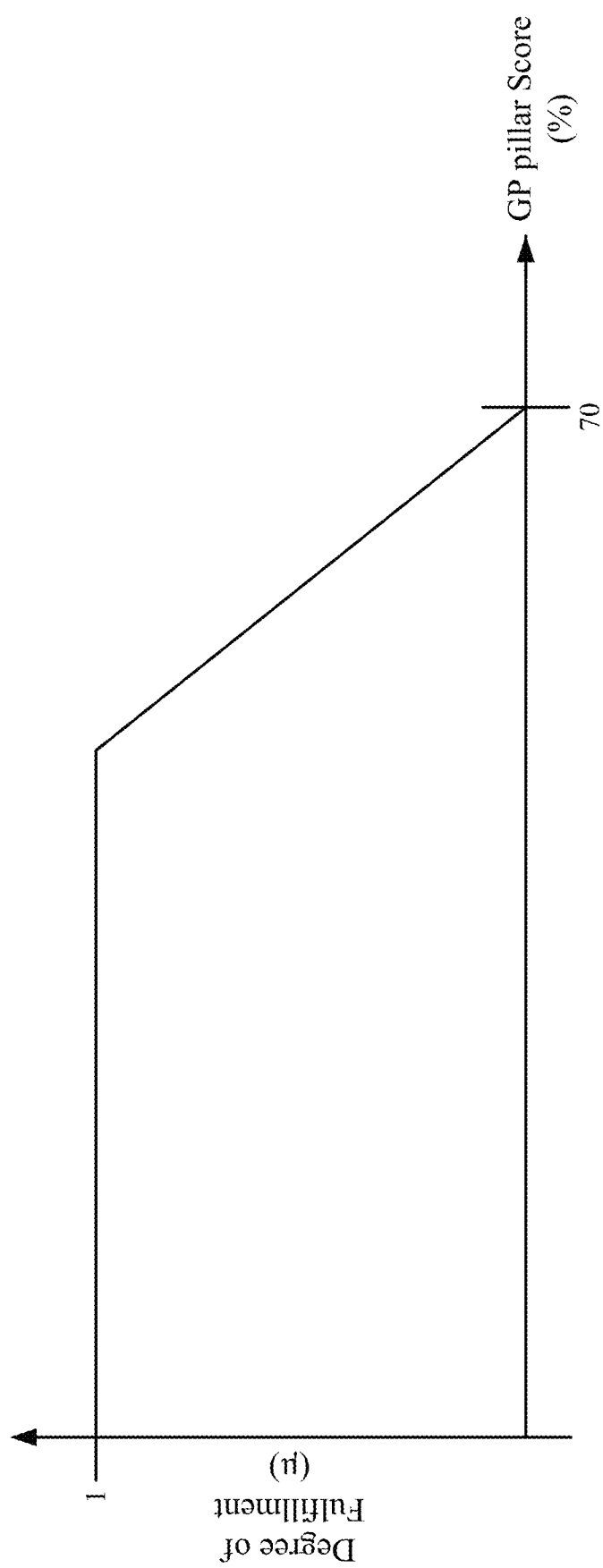
FIGS. 6B-6E are graphs plotting a degree of fulfillment of a parameter corresponding to a rule versus a parameter measurement.

For each of these symptoms, a fuzzy set can be defined that applies to the rule. In one embodiment, the fuzzy set is defined by a border function in a graph that plots degree of fulfillment against a measure of the parameter (or symptom). FIG. 6B, for instance, shows a plot of degree of fulfillment plotted against a grain productivity pillar score, as compared to a reference group. Thus, the percent on the x-axis of the graph shown in FIG. 6B indicates how the grain productivity score compares against the reference group.

Figure 6C:
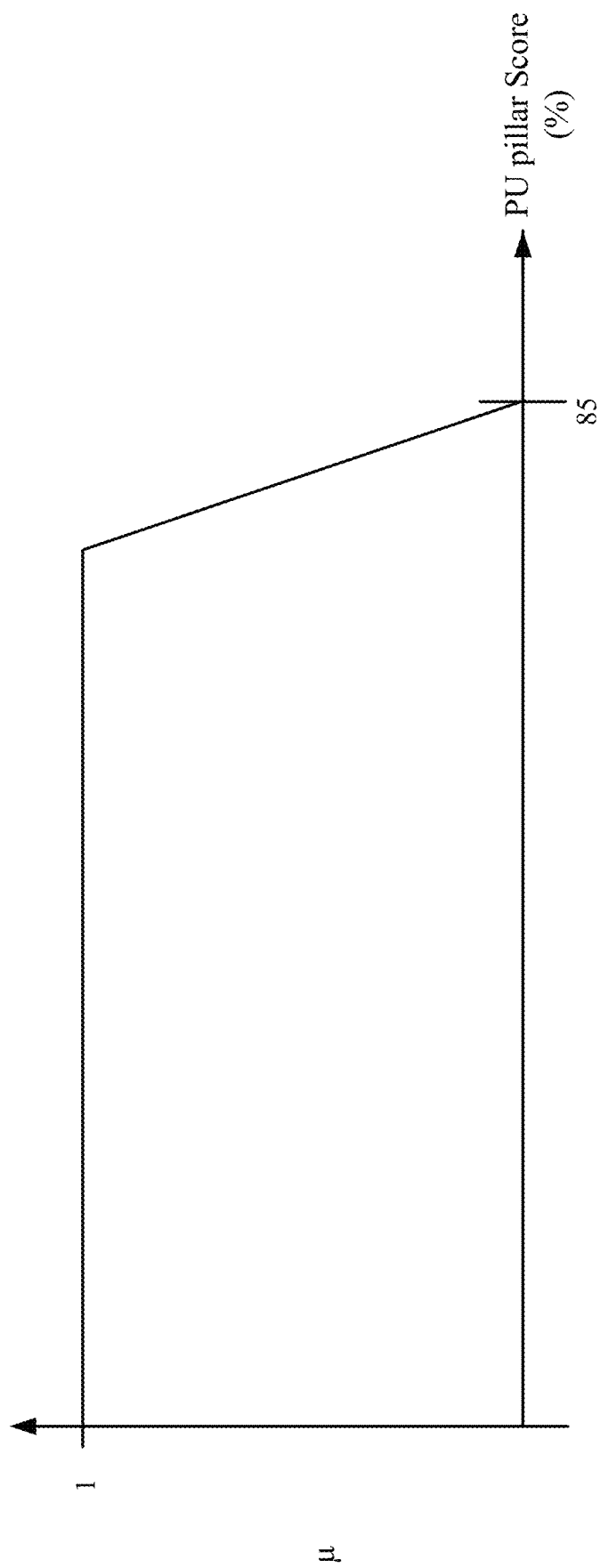
Figure 6D:
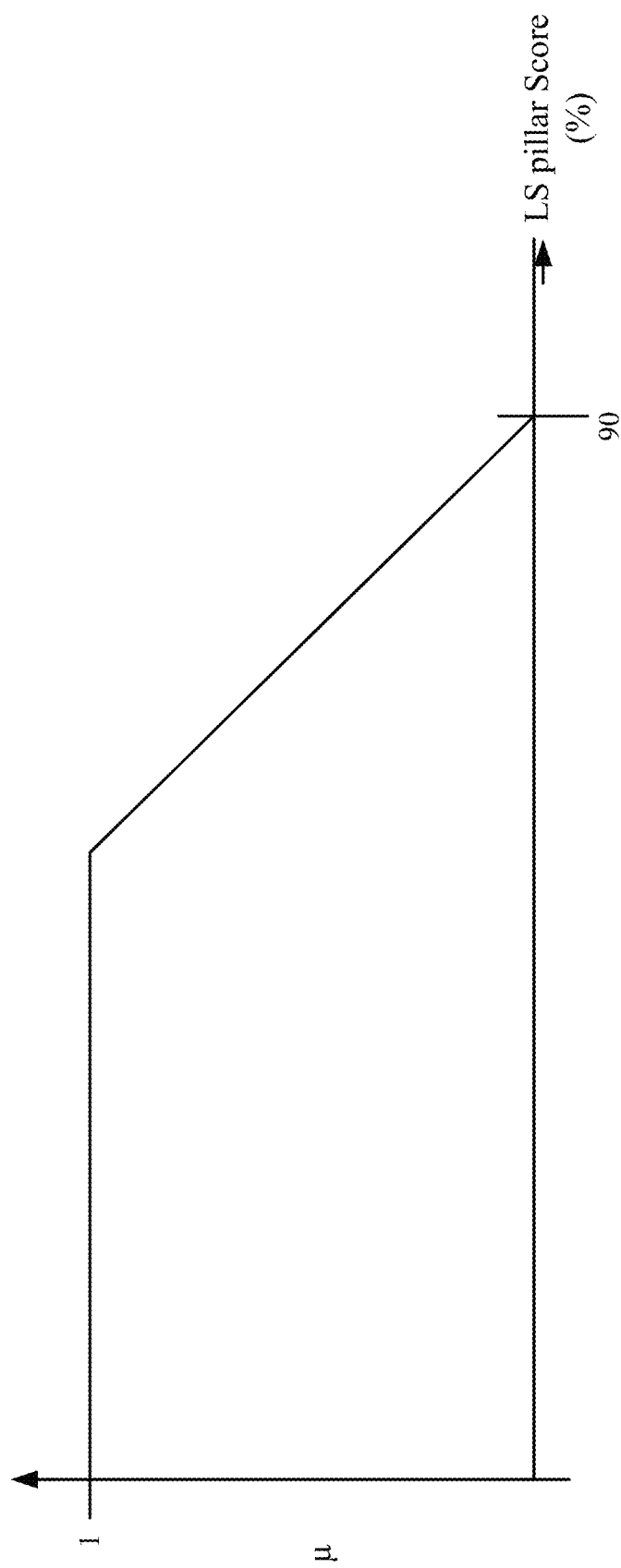
Figure 6E:
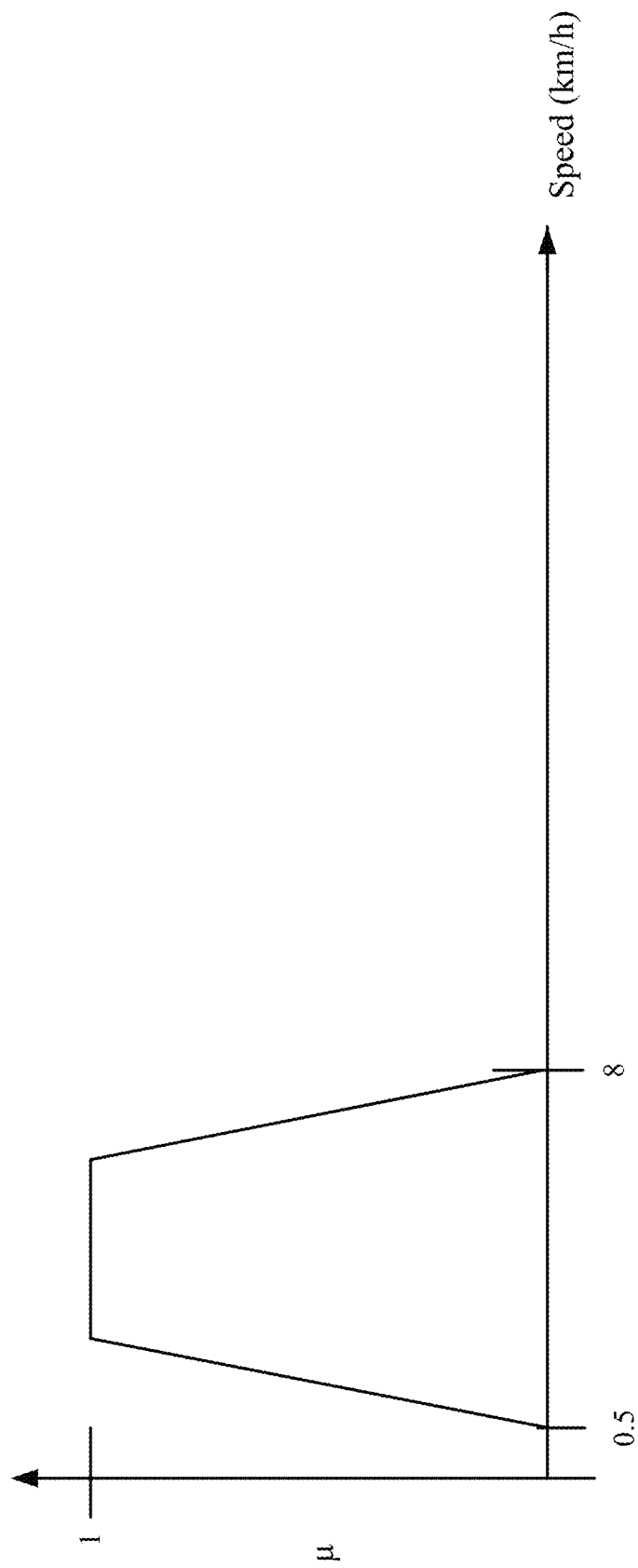

FIG. 6C plots degree of fulfillment against the absolute machine power utilization pillar score. FIG. 6D plots degree of fulfillment against the loss pillar score as measured against a user preference. For the average speed parameter, FIG. 6E plots a degree of fulfillment against the average vehicle speed during harvesting.

Having defined a fuzzy set for each parameter corresponding to rule 1, rule 1 is then assigned a priority. In one embodiment, the priority can be high, medium or low based on the importance of the rule in the given application. The rule priority can be defined in other ways as well.

Next, a concrete adjustment action is defined for rule 1. That is, the adjustment action defined for rule 1 will be that adjustment action that is output by logic 606 if logic 606 determines that rule 1 triggers and that the corresponding adjustment action is to be output. While only one adjustment action for rule 1 is described, it will be noted that each rule can have a plurality of different adjustment actions that are selected based on the degree of fulfillment or based on other criteria. In another embodiment, each rule only has a single adjustment action. Also, the adjustment actions can be fixed or variable. For instance, the adjustment action for rule 1 may be to drive faster by x kilometers per hour. The x can be a fixed value, or it can be variable based on a wide variety of things. As an example, where x is a variable, it may depend on the distance that the average speed is from the upper speed threshold for the vehicle as set for the rule. It may vary based upon the degree of overall rule fulfillment, or it may vary based upon a combination of things. It can be based upon any other parameter or combination of parameters, or it can be based on a predefined function that is not affected by other parts of the rule.

The same process is then performed with respect to rules 2-6 above. For instance, for rule 2, one consideration may be whether the ratio of productivity (in tons per hour) while harvesting versus the productivity while harvesting and unloading is below average (relative to a reference group in the same crop under the same conditions). Another consideration may be whether the vehicle speed (such as an absolute number in kilometers per hour) is in a given range (such as in a range of 0.1-6 kilometers per hour) to ensure that the rule does not fire if the speed is already high. The degree of fulfillment functions are then defined for each parameter, the rule is assigned a priority, and the adjustment action is defined. The adjustment action for rule 2 may be, for instance, "speed up by y" where y is fixed or any form of parameter-dependent, or parameter-independent function or where y is scaled based on rule fulfillment, etc.

For rule 3 above, some symptoms to consider may include whether the change rate and/or change deviation of rotor drive pressure is above normal. This may provide content for a report conveying the conditions of the field. Fulfillment functions are defined, the rule is assigned a priority, and an adjustment action is defined. For some rules (such as rule 3), there may be no adjustment action defined. This rule may only trigger an entry in a report to show context. This can allow a farm manager or another person to interpret other results in the report appropriately. By way of example, the manager may be able to tell that the operator was driving more slowly because of a disturbance in material flow. This might be because of the field conditions, and not the operator. Thus, this context information is provided in the report when this rule fires, but no adjustment action is output.

For rule 4 above, the parameters that are considered may be whether grain productivity (measured relative to a reference group) is medium to low, whether the reel position on a combine is down and extended, and whether the machine is harvesting, among others. The degree of fulfillment for each of these parameters can be defined, and the priority can be assigned to the rule. Again, as with rule 3, it may be that no adjustment action is generated for rule 4. Instead, when rule 4 fires, it provides content for a report that conveys conditions to allow a person reading the report to interpret other results appropriately. By way of example, a down crop can be caused by heavy rainfall, heavy winds, or other conditions. When this condition exists, the operator may lower the vehicle speed, lower the rotor head, and place the reel down.

For rule 5, some of the parameters to consider can be whether, after one field is completed, the logistic score is below 90%. Another parameter may include whether after a field is completed, the percent of time in idle with a full grain tank (or one that is close to full) is above normal by a threshold amount, relative to a reference value in the same crop and under the same conditions. The degree of fulfillment can be defined for the rule, and it can be assigned a priority. The adjustment action may be to investigate crop logistics.

For rule 6 above, some of the parameters to consider may be whether certain trouble codes were generated that indicate the feeder house is plugging. This can be indicated, for instance, by a count of the number of such feeder codes per unit time. If this ratio is above a predefined threshold or is high relative to a reference group, this can cause the rule to fire. The degree of fulfillment can be defined for the rule in other ways, and a priority is assigned to the rule. The adjustment action may be to investigate the header setup and settings, because something is wrong that is leading to unusually frequent plugging.

Referring now to FIG. 7, method 700 illustrates an example operation of system 602 in determining which rules are triggered, and when to present adjustment action(s), and what those adjustment actions should be. For sake of illustration, but not by limitation, dashed box 701 illustrates steps performed by automation logic engine 604 and block 703 illustrates steps performed by setting change logic 606.

At step 702, engine 604 receives machine data 622 and performance data 624, as discussed above, so that they can be evaluated against rules 616.

At block 704, engine 604 determines whether it is time to evaluate rule 616, to see if any of them have been triggered. This can be done in a wide variety of different ways. For instance, rule evaluator 620 can evaluate rules based on manual input, such as input from operator 642 through user interface 644. In another example, at block 708, engine 604 can evaluate the rules automatically. In one example, this is based on a time period, such as every thirty seconds, or some other time period. In another example, engine 604 can detect a machine settings change, machine performance change above a threshold, etc., upon which engine 604 triggers rule evaluation at block 704.

At block 710, rule evaluator 620 then determines the degree of fulfillment for each of the rules that it is evaluating. This can also be done in a wide variety of different ways. By way of example, for rule one mentioned above, the degree of fulfillment for each parameter can be calculated.

Then, the overall degree of fulfillment for the entire rule can be generated from the degrees of fulfillment for each parameter. As one example, the degree of fulfillment for the overall rule can be the same as the degree of fulfillment for the weakest parameter. In another embodiment, the degree of fulfillment of the overall rule can be based on a combination of degrees of fulfillment for each of the parameters. The degree of fulfillment can be obtained in other ways as well.

Once the degree of fulfillment of the rules is identified, a list of potential adjustment actions from those rules, or a subset of those rules, is generated using list generator 630. In one example, this includes rule evaluator 620 correlating each fulfilled rule (e.g., each rule having a degree of fulfillment above a threshold) to particular performance categories or pillars. This can be based on the above-mentioned association information in data store 614, and indicates an expected impact on each pillar when the rule fires (i.e., the adjustment action(s) defined in the rule are performed).

In one example, this includes identifying the most heavily impacted pillar(s). This is represented by block 714, and can include identifying pillars that are positively impacted (the corresponding performance metrics are raised) as well as negatively impacted pillars (the performance metrics are decreased). Also, at block 716, the method can identify other pillars that are impacted to some extent (less heavily then the pillars identified at block 714).

This information is output, by list output component 632, to setting change logic 606 which identifies which specific adjustment actions should be output. This can be done in a wide variety of different way and based on a wide variety of different considerations. Some examples are discussed in further detail below.

In the illustrated example, setting change logic 606 selects a performance optimization preference set at block 718. This can include selecting a particular target performance category, that is to be targeted for optimization through the adjustment action(s). In another example, this can include obtaining a ranked list of pillars, ranked in an order from most preferred to least preferred (in terms of optimization). This is indicated by block 720.

At block 722, based on the selected performance optimization preference at block 718, one or more machine adjustment actions are identified, and output at block 724.

It should also be noted that the parameters considered for each rule need not be those generated from complex computation. Instead, they can be obtained from all levels of data aggregation in FIG. 1. Thus, some may be defined in engineering units, instead of other measures. By way of example, the parameters considered for rule 1 can be grain mass flow in tons per hour, engine load factor in percent, loss sensor readings (for example, in shoe loss strikes), and ground speed in kilometers per hour. The parameter considered for rule 2 may be provided as the ratio of mass flow while the auger is off versus on (in tons per hour). The parameter considered for rule 3 may be provided as the rotor drive pressure change (in bar). The parameters considered for rule 4 can be the grain mass flow in tons per hour, the ground speed in kilometers per hour, reel position down and header position down. The parameters considered for rule 5 can be whether the grain tank fill level is constant and over 95% and not changing for at least a given time period (such as 30 seconds). The parameter considered for rule 6 can be the diagnostic trouble code count. Of course, other, more complex parameters can be used as well.

Figure 8:
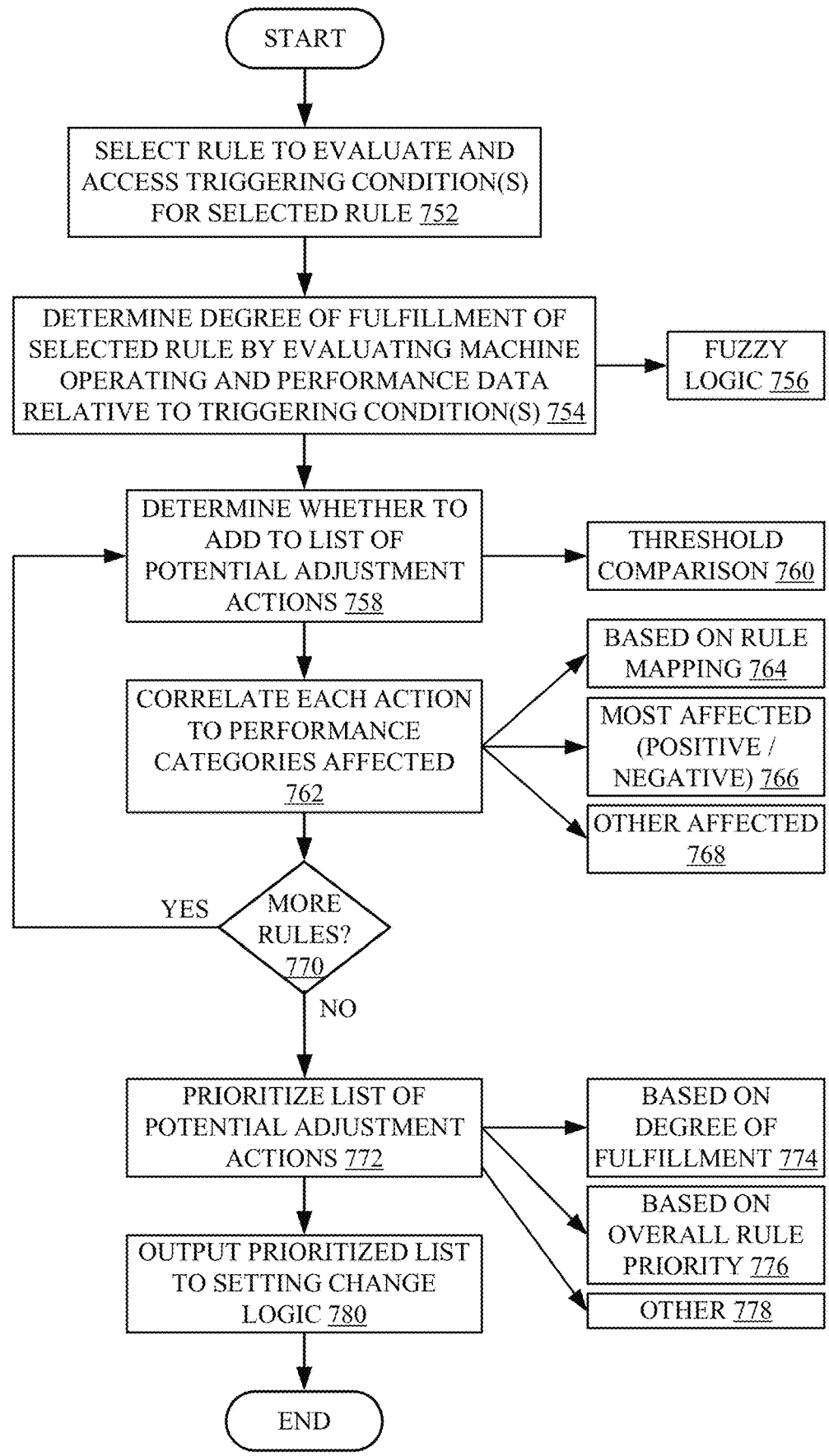
FIG. 8 is a flow diagram of an example method for evaluating rules to output potential adjustment actions.

FIG. 8 illustrates one example of a method 750 performed by automation logic engine 604 in evaluating rules and outputting potential adjustment actions to settings change logic 606. In one example, method 750 is performed within block 701 shown in FIG. 7.

At block 752, a rule is selected to evaluate, from the set of rules 616 in data store 614. For example, rule evaluator 620 can select a first rule based on some criterion, such as based on sensor data or previously fulfilled or executed rules. Block 752 accesses the triggering condition(s) for the selected rule. For instance, rule evaluator 620 identifies which machine data 622 and/or performance data 624 maps to the input conditions, for the rule to be fulfilled.

At block 754, a degree of fulfillment of the selected rule is determined by evaluating machine operating and performance data relative to the triggering conditions defined in the selected rule. This can include determining how well the machine data 622 indicates a match between the current machine settings, configuration, and performance matches the triggering conditions of the rule. This can include utilization of fuzzy logic 756 as discussed above.

At block 758, list generator 630 determines whether to add the potential adjustment action defined in the selected rule to a list, to be provided to setting change logic 606 for further evaluation and selection. In one example, this includes comparing the degree of fulfillment determined at block 754 to a threshold. This is indicated at block 760. In one example, the threshold is an absolute threshold that can be predefined. In another example, the threshold may vary depending upon the number of fulfilled rules that have been identified.

At block 762, engine 604 correlates the adjustment action from the rule to the performance categories that are affected by the rule. For instance, this may be based on a rule mapping, as indicated by block 764. In one example, the rule mapping is defined at block 678 shown in FIG. 6A.

The correlation at block 762 can identify which performance categories or pillars are most affected, whether it be positively or negatively. This is indicated at block 766. It can also identify other performance categories that may be affected, to some extent, at block 768.

At block 770, the method determines whether there are more rules to be evaluated. If not, list generator 630 prioritizes the list of potential adjustment actions at block 772. In one example, this can be based on the degree of fulfillment of each rule, from which the potential adjustment actions are derived. This is indicated by block 774. It can also be based on an overall rule priority, such as that defined at block 684 shown in FIG. 6A. This is indicated by block 776. The list can be prioritized in other ways as well. This is indicated by block 778.

In one example of list prioritization at block 772, a plurality of separate lists can be generated, where each list is specific to a particular performance category. For instance, a first list is generated for the productivity category, a second list is generated for the power utilization category, a third list is generated for the fuel consumption category, a fourth list is generated for the material loss category, and a fifth list is generated for the material quality category. Within each of these lists, the potential adjustment actions can be independently prioritized, such as based on a measure of importance and/or rule fulfillment within that list.

In any case, the prioritized list (or lists) is output at block 780 to the settings change logic 606. In the illustrated example, list output component 630 outputs the potential adjustment actions, along with an indication as to the degree of fulfillment of the corresponding rules and an indication of an overall rule priority.

Figure 9:
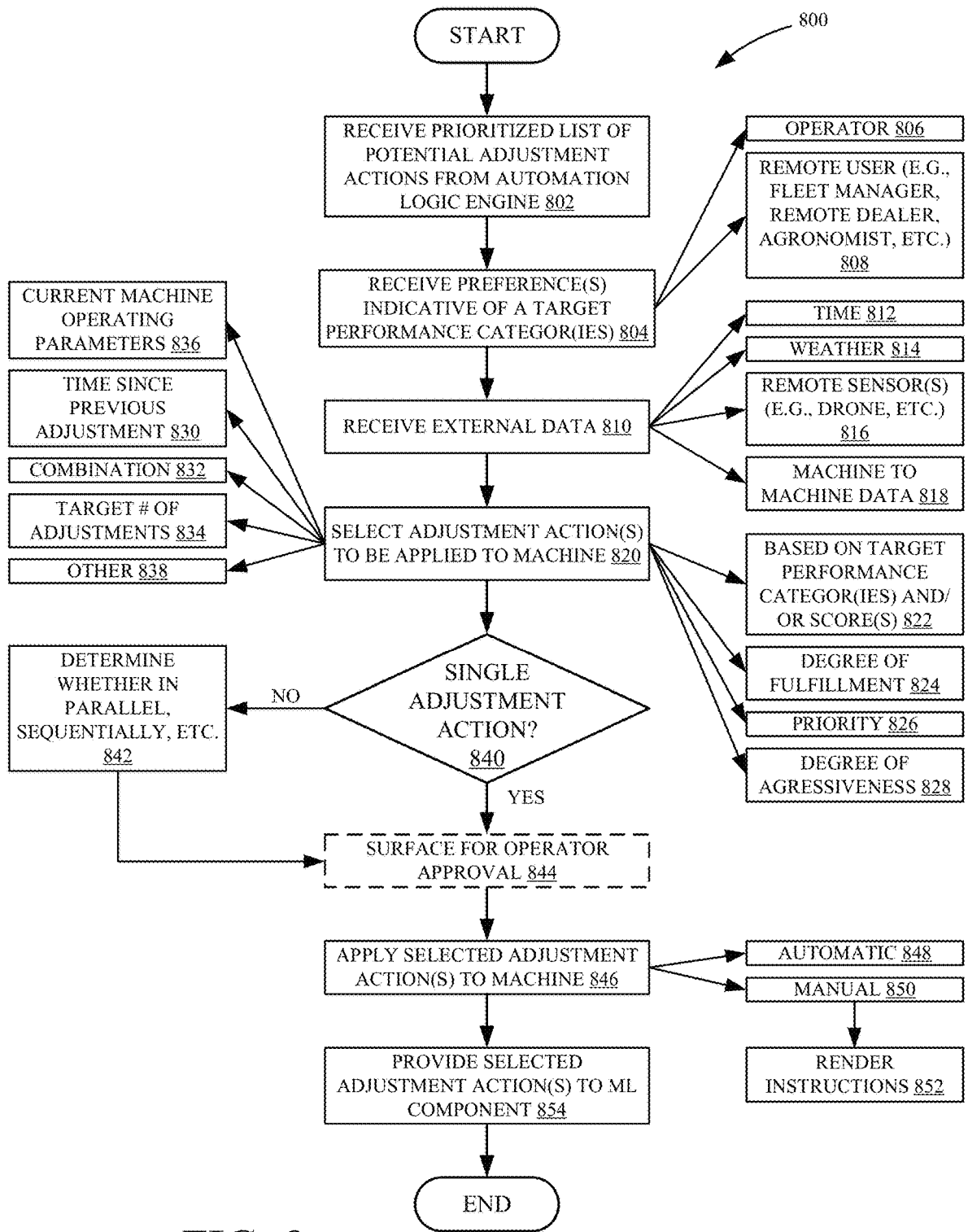
FIG. 9 is a flow diagram of an example method performed by settings change logic in response to receiving an indication of potential adjustment actions.

FIG. 9 illustrates an example method 800 performed by settings change logic 606, in response to receiving the output from block 780. At block 802, the prioritized list (or lists) of potential adjustment action is received. At block 804, logic 606 also receives preference data indicative of a target performance category, or categories. In one example, this is a pillar-based optimization priority that indicates a prioritized list of performance categories or pillars to be optimized by the adjustment actions.

For instance, the preference data can indicate a preferred order (e.g., defined by the operator, or other user) for the performance categories, in terms of desired improvement or optimization. By way of example, the preference data can indicate that the operator assigns a highest priority to increasing fuel efficiency, a second highest priority to productivity, a lowest priority to material loss, etc. In another example, the preference data can be based on inputs from a number of different users (e.g., the operator, a remote user, etc.). Thus, the performance category priority can be a combination of separate priorities assigned by those users.

Accordingly, this preference data can be input by the operator of machine 102. This is indicated by block 806. In another example, this data can be provided from a remote user, as indicated by block 808. For example, a remote user may be a fleet manager, that manages a number of work machines remotely. In the case of a combine harvester, for example, remote user 808 may be associated with a grain elevator or an agronomist. In any case, at block 804, logic 606 determines a target performance category for which to evaluate and select adjustment actions.

At block 810, external data can be received. This can include time data 812 indicative of a current time and/or weather data 814, indicative of current or forecasted weather. In another example, the external data 810 can be provided from remote sensors 816, such as from a remote sensing device such as a drone or the like. In the case of a combine harvester, this data can be indicative of yield, crop properties, terrain maps, pest/weed information, and the like.

Also, the external data can comprise machine-to-machine data 818. In one example, data 818 comprises data from other machines operating within the same region or fleet that may be running a same or similar system, and/or have the same or similar weather or agronomic data.

Using the above-mentioned data, action evaluator component 634 evaluates the potential adjustment actions in the received list, and selection component 636 operates to select one or more of the adjustment actions to be applied to the machine. This is indicated by block 820.

In one example of block 820, the selection is based on the target performance category (or categories) identified based on the preference data at block 804 and/or the performance scores from the performance data 624 (e.g., pillar scores 124). This is indicated by block 822.

The selection can also be based on a degree of fulfillment of the corresponding rules from which the adjustment actions were identified. Further yet, the selection can be based on a priority, as indicated by block 826. This priority can be an overall priority for all potential adjustment actions, or a priority within a performance category specific list, such as discussed above with respect to FIG. 8.

For example, a plurality of adjustment actions are selected by prioritizing performance impact, of the plurality of adjustment actions on the performance categories, in accordance with the priority order.

In one example, the selected adjustment action(s) can be selected based on a degree of aggressiveness, as indicated by block 828. The degree of aggressiveness can indicate a weight to be applied to the corresponding change. For instance, the degree of aggressiveness may indicate a target performance score level that is to be desired from the selected adjustment actions. By way of example, an operator may desire that a productivity score of at least ninety (on a scale of one hundred) is to be achieved through the adjustment action.

In one example, at block 830, if an adjustment action was recently output, selection component 636 may bypass that adjustment action for a predetermined time period. This may by done so that logic 606 is not repeatedly outputting the same adjustment action to frequently.

Further, as indicated by block 832 adjustment actions can be provided based on combinations of rule priority, degree of fulfillment, time since the recommendation was last provided, or a combination of other things as well.

As indicated at block 834 selection component 636 may be configured to provide only a target number of adjustment actions at a given time. Thus, the highest priority adjustment actions can be output in descending order until the target number of adjustment actions is reached.

As indicated at block 836, the current machine operating parameters is taken into account in selecting the adjustment actions. For instance, if a rule indicates that the rotor speed of a combine harvester is to be increased to a particular amount, block 836 determines the current speed of the rotor to calculate what the incremental change should be, to be outputted as a recommended adjustment action.

The adjustment actions can be selected in other ways as well. This is indicated by block 838. In one example, conflicting adjustment actions can be identified and resolved before the adjustment actions are output. Conflicts can be resolved in a wide variety of different ways. For instance, when the adjustment actions are prioritized, the conflicts can be resolved based on priority. Priority can be assigned anecdotally, heuristically, based on weight or underlying information or otherwise. Conflicts can also be resolved using a predetermined recommendation hierarchy that establishes a recommendation precedence. Conflicts can be resolved by accessing a set of conflict resolution rules. The rules can be static, context-dependent or dynamic. Conflicts can be resolved in other ways as well.

At block 840, method 800 determines whether the selected adjustment action(s) comprise a single adjustment action or multiple adjustment actions. If multiple adjustment actions are selected, at block 842 the method determines how to perform the multiple adjustment actions, based on their cumulative affect and/or affect on each other. For instance, block 842 can determine whether the multiple adjustment actions can be performed in parallel, or whether they need to be performed sequentially in a particular order.

In either case, the selected adjustment action(s) are output by output component 638. In one example, at block 844, this can include surfacing the selected adjustment action(s) for operator approval. This can be done via user interface 644, such as graphically, audibly, or otherwise.

At block 846, the selected adjustment actions are applied to the machine. This can be done automatically, at block 848 or manually at block 850. In one example, instructions can be rendered at block 852, that instructs operator 642 as to how to perform the adjustment action(s) to the machine.

At block 854 an indication of the selected adjustment action(s) is provided to machine learning component 606. Output component 638 can also provide an indication as to the degree of rule success, such as whether the adjustment action met the intended affect and/or had any negative side affects on the machine operation. Also, it is noted that this information can also be provided to remote computing system 652, for use by feedback analysis component 658. In one example, feedback analysis component 658 analyzes the affects of the adjustment actions on the performance of the machine, and for use in generating new rules and/or refining existing rule 656. For example, feedback analysis component 658 can determine that a gap in the rules engine exists where system 602 was unable to improve performance of the machine using a particular set of rules (e.g., rules x, y, z) in a particular set of conditions (e.g., conditions q, r, s).

Figure 10:
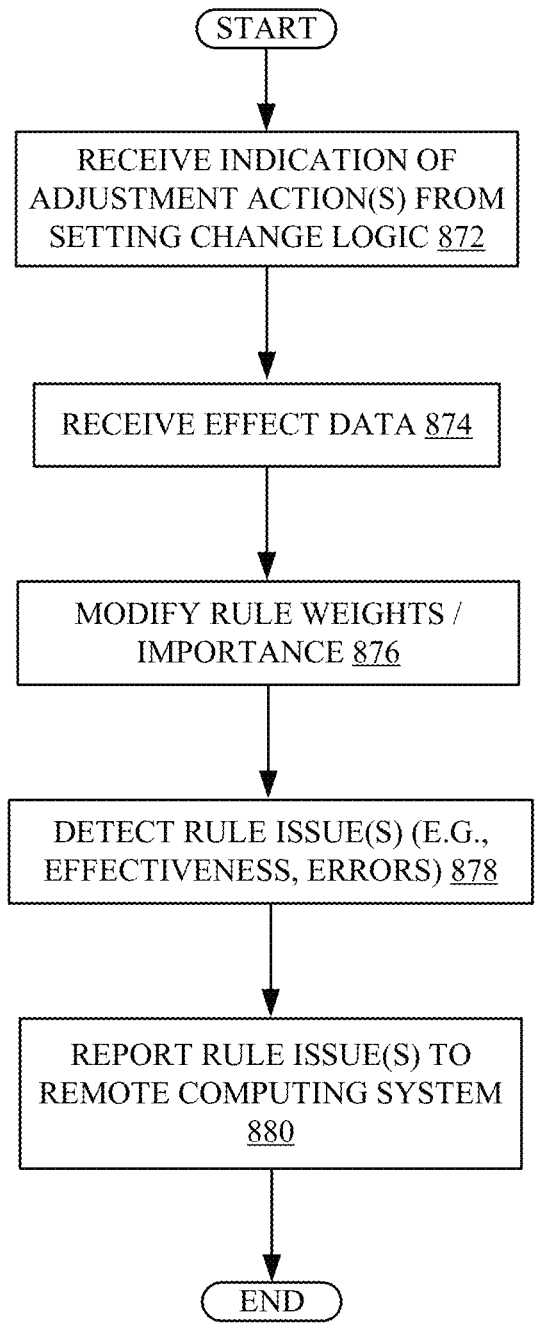
FIG. 10 is a flow diagram of an example method performed by a machine learning component.

FIG. 10 illustrates one example of a method 870 performed by a machine learning component 608. At block 872, an indication of the adjustment actions 640 is received from logic 606. Additionally, effect data is received at block 874, and is indicative of an affect of the adjustment actions on the machine. Machine learning component 608 analyzes this data and determines a degree of rule success, for example indicating whether the changes had their intended affect. If a particular rule is successful, machine learning component 608 can adjust the rule weights and/or priorities 618 in data store 614. Similarly, if a rule is unsuccessful, or less successful than other rules, the weight and/or priorities of that rule can be decreased. Further, component 608 can adjust the associations between rules 616 and the performance categories, mentioned above.

This is indicated at block 678, where rule issues can be detected and reported to remote computing system 652 at block 880.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

It will be noted that the above discussion has described a variety of different systems, components, modules, elements, and/or types of items. It should be understood that these can be implemented in any of a variety of ways. For example, they can be implemented as logic. It will be appreciated that such systems, components, and/or logic can be comprised of hardware items (such as processors and associated memory, or other processing components, some of which are described above) that perform the functions associated with those systems, components and/or logic. In addition, the systems, components and/or logic can be comprised of software that is loaded into a memory and is subsequently executed by a processor or server, or other computing component, as described above. The systems, components and/or logic can also be comprised of different combinations of hardware, software, firmware, etc., some examples of which are described herein. These are only some examples of different structures that can be used to form the systems, components and/or logic described above. Other structures can be used as well.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 11:
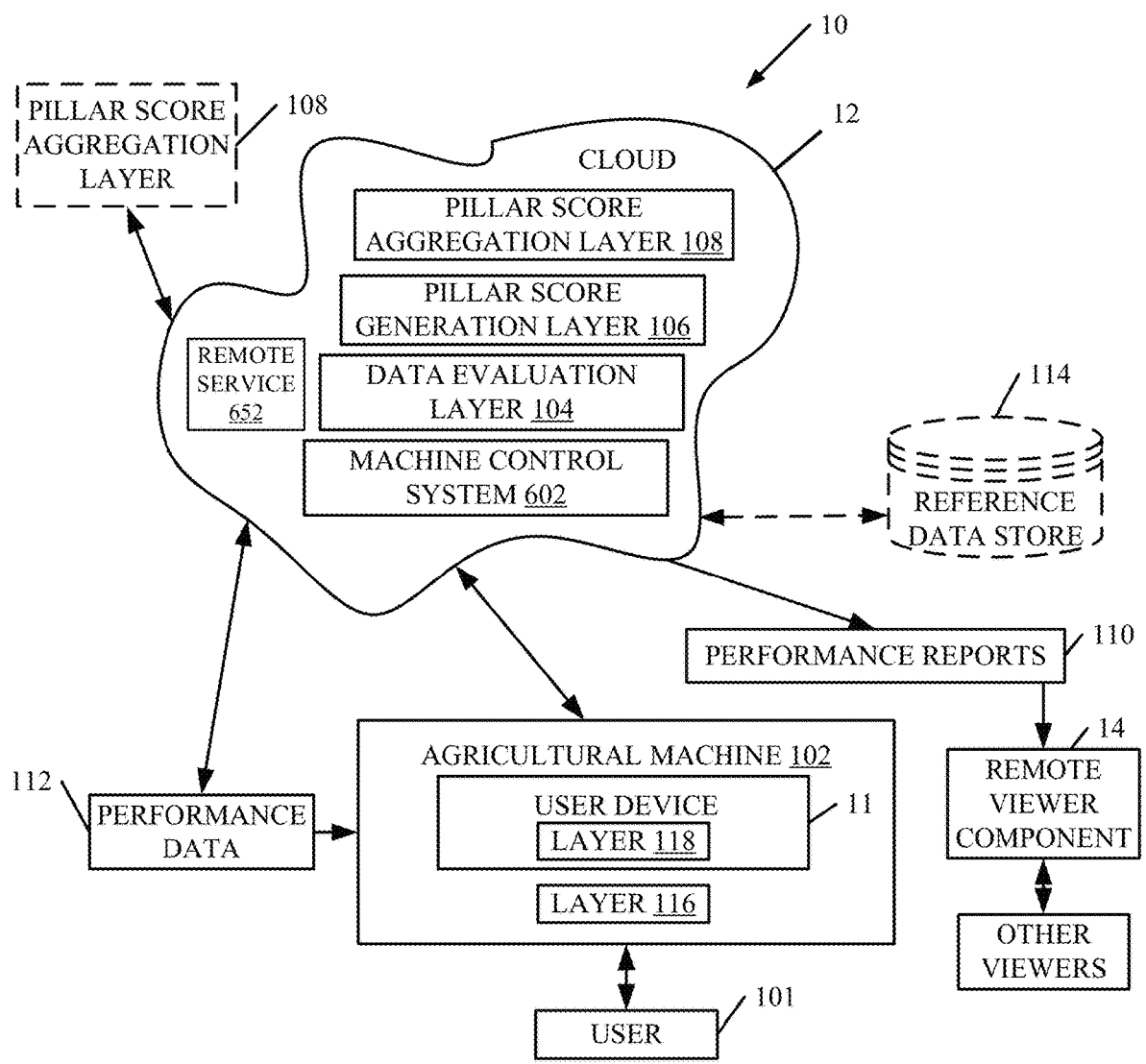
FIG. 11 is a block diagram showing one example of the architecture(s) shown in FIGS. 1, 2, and 6, deployed in a cloud computing architecture.

FIG. 11 is a block diagram of portions of architectures 100 and 600, shown in FIG. 1, except that its elements are disposed in a cloud computing architecture 10. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architectures 100 and 600 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the embodiment shown in FIG. 11, some items are similar to those shown in FIGS. 1, 2, and 6 and they are similarly numbered. FIG. 11 specifically shows that layers 104, 106 and 108 can be located in cloud 12 (which can be public, private, or a combination where portions are public while others are private). Further, machine control system 602 can be located in cloud 12. Therefore, user 101 can operate machine 102 using a user device 11 that includes layer 118. Machine 102 can access layers 104, 106 and 108, and/or machine control system 602, through cloud 12.

FIG. 11 also depicts another embodiment of a cloud architecture. FIG. 11 shows that it is also contemplated that some elements of architecture 100 are disposed in cloud 12 while others are not. By way of example, data store 114 can be disposed outside of cloud 12, and accessed through cloud 12. In another embodiment, layer 108 (or other layers) can be outside of cloud 12. Regardless of where they are located, they can be accessed directly by device 11, through a network (either a wide area network or a local area network), they can be hosted at a remote site by a service, or they can be provided as a service through a cloud or accessed by a connection service that resides in the cloud. All of these architectures are contemplated herein.

Further, FIG. 11 shows that a remote view component 14 (which can be another user device, or another component) can be used by one or more other viewers, who are remote from machine 102. Viewers can view the reports or other information if properly authenticated.

It will also be noted that architecture 100, or portions of it, can be disposed on a wide variety of different devices. Some of those devices include servers, desktop computers, laptop computers, tablet computers, or other mobile devices, such as handheld computers, cell phones, smart phones, multimedia players, personal digital assistants, etc.

Figure 12:
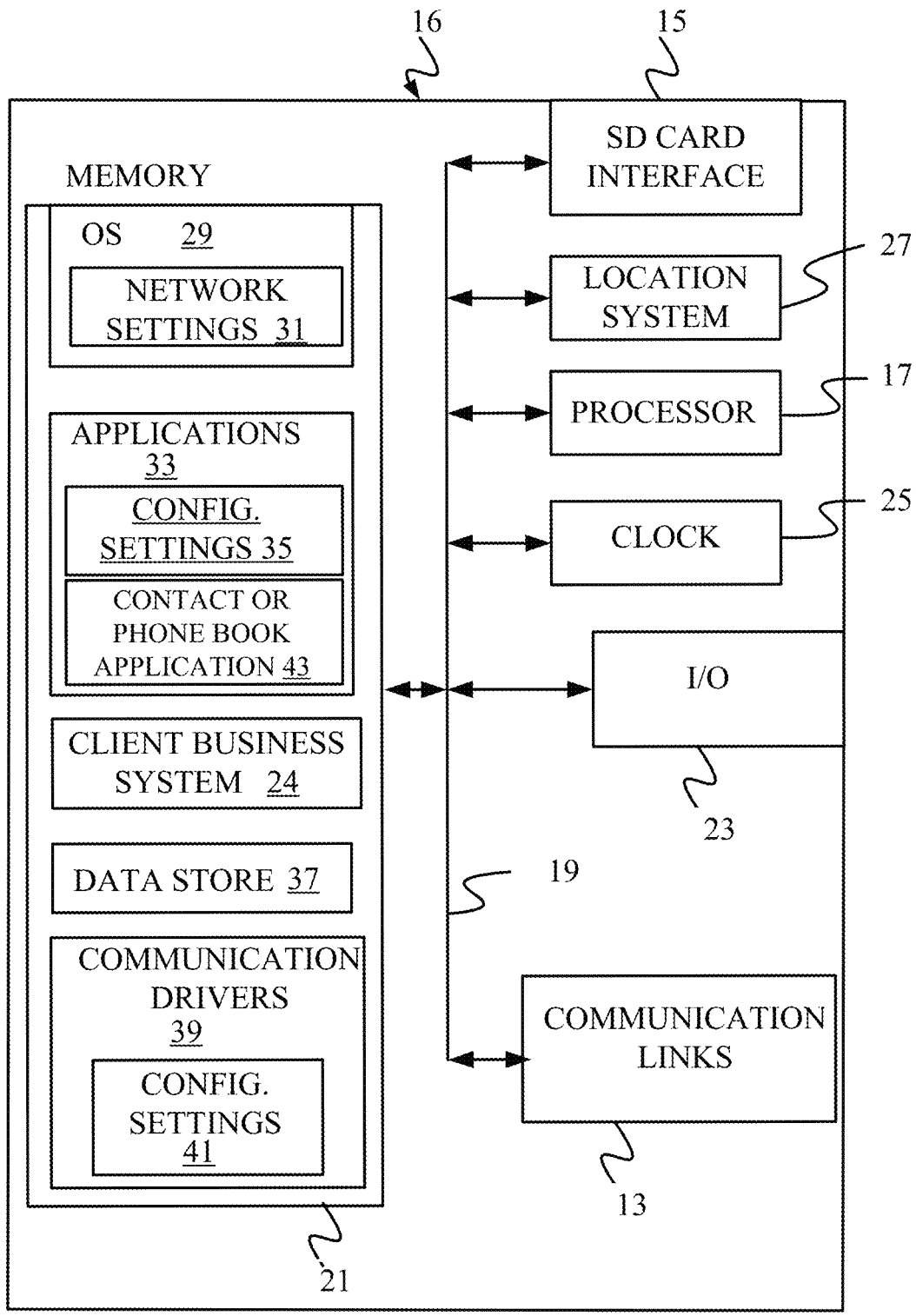
FIGS. 12-17 show various embodiments of mobile devices that can be used in the architecture shown in FIGS. 1, 2, and 6.

FIG. 12 is a simplified block diagram of one illustrative embodiment of a handheld or mobile computing device that can be used as a user's or client's hand held device 16, in which the present system (or parts of it) can be deployed. FIGS. 13-17 are examples of handheld or mobile devices.

FIG. 12 provides a general block diagram of the components of a client device 16 that can run components of architecture 100 or that interacts with architecture 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including wireless connections to networks.

Under other embodiments, applications or systems are received on a removable Secure Digital (SD) card that is connected to a SD card interface 15. SD card interface 15 and communication links 13 communicate with a processor 17 (which can also embody processors 140, 155, 163 or 186 from FIG. 2) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

Figure 13:
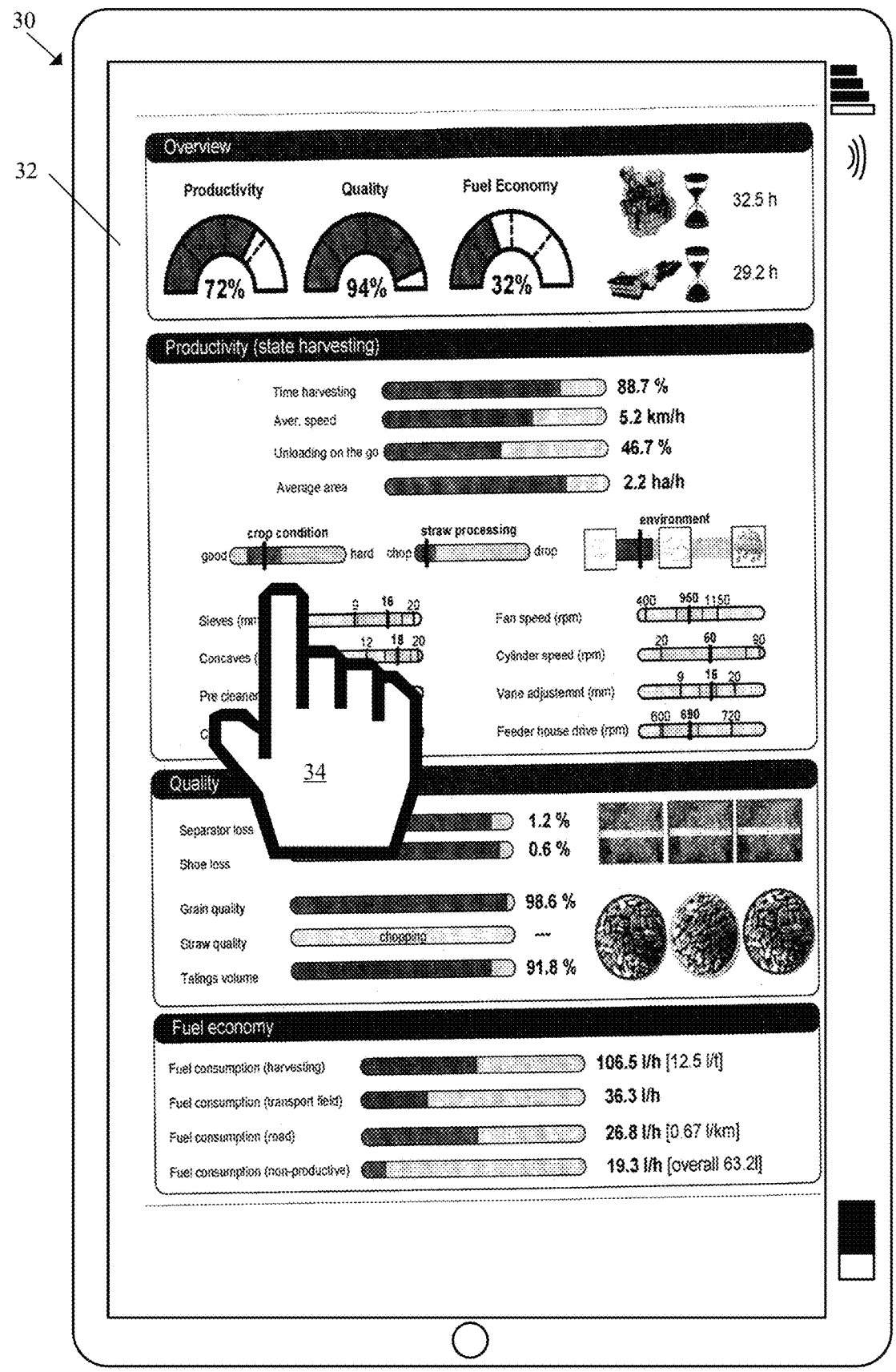

FIG. 13 shows one embodiment in which device 16 is a tablet computer 30. In FIG. 13, computer 30 is shown with a user interface display (that includes example performance metrics) displayed on the display screen 32. Screen 32 can be a touch screen (so touch gestures from a user's finger 34 can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 30 can also illustratively receive voice inputs as well.

Figure 14:
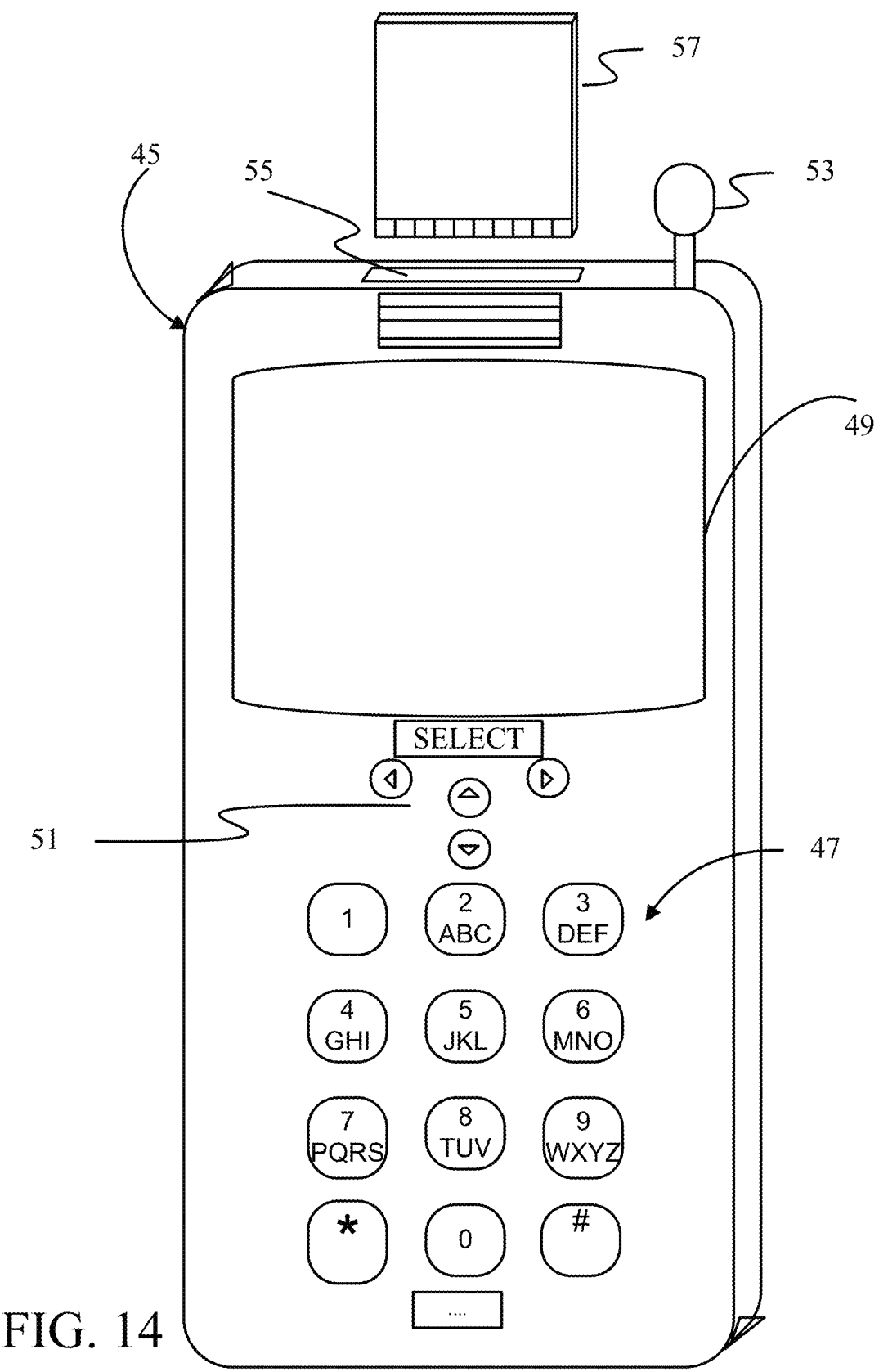
Figure 15:
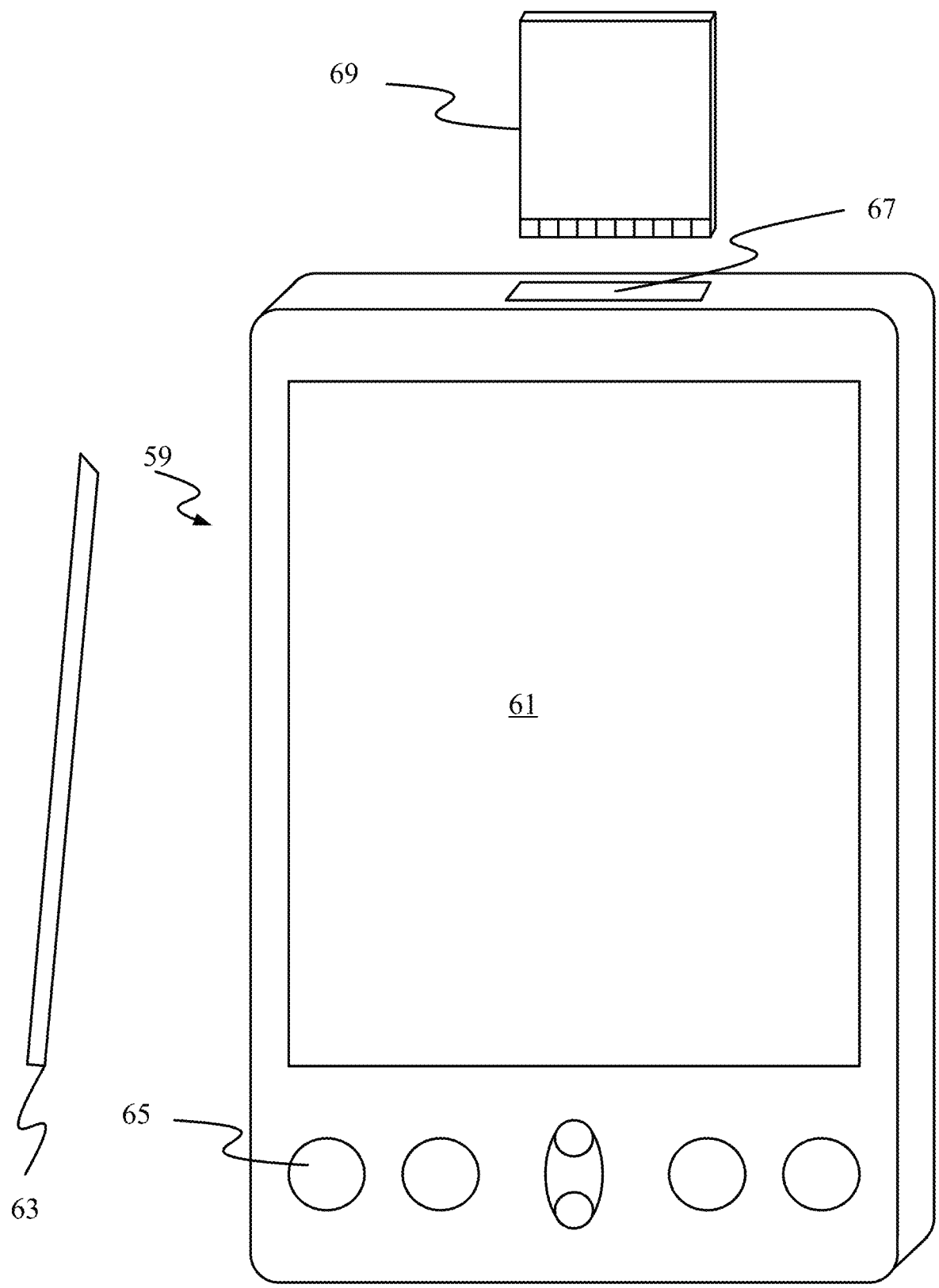

FIGS. 14 and 15 provide additional examples of devices 16 that can be used, although others can be used as well. In FIG. 14, a feature phone, smart phone or mobile phone 45 is provided as the device 16. Phone 45 includes a set of keypads 47 for dialing phone numbers, a display 49 capable of displaying images including application images, icons, web pages, photographs, and video, and control buttons 51 for selecting items shown on the display. The phone includes an antenna 53 for receiving cellular phone signals such as General Packet Radio Service (GPRS) and 1Xrtt, and Short Message Service (SMS) signals. In some embodiments, phone 45 also includes a Secure Digital (SD) card slot 55 that accepts a SD card 57.

The mobile device of FIG. 15 is a personal digital assistant (PDA) 59 or a multimedia player or a tablet computing device, etc. (hereinafter referred to as PDA 59). PDA 59 includes an inductive screen 61 that senses the position of a stylus 63 (or other pointers, such as a user's finger) when the stylus is positioned over the screen. This allows the user to select, highlight, and move items on the screen as well as draw and write. PDA 59 also includes a number of user input keys or buttons (such as button 65) which allow the user to scroll through menu options or other display options which are displayed on display 61, and allow the user to change applications or select user input functions, without contacting display 61. Although not shown, PDA 59 can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections. In one embodiment, mobile device 59 also includes a SD card slot 67 that accepts a SD card 69.

Figure 16:
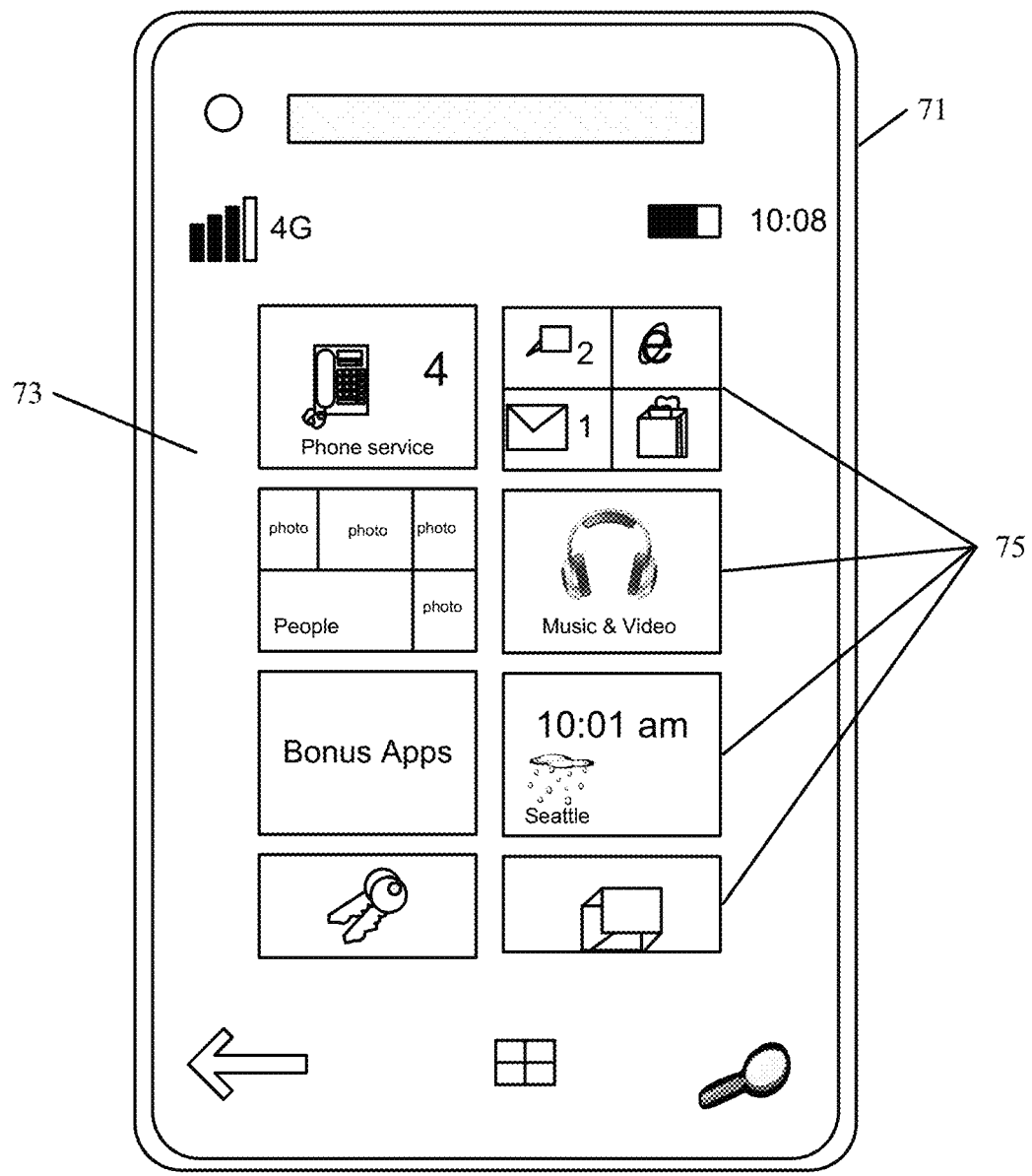
Figure 17:
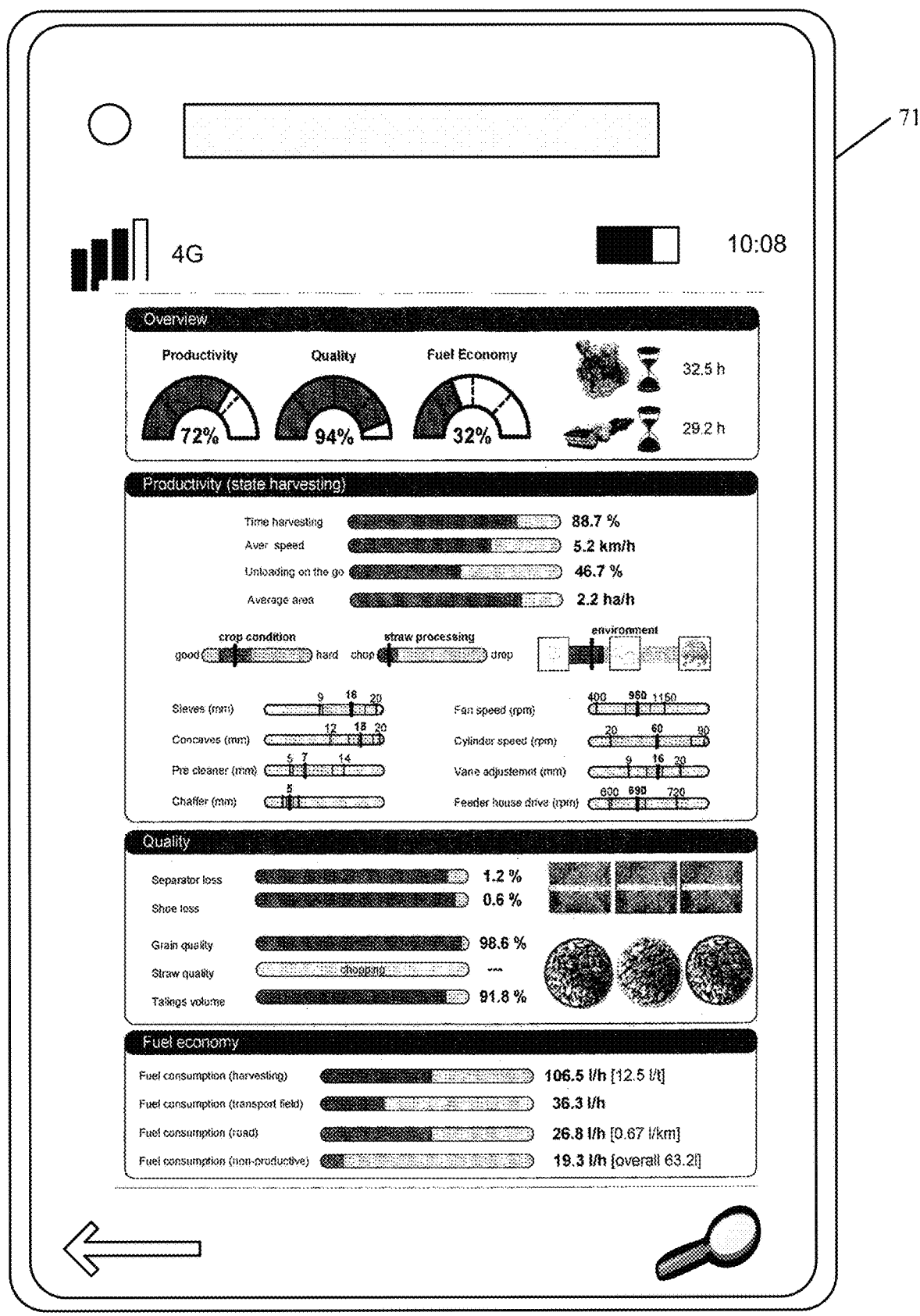

FIG. 16 is similar to FIG. 14 except that the phone is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone. FIG. 17 shows phone 71 with the example display of FIG. 13 displayed thereon.

Note that other forms of the devices 16 are possible.

Figure 18:
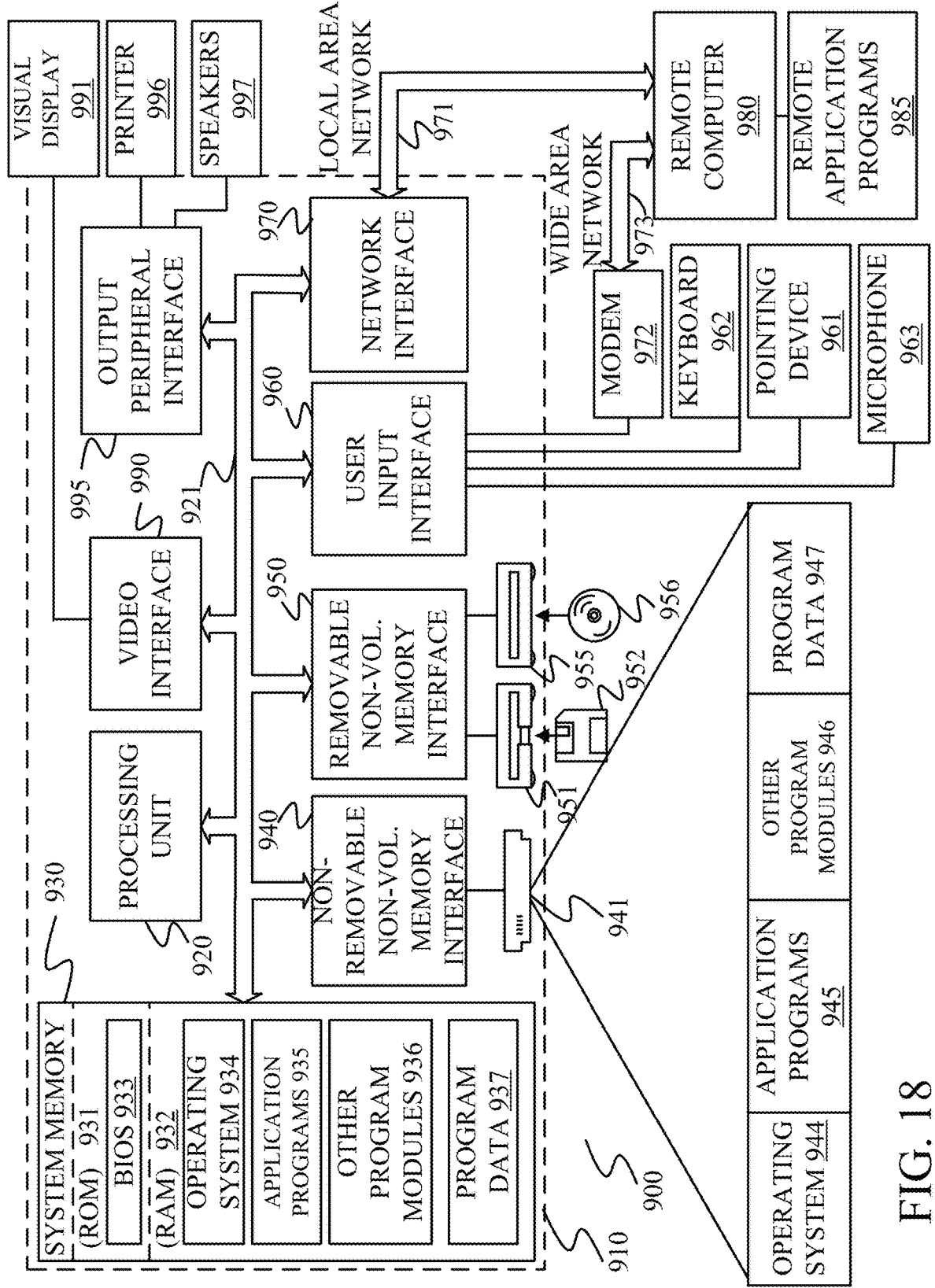
FIG. 18 is a block diagram of one illustrative computing environment which can be used in the architecture shown in FIGS. 1, 2, 6, and 11.

FIG. 18 is one embodiment of a computing environment in which architectures 100 and/or 600, or parts thereof, (for example) can be deployed. With reference to FIG. 18, an exemplary system for implementing some embodiments includes a general-purpose computing device in the form of a computer 910. Components of computer 910 may include, but are not limited to, a processing unit 920 (which can comprise processor 140, 155, 163 or 186), a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIGS. 1, 2, and 6 can be deployed in corresponding portions of FIG. 18.

Computer 910 typically includes a variety of computer readable media. Computer readable media can be any available media that can be accessed by computer 910 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic storage devices, or any other medium which can be used to store the desired information and which can be accessed by computer 910. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 930 includes computer storage media in the form of volatile and/or nonvolatile memory such as read only memory (ROM) 931 and random access memory (RAM) 932. A basic input/output system 933 (BIOS), containing the basic routines that help to transfer information between elements within computer 910, such as during start-up, is typically stored in ROM 931. RAM 932 typically contains data and/or program modules that are immediately accessible to and/or presently being operated on by processing unit 920. By way of example, and not limitation, FIG. 18 illustrates operating system 934, application programs 935, other program modules 936, and program data 937.

The computer 910 may also include other removable/non-removable volatile/nonvolatile computer storage media. By way of example only, FIG. 18 illustrates a hard disk drive 941 that reads from or writes to non-removable, nonvolatile magnetic media, a magnetic disk drive 951 that reads from or writes to a removable, nonvolatile magnetic disk 952, and an optical disk drive 955 that reads from or writes to a removable, nonvolatile optical disk 956 such as a CD ROM or other optical media. The hard disk drive 941 is typically connected to the system bus 921 through a non-removable memory interface such as interface 940, and magnetic disk drive 951 and optical disk drive 955 are typically connected to the system bus 921 by a removable memory interface, such as interface 950.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 18, provide storage of computer readable instructions, data structures, program modules and other data for the computer 910. In FIG. 18, for example, hard disk drive 941 is illustrated as storing operating system 944, application programs 945, other program modules 946, and program data 947.

A user may enter commands and information into the computer 910 through input devices such as a keyboard 962, a microphone 963, and a pointing device 961, such as a mouse, trackball or touch pad. Other input devices (not shown) may include a joystick, game pad, satellite dish, scanner, or the like. These and other input devices are often connected to the processing unit 920 through a user input interface 960 that is coupled to the system bus, but may be connected by other interface and bus structures, such as a parallel port, game port or a universal serial bus (USB). A visual display 991 or other type of display device is also connected to the system bus 921 via an interface, such as a video interface 990. In addition to the monitor, computers may also include other peripheral output devices such as speakers 997 and printer 996, which may be connected through an output peripheral interface 995.

The computer 910 is operated in a networked environment using logical connections to one or more remote computers, such as a remote computer 980. The remote computer 980 may be a personal computer, a hand-held device, a server, a router, a network PC, a peer device or other common network node, and typically includes many or all of the elements described above relative to the computer 910. The logical connections depicted in FIG. 18 include a local area network (LAN) 971 and a wide area network (WAN) 973, but may also include other networks.

When used in a LAN networking environment, the computer 910 is connected to the LAN 971 through a network interface or adapter 970. When used in a WAN networking environment, the computer 910 typically includes a modem 972 or other means for establishing communications over the WAN 973, such as the Internet. The modem 972, which may be internal or external, may be connected to the system bus 921 via the user input interface 960, or other appropriate mechanism. In a networked environment, program modules depicted relative to the computer 910, or portions thereof, may be stored in the remote memory storage device. By way of example, and not limitation, FIG. 18 illustrates remote application programs 985 as residing on remote computer 980. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a method performed by a control system for a work machine comprising receiving machine data indicative of operating parameters on the work machine, receiving a set of performance scores indicative of relative machine performance in a set of different performance categories, each performance score being generated by a different performance score generator based on sensor data associated with the work machine, accessing a set of rules that each map one or more triggering conditions to a corresponding adjustment action on the work machine, identifying a set of potential adjustment actions by evaluating fulfillment of the set of rules based on the operating parameters and performance scores, and correlating each potential adjustment action to one or more of the performance categories, selecting a particular adjustment action, from the set of potential adjustment actions, based on an indication of a selected target performance category, and outputting a control instruction based on the particular adjustment action.

Example 2 is the method in any or all previous examples, wherein the work machine comprises a mobile machine, and the machine data is indicative of one or more of:
  sensor data indicative of sensed parameters on the mobile machine, operator inputs received by the mobile machine, or operating conditions of the mobile machine.

Example 3 is the method in any or all previous examples, wherein the operating parameters comprise current machine settings and/or machine configuration.

Example 4 is the method in any or all previous examples, and further comprising generating an output comprises at least one of:
  controlling a user interface device associated with the work machine to render an indication of the adjustment action; or
  automatically controlling the work machine to perform the adjustment action.

Example 5 is the method in any or all previous examples, wherein the work machine comprises an agricultural machine, and the set of different performance categories comprises one or more of:
  fuel consumption, productivity, power utilization, agricultural material loss, or agricultural material quality.

Example 6 is the method in any or all previous examples, wherein identifying the set of potential adjustment actions comprises determining a degree of fulfillment of the triggering conditions for each rule in the set of rules.

Example 7 is the method in any or all previous examples, wherein selecting the particular adjustment action comprises:
  determining a performance impact of each adjustment action, in the set of potential adjustment actions, on the target performance category; and
  selecting the particular adjustment action based on the determined performance impacts and the degree of fulfillment of the triggering conditions associated with the particular adjustment action.

Example 8 is the method in any or all previous examples, and further comprising:
  receiving an indication of a performance category priority, that identifies a priority order for the different performance categories; and
  selecting the particular adjustment action based on the performance category priority.

Example 9 is the method in any or all previous examples, wherein selecting a particular adjustment action comprises selecting a plurality of adjustment actions by prioritizing performance impact, of the plurality of adjustment actions on the performance categories, in accordance with the priority order.

Example 10 is the method in any or all previous examples, and further comprising selecting the particular adjustment action based on data from an external data source.

Example 11 is the method in any or all previous examples, wherein the data from the external data source comprises at least one of:
  time data, weather data, remote sensing data, or machine data associated with another work machine.

Example 12 is a computing system comprising at least one processor, and memory storing instructions executable by the at least one processor, wherein the instructions, when executed, configure the computing system to receive machine data indicative of operating parameters on a work machine, receive a set of performance scores indicative of relative machine performance in a set of different performance categories, each performance score being generated by a different performance score generator based on sensor data associated with the work machine, access a set of rules that each map one or more triggering conditions to a corresponding adjustment action on the work machine, identify a set of potential adjustment actions by evaluating fulfillment of the set of rules based on the operating parameters and performance scores, and correlate each potential adjustment action to one or more of the performance categories, select a particular adjustment action, from the set of potential adjustment actions, based on an indication of a selected target performance category, and output a control instruction based on the particular adjustment action.

Example 13 is the computing system in any or all previous examples, wherein the instructions configure the computing system to determine a degree of fulfillment of the triggering conditions for each rule in the set of rules.

Example 14 is the computing system in any or all previous examples, wherein the instructions configure the computing system to select the particular adjustment action by determining a performance impact of each adjustment action, in the set of potential adjustment actions, on the target performance category, and selecting the particular adjustment action based on the determined performance impacts and the degree of fulfillment of the triggering conditions associated with the particular adjustment action.

Example 15 is the computing system in any or all previous examples, wherein the instructions configure the computing system to receive an indication of a performance category priority, that identifies a priority order for the different performance categories, and select the particular adjustment action based on the performance category priority.

Example 16 is the computing system in any or all previous examples, wherein the instructions configure the computing system to select a plurality of adjustment actions by prioritizing performance impact, of the plurality of adjustment actions on the performance categories, in accordance with the priority order.

Example 17 is the computing system in any or all previous examples, wherein
  the work machine comprises a mobile machine;
  the machine data is indicative of one or more of:
    sensor data indicative of sensed parameters on the mobile machine, operator inputs received by the mobile machine, or operating conditions of the mobile machine;
  the operating parameters comprise current machine settings and/or machine configuration;
  the set of different performance categories comprises one or more of:
    fuel consumption, productivity, power utilization, material loss, or material quality; and
  the instructions configure the computing system to:
    generate an output comprises at least one of:

controlling a user interface device associated with the work machine to render an indication of the adjustment action through a user interface associated with the work machine; or automatically controlling the work machine to perform the adjustment action.

Example 18 is a control system for a mobile machine comprising an automation logic engine configured to receive machine data indicative of operating parameters on the mobile machine, receive a set of performance scores indicative of relative machine performance in a set of different performance categories, each performance score being generated by a different performance score generator based on sensor data associated with the mobile machine, access a set of rules that each map one or more triggering conditions to a corresponding adjustment action on the mobile machine, and identify a set of potential adjustment actions by evaluating fulfillment of the set of rules based on the operating parameters and performance scores, and correlate each potential adjustment action to one or more of the performance categories. The mobile machine also comprises setting change logic configured to receive an indication of a selected target performance category, select a particular adjustment action, from the set of potential adjustment actions, based on the selected target performance category, and output a control instruction based on the particular adjustment action.

Example 19 is the control system in any or all previous examples, wherein the mobile machine comprises an agricultural machine, and the set of different performance categories comprises one or more of: fuel consumption, productivity, power utilization, agricultural material loss, or agricultural material quality.

Example 20 is the control system in any or all previous examples, wherein the setting change logic is configured to output the control instruction by at least one of:

controlling a user interface device associated with the mobile machine to render an indication of the adjustment action; or automatically controlling the work machine to perform the adjustment action.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method performed by a computing system for a work machine, the method comprising:
    receiving machine data indicative of operating parameters on the work machine;
    receiving a set of performance scores indicative of relative machine performance in a set of different performance categories, each performance score being generated by a different performance score generator based on sensor data associated with the work machine;
    accessing a set of rules that each map one or more triggering conditions to a corresponding adjustment action on the work machine;
    identifying, by a processor of the computing system, a set of potential adjustment actions by evaluating fulfillment of the set of rules based on the operating parameters and performance scores;
    generating, by the processor of the computing system, correlation data that correlates each potential adjustment action, in the set of potential adjustment actions, to one or more of the performance categories;
    receiving an indication of a selected target performance category;
    selecting, by the processor of the computing system, a particular adjustment action, from the set of potential adjustment actions, based on the correlation data that correlates the particular adjustment action to the selected target performance category; and
    outputting a control instruction based on the particular adjustment action.

2. The method of claim 1, wherein the work machine comprises a mobile machine, and the machine data is indicative of one or more of:
    sensor data indicative of sensed parameters on the mobile machine, operator inputs received by the mobile machine, or operating conditions of the mobile machine.

3. The method of claim 1, wherein the operating parameters comprise current machine settings and/or machine configuration.

4. The method of claim 1, wherein outputting a control instruction comprises at least one of:
    controlling a user interface device associated with the work machine to render an indication of the adjustment action; or
    automatically controlling the work machine to perform the adjustment action.

5. The method of claim 1, wherein the work machine comprises an agricultural machine, and the set of different performance categories comprises one or more of:
    fuel consumption, productivity, power utilization, agricultural material loss, or agricultural material quality.

6. The method of claim 1, wherein identifying the set of potential adjustment actions comprises determining a degree of fulfillment of the triggering conditions for each rule in the set of rules.

7. The method of claim 6, wherein selecting the particular adjustment action comprises:
    determining a performance impact of each adjustment action, in the set of potential adjustment actions, on the target performance category; and
    selecting the particular adjustment action based on the determined performance impacts and the degree of fulfillment of the triggering conditions associated with the particular adjustment action.

8. The method of claim 7, and further comprising:
    receiving an indication of a performance category priority, that identifies a priority order for the different performance categories; and
    selecting the particular adjustment action based on the performance category priority.

9. The method of claim 8, wherein selecting a particular adjustment action comprises selecting a plurality of adjustment actions by prioritizing performance impact, of the plurality of adjustment actions on the performance categories, in accordance with the priority order.

10. The method of claim 1, and further comprising:
    selecting the particular adjustment action based on data from an external data source.

11. The method of claim 10, wherein the data from the external data source comprises at least one of:
    time data, weather data, remote sensing data, or machine data associated with another work machine.

12. A computing system comprising:
    at least one processor; and memory storing instructions executable by the at least one processor, wherein the instructions, when executed, configure the computing system to:
receive machine data indicative of operating parameters on a work machine;
receive a set of performance scores indicative of relative machine performance in a set of different performance categories, each performance score being generated by a different performance score generator based on sensor data associated with the work machine;
access a set of rules that each map one or more triggering conditions to a corresponding adjustment action on the work machine;
identify a set of potential adjustment actions by evaluating fulfillment of the set of rules based on the operating parameters and performance scores;
generate correlation data that correlates each potential adjustment action, in the set of potential adjustment actions, to one or more of the performance categories;
receive an indication of a selected target performance category;
select a particular adjustment action, from the set of potential adjustment actions, based on the correlation data that correlates the particular adjustment action to the selected target performance category; and
output a control instruction based on the particular adjustment action.

13. The computing system of claim 12, wherein the instructions configure the computing system to:
determine a degree of fulfillment of the triggering conditions for each rule in the set of rules.

14. The computing system of claim 13, wherein the instructions configure the computing system to:
select the particular adjustment action by determining a performance impact of each adjustment action, in the set of potential adjustment actions, on the target performance category, and selecting the particular adjustment action based on the determined performance impacts and the degree of fulfillment of the triggering conditions associated with the particular adjustment action.

15. The computing system of claim 14, wherein the instructions configure the computing system to:
receive an indication of a performance category priority, that identifies a priority order for the different performance categories; and
select the particular adjustment action based on the performance category priority.

16. The computing system of claim 15, wherein the instructions configure the computing system to:
select a plurality of adjustment actions by prioritizing performance impact, of the plurality of adjustment actions on the performance categories, in accordance with the priority order.

17. The computing system of claim 12, wherein
the work machine comprises a mobile machine;
the machine data is indicative of one or more of:
sensor data indicative of sensed parameters on the mobile machine, operator inputs received by the mobile machine, or operating conditions of the mobile machine;
the operating parameters comprise current machine settings and/or machine configuration;
the set of different performance categories comprises one or more of:
fuel consumption, productivity, power utilization, material loss, or material quality; and
the instructions configure the computing system to output the control instruction by at least one of:
controlling a user interface device associated with the work machine to render an indication of the adjustment action; or
automatically controlling the work machine to perform the adjustment action.

18. A control system for a mobile machine, the control system comprising:
an automation logic engine configured to:
receive machine data indicative of operating parameters on the mobile machine;
receive a set of performance scores indicative of relative machine performance in a set of different performance categories, each performance score being generated by a different performance score generator based on sensor data associated with the mobile machine;
access a set of rules that each map one or more triggering conditions to a corresponding adjustment action on the mobile machine;
identify a set of potential adjustment actions by evaluating fulfillment of the set of rules based on the operating parameters and performance scores; and
generate correlation data that correlates each potential adjustment action, in the set of potential adjustment actions, to one or more of the performance categories; and
setting change logic configured to:
receive an indication of a performance category priority, that identifies a priority order for the different performance categories;
determine a performance impact of each adjustment action, in the set of potential adjustment actions, on the different performance categories based on the correlation data;
select a particular adjustment action, from the set of potential adjustment actions, based on the determined performance impacts and the degree of fulfillment of the triggering conditions associated with the particular adjustment action; and
output a control instruction based on the particular adjustment action.

19. The control system of claim 18, wherein the mobile machine comprises an agricultural machine, and the set of different performance categories comprises one or more of:
fuel consumption, productivity, power utilization, agricultural material loss, or agricultural material quality.

20. The control system of claim 18, wherein the setting change logic is configured to:
output the control instruction by at least one of:
controlling a user interface device associated with the mobile machine to render an indication of the adjustment action; or
automatically controlling the work machine to perform the adjustment action.

* * * * *